United States Patent
Fukushima et al.

(10) Patent No.: US 8,913,041 B2
(45) Date of Patent: *Dec. 16, 2014

(54) POSITION POINTER, VARIABLE CAPACITOR AND INPUTTING APPARATUS

(75) Inventors: Yasuyuki Fukushima, Kuki (JP); Hiroyuki Fujitsuka, Kuki (JP)

(73) Assignee: Wacom Co., Ltd., Saitama (JP)

( * ) Notice: Subject to any disclaimer, the term of this patent is extended or adjusted under 35 U.S.C. 154(b) by 811 days.

This patent is subject to a terminal disclaimer.

(21) Appl. No.: 12/753,282

(22) Filed: Apr. 2, 2010

(65) Prior Publication Data

US 2011/0219892 A1    Sep. 15, 2011

(30) Foreign Application Priority Data

Mar. 9, 2010   (JP) ................. 2010-051677

(51) Int. Cl.
*G09G 5/00*   (2006.01)
*G06F 3/046*   (2006.01)
*G06F 3/0354*   (2013.01)
*G06F 3/041*   (2006.01)

(52) U.S. Cl.
CPC ............ *G06F 3/046* (2013.01); *G06F 3/03545* (2013.01); *G06F 3/0416* (2013.01)
USPC ........................................................ 345/179

(58) Field of Classification Search
CPC ......... G06F 3/03; G06F 3/033; G06F 3/0346; G06F 3/03542; G06F 3/03545; G06F 3/0383
USPC ................... 178/19.03, 19.01; 345/156, 179; 361/277, 283.2
See application file for complete search history.

(56) References Cited

U.S. PATENT DOCUMENTS 3,993,939 A * 11/1976 Slavin et al. ............... 361/283.4
4,292,660 A *  9/1981 Tatsumi ......................... 361/293

(Continued)

FOREIGN PATENT DOCUMENTS

CN       1728065 A    2/2006
CN     101393491 A    3/2009

(Continued)

OTHER PUBLICATIONS

Japanese Office Action dated Dec. 18, 2012, for corresponding related JP Application No. 2008-305556, 3 pages.

(Continued)

*Primary Examiner* — Jonathan Horner
(74) *Attorney, Agent, or Firm* — Seed IP Law Group PLLC

(57) ABSTRACT

A position pointer is disclosed, including a housing, a substantially bar-like rod accommodated in the housing such that one end thereof projects to the outer side of the housing, and a variable capacitor having a capacitance value which varies in response to external force applied thereto through the rod. The variable capacitor includes a dielectric member having a first face portion and a second face portion opposite from the first face portion, a terminal member configured to engage with the first face portion of the dielectric member, an electrode section disposed in an opposing relationship to the second face portion of the dielectric member and including a conductive member having a contact area with the second face portion that varies in response to the external force, and an elastic member configured to bias the conductive member in a direction in which the conductive member is spaced away from the second face portion.

10 Claims, 40 Drawing Sheets

(56) References Cited

U.S. PATENT DOCUMENTS

| | | | |
|---|---|---|---|
| 5,206,785 A * | 4/1993 | Hukashima | 361/283.2 |
| 5,557,497 A * | 9/1996 | Ivanov et al. | 361/502 |
| 5,581,052 A | 12/1996 | Padula et al. | |
| 6,252,182 B1 * | 6/2001 | Lai | 178/19.04 |
| 6,801,192 B2 * | 10/2004 | Fujitsuka et al. | 345/179 |
| 7,696,444 B2 | 4/2010 | Liu et al. | |
| 7,825,655 B1 * | 11/2010 | Stabel et al. | 324/207.15 |
| 8,525,816 B2 | 9/2013 | Fukushima et al. | |
| 8,711,130 B2 * | 4/2014 | Fukushima et al. | 345/179 |
| 2001/0038384 A1 | 11/2001 | Fukushima et al. | |
| 2007/0180923 A1 | 8/2007 | Liu et al. | |
| 2007/0195068 A1 | 8/2007 | Kable et al. | |
| 2009/0076770 A1 | 3/2009 | Fukushima et al. | |
| 2009/0114459 A1 | 5/2009 | Fukushima et al. | |
| 2009/0314552 A1 | 12/2009 | Underwood et al. | |
| 2010/0013792 A1 | 1/2010 | Fukushima | |
| 2011/0192658 A1 | 8/2011 | Fukushima et al. | |

FOREIGN PATENT DOCUMENTS

| | | | |
|---|---|---|---|
| EP | 1154447 | A2 | 11/2001 |
| JP | 63070326 | A | 3/1988 |
| JP | 4096212 | A | 3/1992 |
| JP | 575828 | U | 10/1993 |
| JP | 05275283 | A | 10/1993 |
| JP | 06129929 | A | 5/1994 |
| JP | 2006163798 | A | 6/2006 |
| JP | 2007201464 | A | 8/2007 |
| WO | 0124157 | A1 | 4/2001 |

OTHER PUBLICATIONS

Fukushima et al., U.S. Appl. No. 13/958,303, entitled "Position Pointer, Variable Capacitor and Inputting Apparatus," filed Aug. 2, 2013, 66 pages.

Japanese Office Action dated Oct. 9, 2013, for corresponding JP Application No. 2010-051677, 2 pages.

Extended European Search Report dated Sep. 5, 2013, for corresponding EP Application No. 11155845.8, 6 pages.

Chinese Office Action dated Aug. 5, 2014, for corresponding CN Application No. 201010568860.7, 11 pages.

* cited by examiner

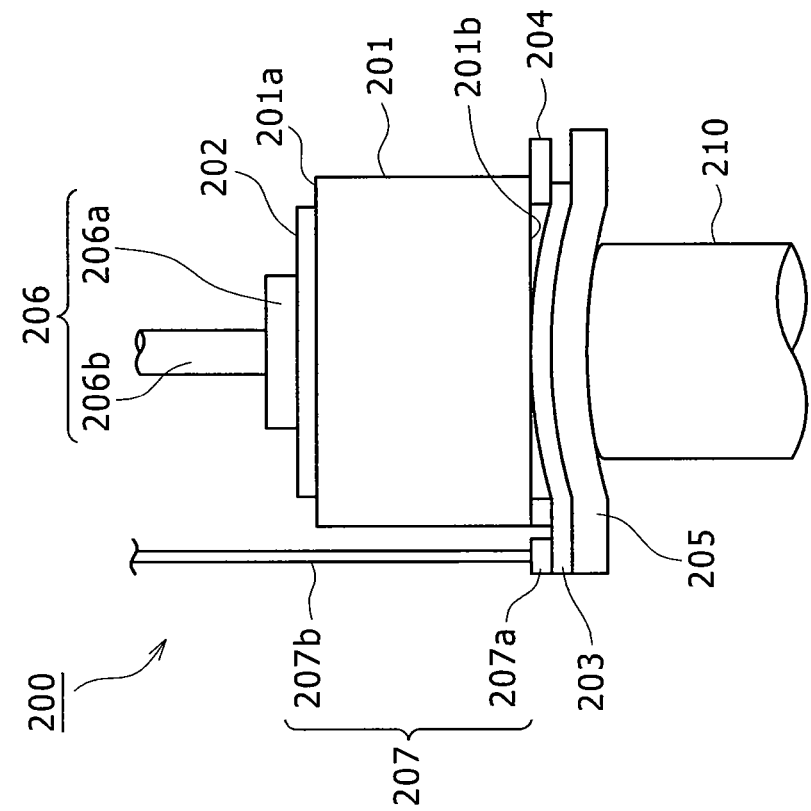
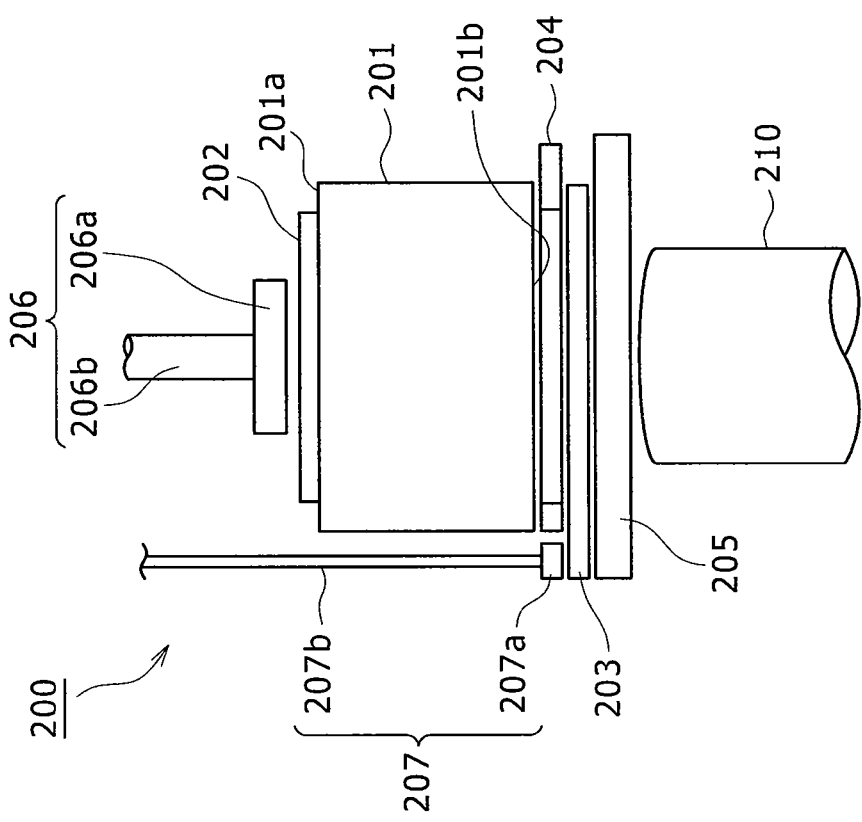

POSITION POINTER, VARIABLE CAPACITOR AND INPUTTING APPARATUS

CROSS-REFERENCE(S) TO RELATED APPLICATION

The present application claims priority under 35 U.S.C. §119 from Japanese Patent Application JP 2010-051677 filed in the Japanese Patent Office on Mar. 9, 2010, the entire content of which is incorporated herein by reference.

BACKGROUND OF THE INVENTION

1. Field of the Invention

This invention relates to a position pointer suitable for use for detection of writing pressure, a variable capacitor for detecting the writing pressure, and an inputting apparatus which includes the position pointer.

2. Description of the Related Art

In recent years, inputting apparatuses have been used as an inputting device for computing devices, such as personal computers and so forth. A typical inputting apparatus includes a position pointer formed, for example, like a pen, and a position detection apparatus having an input face which receives a pointing operation or inputting of characters, figures, and so forth thereto using the position pointer.

A variable capacitor as disclosed, for example, in Japanese Patent Laid-Open No. Hei 4-96212 (hereinafter referred to as Patent Document 1), is used in a writing pressure detection section of the position pointer. The variable capacitor disclosed in Patent Document 1 includes a first electrode attached to a first face of a dielectric member and a second flexible electrode disposed on a second face side of the dielectric member. The variable capacitor further includes means for spacing the second electrode away from the second face of the dielectric member by a small distance, and means for applying relative pressure or displacement between the second electrode and the dielectric member.

FIGS. 41A and 41B show a particular configuration of the conventional variable capacitor. More particularly, FIG. 41A shows the variable capacitor in an initial state, and FIG. 41B shows the variable capacitor in another state wherein pressure is applied thereto.

Referring to FIGS. 41A and 41B, the variable capacitor 200 includes a dielectric member 201 substantially shaped as a disk, a first electrode 202 attached to the first face 201a of the dielectric member 201, and a second electrode 203 disposed on the other face 201b side of the dielectric member 201 opposite the first face 201a of the dielectric member 201. The second electrode 203 has flexibility and is disposed on the second face 201b side of the dielectric member 201 with a ring-shaped spacer 204 interposed therebetween. Meanwhile, a bar-like rod 210 is provided on the opposite side of the second electrode 203, opposite to the dielectric member 201, with an elastic member 205 interposed therebetween.

A first terminal 206 is provided on the first face side of the first electrode 202. The first terminal 206 has a disk-shaped flange portion 206a and a lead portion 206b extending from a substantially central portion of a face of the flange portion 206a. When writing pressure is applied to the flange portion 206a (through the rod 210), the flange portion 206a contacts the first face of the first electrode 202 and electrically connects to the first electrode 202.

A second terminal 207 is provided at an end portion of the second electrode 203. The second terminal 207 has, similarly to the first terminal 206, a disk-shaped flange portion 207a and a lead portion 207b extending from a substantially central portion of one face of the flange portion 207a. When writing pressure is applied to the flange portion 207a, the flange portion 207a is brought into contact with an end portion of a face of the second electrode 203 and electrically connects to the second electrode 203.

In the variable capacitor 200, in a state wherein no pressure or displacement is applied to the rod 210, that is, in an initial state, a small distance is formed between the second face 201b of the dielectric member 201 and the second electrode 203 by the spacer 204 as seen in FIG. 41A. On the other hand, if pressure is applied to the rod 210, then the elastic member 205 and the second electrode 203 are pressed and elastically deformed by the rod 210 as seen in FIG. 41B. By the elastic deformation, the second electrode 203 is brought into contact with the second face 201b of the dielectric member 201. Then, if the contact area between the second electrode 203 and the second face 201b of the dielectric member 201 increases, then the capacitance value between the first and second terminals 206 and 207 also increases. As a result, if the variation in capacitance value between the first and second terminals 206 and 207 is detected, then the writing pressure applied to the rod 210 is detected.

SUMMARY OF THE INVENTION

However, the conventional variable capacitor 200 does not have a configuration for surely spacing the second electrode 203 away from the dielectric member 201 because the ring-shaped spacer 204 is merely interposed between the second electrode 203 and the dielectric member 201. Therefore, if the variable capacitor 200 is oriented such that the second electrode 203 is positioned upwardly (i.e., above the dielectric member 201), then the second electrode 203 may be deformed due to its own weight. Further, where the variable capacitor 200 is incorporated in a position pointer, if a pointing (tip) portion of the rod 210 is directed upwardly, then the rod 210 may be moved down by its own gravity to press the elastic member 205 and the second electrode 203. As a result, the variable capacitor 200 has a problem in that, even when no writing pressure is applied, the second electrode 203 and the dielectric member 201 may be placed into contact with each other.

Further, if the variable capacitor 200 is kept in a state wherein the second electrode 203 and the dielectric member 201 remain in contact with each other, then there is the possibility that the second electrode 203 and the dielectric member 201 may stick to each other. Therefore, there is another drawback that the second electrode 203 or the dielectric member 201 is degraded to deteriorate the durability of the variable capacitor 200.

Further, the conventional variable capacitor 200 is configured such that the first electrode 202 is formed in advance on the first face 201a of the dielectric member 201 and the first terminal 206 is brought into contact with the first electrode 202 to establish electric connection between them. Therefore, it is necessary to provide a step of forming the first electrode 202 on the first face 201a and to provide the first terminal 206 in addition to the first electrode 202.

Further, since, when writing pressure is, the flange portion 206a of the first terminal 206 is brought into contact with the first electrode 202 to establish electric connection to the first electrode 202, every time writing pressure is applied, the first electrode 202 and the flange portion 206a of the first terminal 206 collide with each other. Generally, the first electrode 202 and the flange portion 206a of the first terminal 206 are configured so as to form a point-contact with each other. Therefore, with the conventional position pointer, there is the possibility that the colliding portion of the first electrode 202 with the flange portion 206a of the first terminal 206 may be gradually abraded, resulting in deterioration of the durability of the variable capacitor.

According to one aspect, the present invention provides a position pointer, a variable capacitor and an inputting apparatus by which an initial state can be restored with certainty, reduction in the number of fabrication steps can be achieved, and durability can be improved.

According to an aspect of the present invention, there is provided a position pointer including a housing, a substantially bar-like rod accommodated in the housing in such a state that one end thereof projects to the outer side of the housing, and a variable capacitor having a capacitance value which varies in response to external force applied thereto through the rod. The variable capacitor includes a dielectric member having a first face portion and a second face portion which is opposite to the first face portion, a terminal member configured to engage with the first face portion of the dielectric member, and an electrode section disposed in an opposing relationship to the second face portion of the dielectric member and including a conductive member having a contact area with the second face portion which varies in response to the external force. The variable capacitor also includes an elastic member configured to bias the conductive member of the electrode section in a direction in which the conductive member is spaced away from the second face portion.

According to another aspect of the present invention, there is provided a variable capacitor including a dielectric member having a first face portion and a second face portion which is opposite to the first face portion, a terminal member configured to engage with the first face portion of the dielectric member, and an electrode section disposed in an opposing relationship to the second face portion of the dielectric member and including a conductive member having a contact area with the second face portion which varies in response to the external force. The variable capacitor also includes an elastic member configured to bias the conductive member in a direction in which the conductive member is spaced away from the second face portion.

According to another aspect of the present invention, there is provided an inputting apparatus, including a position pointer and a position detection apparatus. The position pointer includes a housing, a substantially bar-like rod accommodated in the housing in such a state that one end thereof projects to the outer side of the housing, and a variable capacitor having a capacitance value which varies in response to external force applied thereto through the rod. The position detection apparatus has a detection face for being pointed to by an end (tip) of the rod and is configured to detect the position pointed to by the end of the rod. The variable capacitor includes a dielectric member having a first face portion and a second face portion which is opposite to the first face portion, a terminal member configured to engage with the first face portion of the dielectric member, and an electrode section disposed in an opposing relationship to the second face portion of the dielectric member and including a conductive member having a contact area with the second face portion which varies in response to the external force. The variable capacitor further includes an elastic member configured to bias the conductive member in a direction in which the conductive member is spaced away from the second face portion.

In the position pointer and the variable capacitor, the terminal member of the variable capacitor engages with the first face portion side of the dielectric member and plays a role of the first electrode. Accordingly, there is no necessity to separately form an electrode on the first face portion side of the dielectric member, and a step for the electrode formation can be omitted. Further, since there is no possibility of abrasion of the terminal member and the electrode on the first face portion of the dielectric member by contact therebetween, the durability of the position pointer and the variable capacitor can be improved.

Further, the electrode section serving as the second electrode opposite to the first electrode is provided on the second face portion side of the dielectric member. This electrode section includes the conductive member which is brought into contact with the second face portion of the dielectric member by external force applied to the rod and whose contact area with the second face portion of the dielectric member varies in response to the external force applied to the rod. The conductive member is biased in the direction in which it is spaced away from the second face portion by the elastic member.

Accordingly, a situation that the conductive member of the electrode section sticks to the second face portion of the dielectric member can be prevented, and consequently, the position pointer and the variable capacitor are superior in durability.

In summary, with the present invention, a position pointer, a variable capacitor and an inputting apparatus can be provided wherein the variable capacitor can restore its original state with certainty and which can be produced by a reduced number of fabrication steps and can achieve improvement in durability.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 12A is a sectional view taken along line S-S' of FIG. 11A and FIG. 12B is a sectional view taken along line T-T' of FIG. 11A;

FIGS. 41A and 41B schematically illustrate a conventional variable capacitor in an initial state and another state wherein pressure or writing pressure is applied to a rod, respectively.

DETAILED DESCRIPTION OF THE PREFERRED EMBODIMENTS

First Embodiment

In the following, a position pointer, a variable capacitor and an inputting apparatus according to a first embodiment of the present invention are described with reference to FIGS. 1 to 25.

[Inputting Apparatus]

Figure 1:
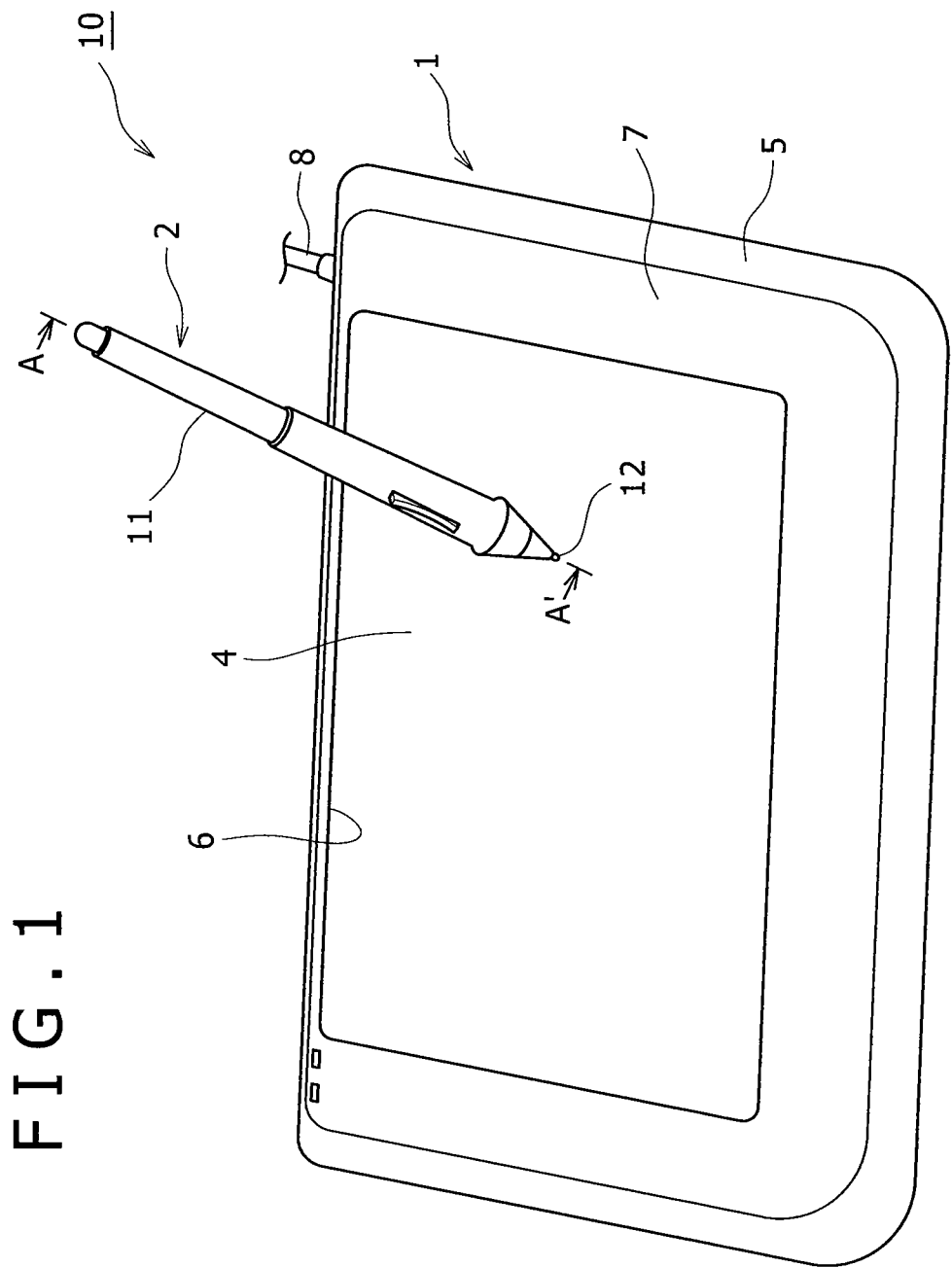
FIG. 1 is a perspective view of an inputting apparatus to which the present invention is applied.

First, a general configuration of an inputting apparatus according to the first embodiment of the present invention is described with reference to FIG. 1. FIG. 1 is a perspective view showing the inputting apparatus according to the present invention.

The inputting apparatus 10 according to the first embodiment of the present invention includes a position detection apparatus 1, and a position pointer 2 for inputting information to the position detection apparatus 1.

[Position Detection Apparatus 1]

The position detection apparatus 1 is connected to an external apparatus such as a personal computer or a PDA (Personal Digital Assistant) (not shown) by a cable 8 so that it is used as an inputting apparatus for the external apparatus. Though not particularly shown, the position detection apparatus 1 may be built in a personal computer or the like.

The position detection apparatus 1 includes a detection section 4 for detecting the position pointed to by the position pointer 2 and a housing 5 having a shape substantially of a hollow thin parallelepiped and having the detection section 4 thereon. The housing 5 includes an upper housing 7 having an opening 6 for exposing a detection face of the detection section 4 therethrough, and a lower housing (not shown) for mating with the upper housing 7. The opening 6 of the upper housing 7 has a quadrangular shape and allows an inputting face of the detection section 4 to be exposed therethrough, and the detection section 4 is fitted in the opening 6. The position detection apparatus 1 having such a configuration as described above is used to input characters, figures and so forth based on a pointing operation of the position pointer 2.

[Position Pointer 2]

Figure 2:
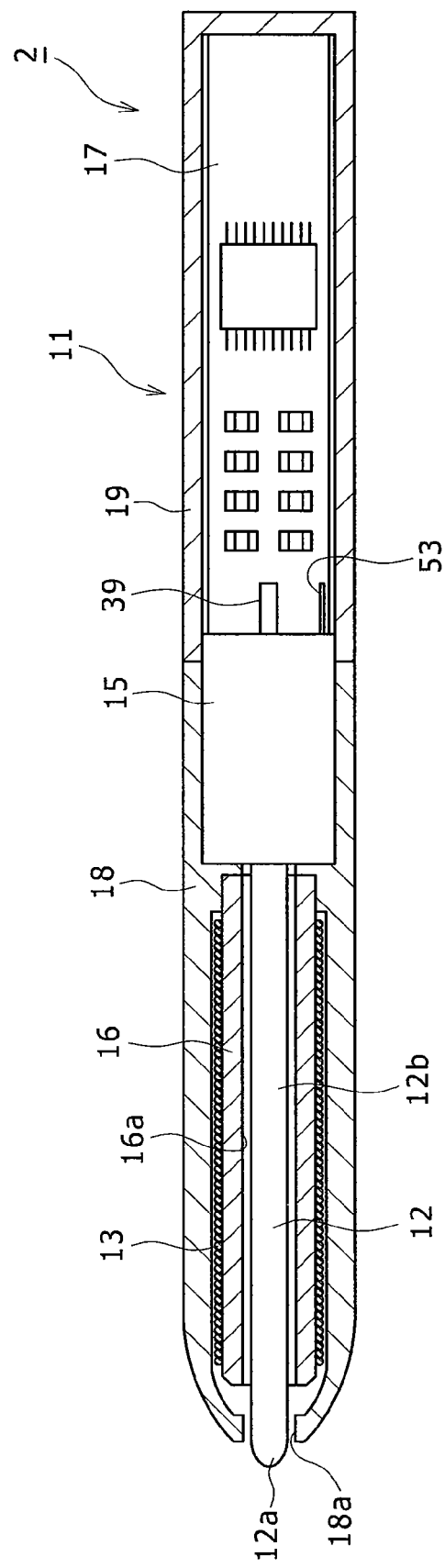
FIG. 2 is a sectional view taken along line A-A' of FIG. 1 showing a position pointer of FIG. 1.

Next, a general configuration of the position pointer 2 is described with reference to FIG. 2. FIG. 2 is a sectional view taken along line A-A' of FIG. 1 showing the position pointer 2.

The position pointer 2 points to a position on the position detection apparatus 1 in accordance with an electromagnetic induction method. In particular, the position pointer 2 includes a resonance circuit which resonates with an electromagnetic wave of a predetermined frequency transmitted thereto from the position detection apparatus 1. The position pointer 2 transmits the resonance signal detected by the resonance circuit to the position detection apparatus 1 to indicate a position to the position detection apparatus 1.

Referring to FIG. 2, the position pointer 2 includes a case 11, which is a particular example of a housing, a rod 12, a position indicating coil 13, a variable capacitor 15, a ferrite core 16, and a printed board 17.

The case 11 is formed as a sheath section of the position pointer 2. The case 11 has a bottomed cylindrical shape closed at one end thereof. The case 11 includes a first case 18 and a second case 19 superposed in an axial direction and assembled and coupled to each other. The first case 18 has a substantially conical shape at a first end thereof in the axial direction and has an opening 18a at a tip of the first end. The first case 18 is open at the other end (i.e., a second end) thereof in the axial direction.

The second case 19 has a cylindrical shape which is open at a first end thereof in the axial direction and is closed at the other (i.e., second) end thereof. The first case 18 and the second case 19 are disposed on the same axial line and secured to each other by fixing means such as a bonding agent or a fastening screw. The printed board 17 having electronic parts mounted thereon is secured to the second case 19 by fixing means such as a bonding agent or a fastening screw. The ferrite core 16 is accommodated in the first case 18.

The ferrite core 16 has, for example, a cylindrical shape and has a tubular hole 16a in which the rod 12 is fitted. A pointing portion 12a of the rod 12 projects from one end side in the axial direction of the ferrite core 16. Further, the position indicating coil 13 which forms the resonance circuit is wound on an outer periphery of the ferrite core 16. The opposite ends (not shown) of the position indicating coil 13 are electrically connected to the electronic parts on the printed board 17. Electronic parts which form the resonance circuit are mounted on the printed board 17.

The rod 12 is formed from a substantially bar-like member and is accommodated in the case 11 along the axial direction of the case 11. The rod 12 includes the pointing portion 12a provided at an end thereof in its axial direction and having a role of a pen tip point, and a stem portion 12b formed continuously from the pointing portion 12a. The pointing portion 12a is formed in a substantially conical shape. The pointing portion 12a of the position detection apparatus 1 projects outwardly from the opening 18a of the first case 18 when the rod 12 is accommodated in the case 11. The variable capacitor 15 is attached to the other end of the stem portion 12b in the axial direction.

[Variable Capacitor 15]

Figure 3:
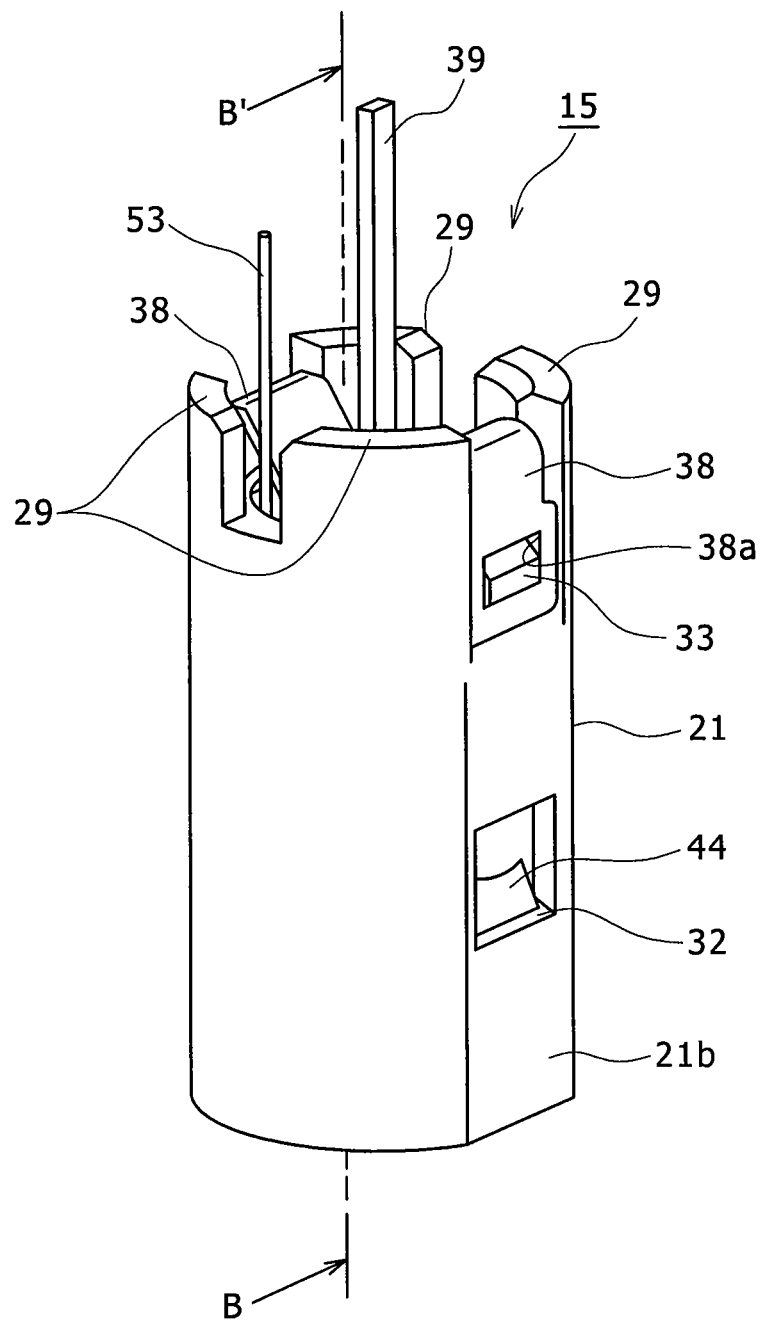
FIG. 3 is a perspective view of a variable capacitor according to a first embodiment of the present invention.

Next, the variable capacitor 15 to which the present invention is applied is described with reference to FIGS. 3 to 18. FIG. 3 is a perspective view of the variable capacitor 15 and FIG. 4 is a sectional view taken along line B-B' of FIG. 3 showing the variable capacitor 15.

The variable capacitor 15 has a capacitance value which varies in response to the pressure (i.e., writing pressure) applied to the position pointer 2. The variable capacitor 15 detects the writing pressure applied to the rod 12 based on the variation of the capacitance value and acts as a writing pressure detection section of the position pointer 2.

Figure 4:
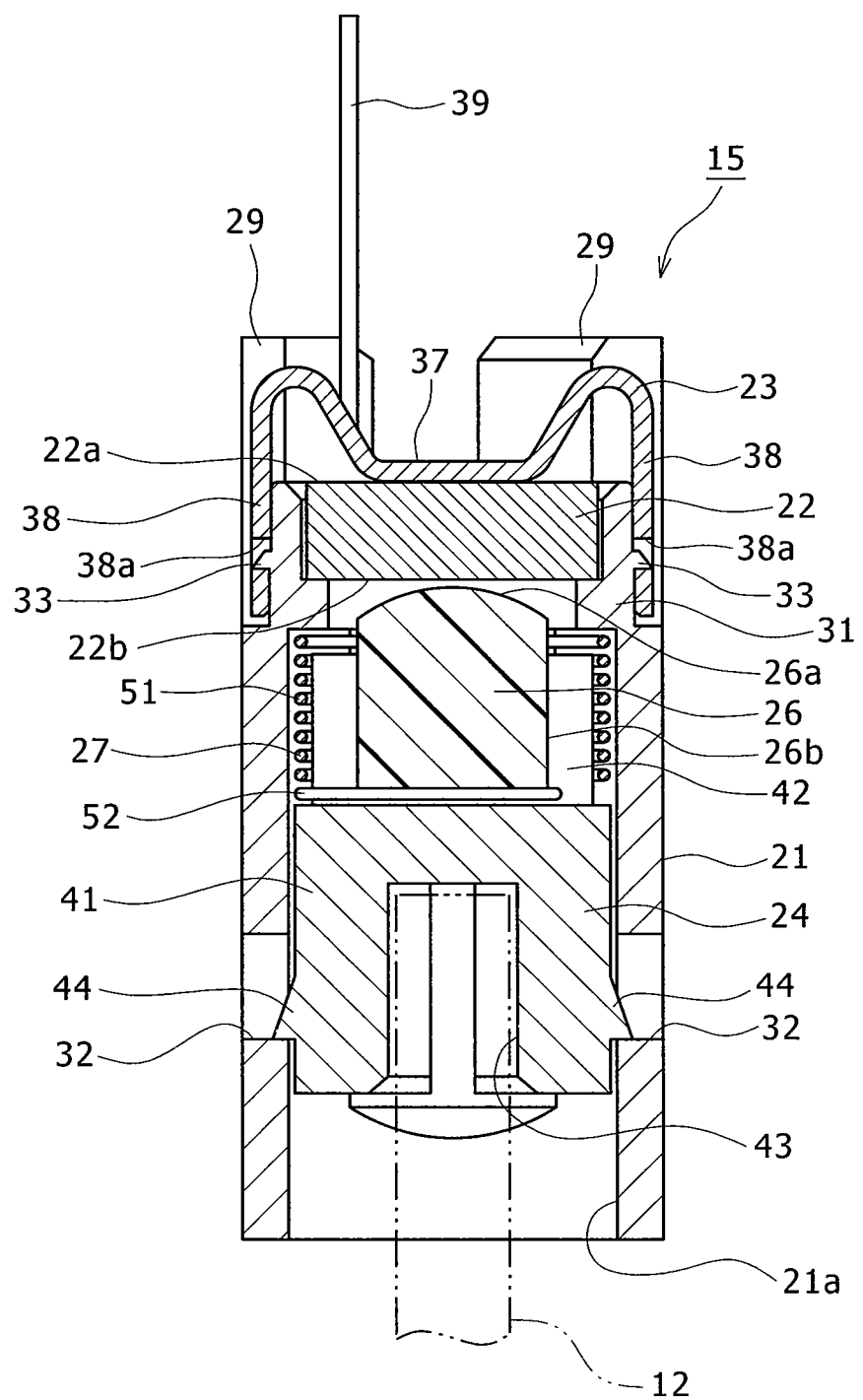
FIG. 4 is a sectional view taken along line B-B' of FIG. 3 showing the variable capacitor of FIG. 3.

Referring to FIGS. 3 and 4, the variable capacitor 15 includes a holder 21, a dielectric member 22, a terminal member 23, a holding member 24, a conductive member 26, and an elastic member 27.

[Holder 21]

Figure 5:
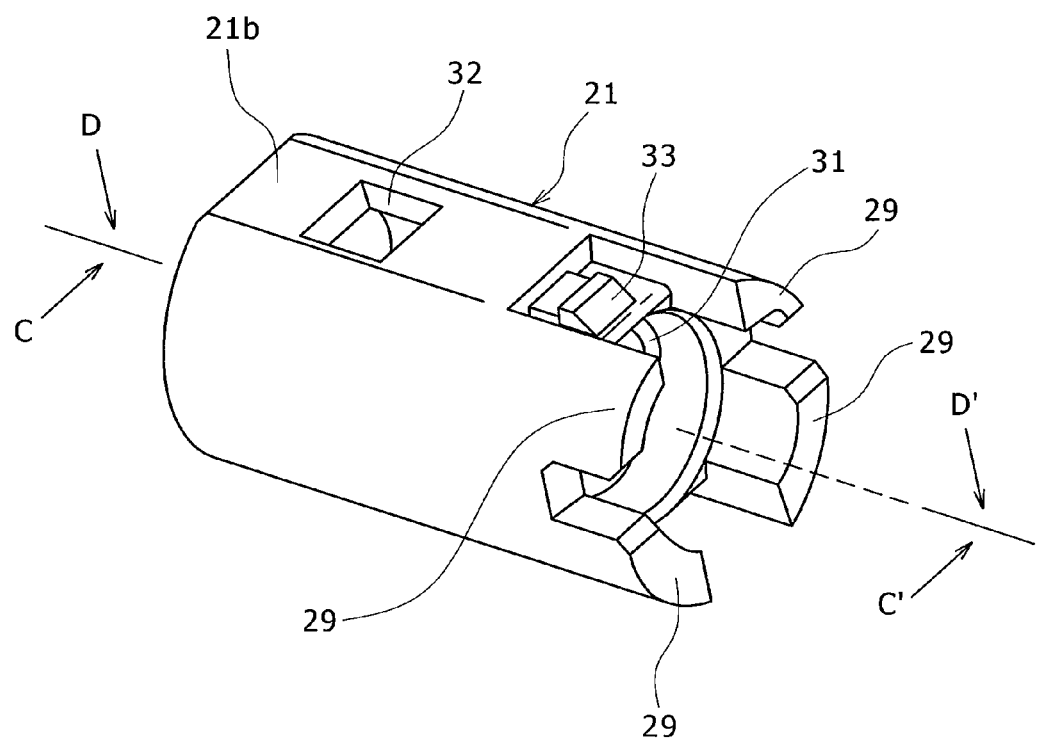
FIG. 5 is a perspective view showing a case of the variable capacitor of FIG. 3.
Figure 6A:
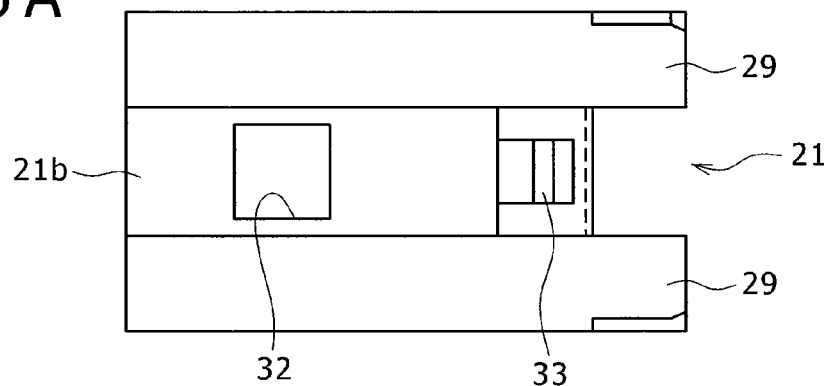
FIG. 6A is a front elevational view showing the case of the variable capacitor of FIG. 5.
Figure 6B:
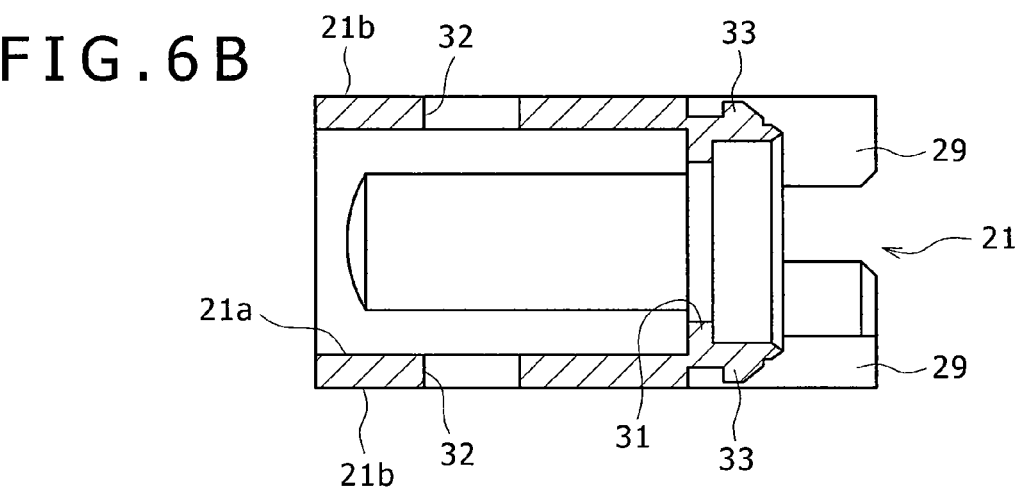
FIG. 6B is a sectional view taken along line C-C' of FIG. 5.
Figure 6C:
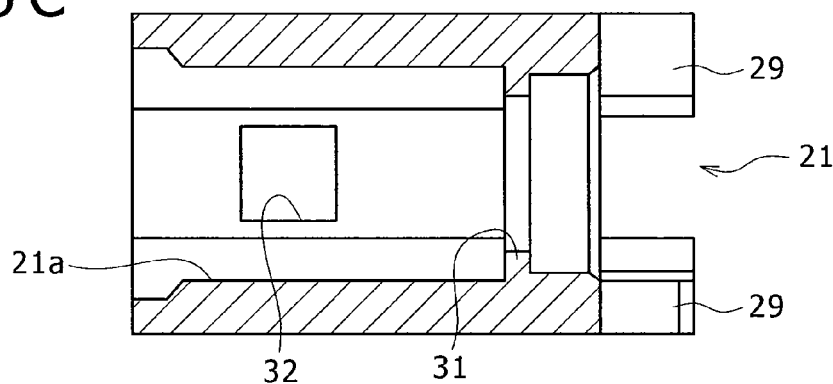
FIG. 6C is a sectional view taken along line D-D' of FIG. 5.
Figure 7A:
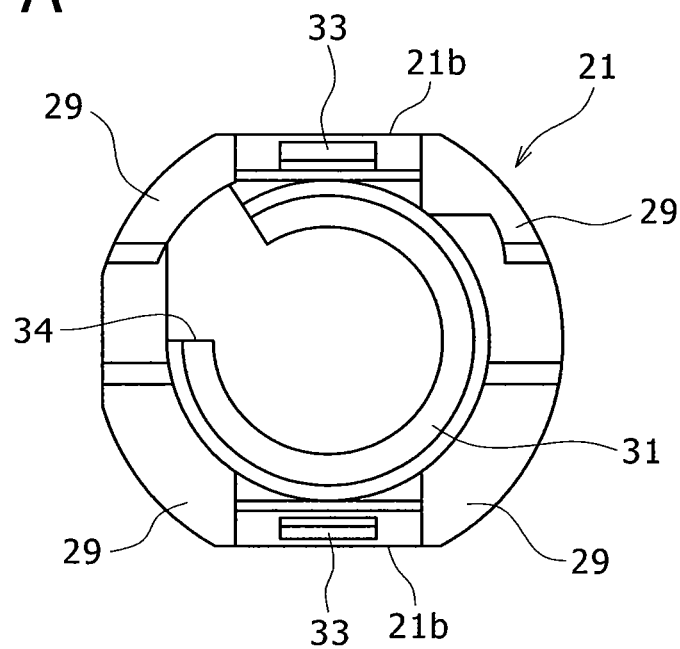
FIGS. 7A and 7B are a top plan view and a bottom plan view showing the case of FIG. 5, respectively.
Figure 7B:
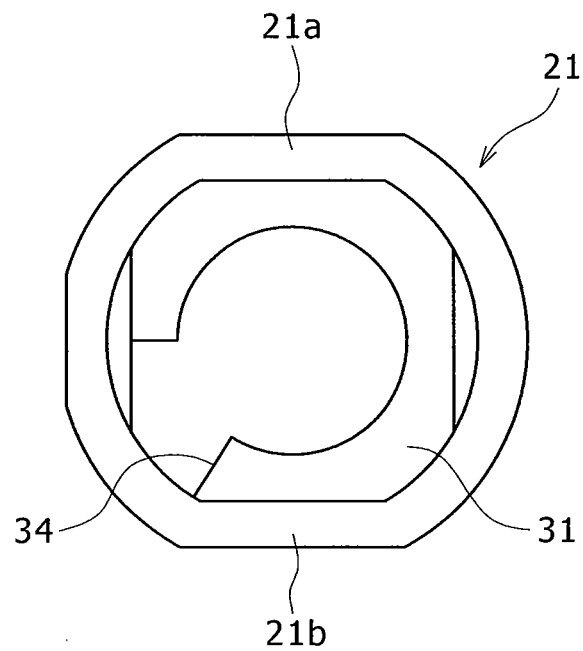

The holder 21 of the variable capacitor 15 is described with reference to FIGS. 5 to 7B. FIG. 5 is a perspective view showing an appearance of the holder 21, FIG. 6A is a front elevational view of the holder 21, and FIG. 6B is a sectional view of the holder 21 taken along line C-C' of FIG. 5, while FIG. 6C is a sectional view of the holder 21 taken along line D-D' of FIG. 5. Further, FIGS. 7A and 7B are a top plan view and a bottom plan view of the holder 21, respectively.

The holder 21 is formed in a hollow substantially cylindrical shape. The holder 21 has two flat face portions 21b provided in parallel to each other and in an opposing relationship to each other on side faces thereof. Four projections 29 are formed on a first end side of the holder 21 in the axial direction by cutting away the first end side at four places. As shown in FIG. 4, the dielectric member 22 is attached to the holder 21, and the conductive member 26, elastic member 27 and holding member 24 are accommodated in a tubular hole 21a of the holder 21, which is a particular example of a hollow portion. The holder 21 has a flange portion 31, two engaging holes 32 and two locking receiving portions 33 provided thereon.

Referring to FIGS. 6B and 6C, the flange portion 31, which is a particular example of a projection, is disposed in such a manner as to project to the inner side of the holder 21 in a radial direction. The flange portion 31 is a collar-like projection formed, for example, on an inner wall of the holder 21 and projecting continuously along a circumferential direction of the inner wall. Referring to FIG. 4, the dielectric member 22 contacts the flange portion 31 from the first end side of the holder 21 in the axial direction, and the elastic member 27 contacts the flange portion 31 from the other (i.e., second) end side of the holder 21 in the axial direction. As shown in FIGS. 7A and 7B, a through-hole 34 is provided by cutting away part of the flange portion 31.

While, in the embodiment shown, the projection is described as the collar-like flange portion provided on the inner wall of the holder 21 and projecting continuously along the circumferential direction of the inner wall, the projection is not limited to this configuration. For example, the projection may be formed as a plurality of protrusions projecting to the inner side of the inner wall in a radial direction from the inner wall of the holder 21. In particular, the projection may be formed in any shape as long as the dielectric member 22 contacts the projection from the first end side of the holder 21 in the axial direction and the elastic member 27 contacts the projection from the second end side of the holder 21 in the axial direction.

Referring to FIGS. 5, 6A and 6B, the two engaging holes 32 which are a particular example of a first engaging portion are provided on the two flat face portions 21b of the holder 21. The two engaging holes 32 are provided at a location of the holder 21 displaced to the second end side from the center in the axial direction. Further, the engaging holes 32 are open, for example, in a substantially quadrangular shape. As shown in FIGS. 3 and 4, the holding member 24 is engaged with the engaging holes 32 in such a way as to permit its movement along the axial direction of the holder 21. It is to be noted that the shape of the engaging holes 32 need not be a substantially quadrangular shape but may be a substantially circular shape. Further, the engaging holes 32 may be formed not as through-holes but as concave (or recessed) portions provided on the inner wall of the holder 21.

Further, as shown in FIGS. 5, 6A and 6B, the two locking receiving portions 33 are provided on the first end side of the holder 21 in the axial direction. The locking receiving portions 33 are provided on the first end side of the holder 21 in the axial direction such that they are positioned between two of the projections 29 (see FIG. 6A). As shown in FIG. 6B, the locking receiving portions 33 have a cross section of a substantially trapezoidal shape taken along the axial direction of the holder 21. The terminal member 23 is secured to the holder 21 by being locked by the two locking receiving portions 33 as seen in FIGS. 3 and 4.

Engineering plastic or the like may be used as the material of the holder 21. Further, while in the embodiment described above the holder 21 is formed in a cylindrical shape, the shape of the holder 21 may be, for example, an angular tubular shape. Further, while in the embodiment described above the dielectric member 22, conductive member 26, elastic member 27 and holding member 24 are accommodated in the holder 21, the holder 21 and the case 11 may be molded as a unitary member and the conductive member 26, elastic member 27 and holding member 24 may be accommodated directly in the case 11.

[Dielectric Member 22]

Figure 8A:
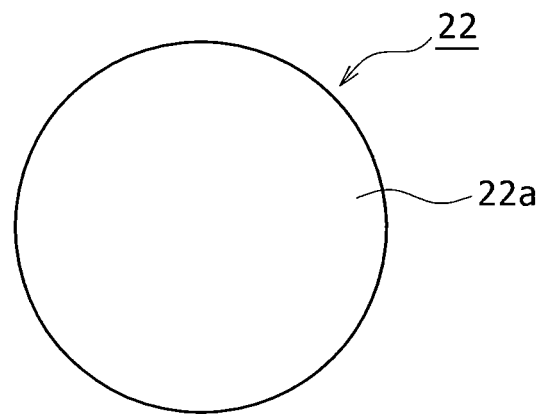
FIGS. 8A, 8B and 8C are a top plan view, a front elevational view and a bottom plan view showing a dielectric member of the variable capacitor of FIG. 3, respectively.
Figure 8B:
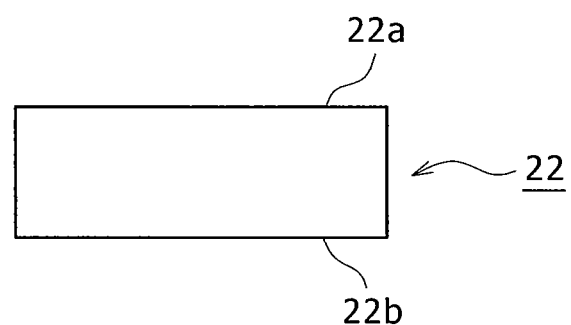
Figure 8C:
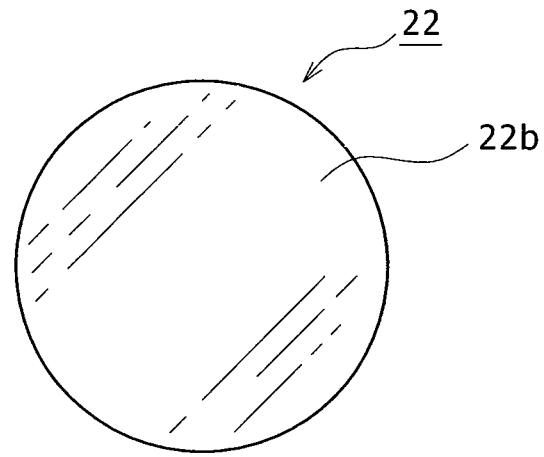

Now, the dielectric member 22 is described with reference to FIGS. 8A to 8C.

The dielectric member 22 is formed, for example, substantially in a disk shape. The dielectric member 22 has a first face portion 22a of a substantially circular shape, and a second face portion 22b of a substantially circular shape extending substantially in parallel to and opposite to the first face portion 22a. In the present example, the first face portion 22a and the second face portion 22b are both formed in a planar shape. Further, in the present example, the first face portion 22a does not have an electrode portion provided thereon; instead, the terminal member 23 serves additionally as an electrode portion. Still further, as seen in FIG. 8C, the second face portion 22b is formed as a mirror face, for example, by polishing the surface thereof.

As shown in FIG. 4, the dielectric member 22 is placed on the flange portion 31 with the second face portion 22b thereof directed to the second end side of the holder 21 in the axial direction. Further, the dielectric member 22 is biased toward the second end side of the holder 21 in the axial direction by the terminal member 23 when the dielectric member 22 is placed on the flange portion 31 of the holder 21. It is to be noted that the shape of the dielectric member 22 need not be a substantially disk shape and the dielectric member 22 may be formed as a flat plate of a substantially quadrangular prism or a hexagonal prism. Further, while in the embodiment described above the second face portion 22b is formed as a polished mirror face, such mirror face need not be applied to the second face portion 22b.

[Terminal Member 23]

Figure 9:
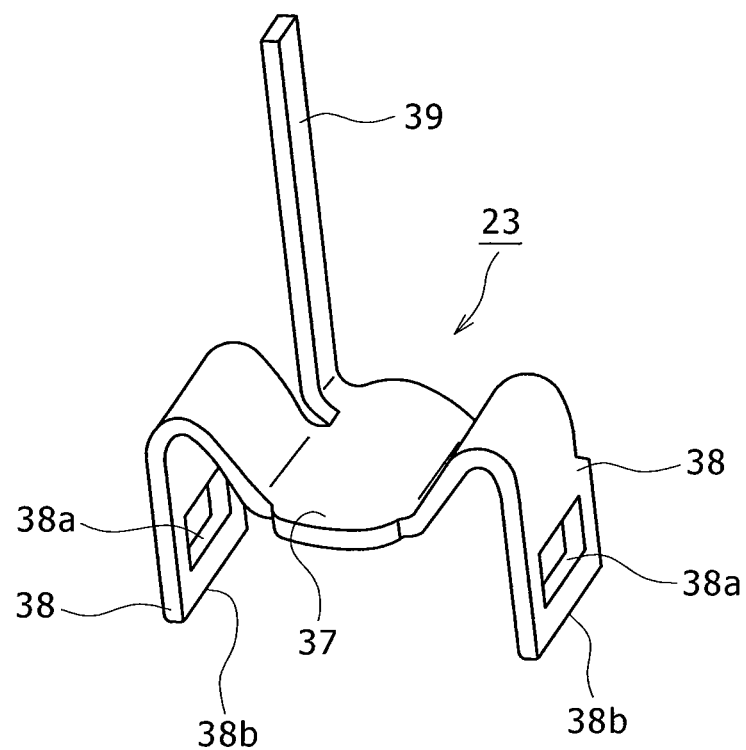
FIG. 9 is a perspective view showing a terminal member of the variable capacitor of FIG. 3.

FIG. 9 is a perspective view showing an appearance of the terminal member 23. Referring to FIG. 9, the terminal member 23 is made of a conductive metal material and has a flat portion 37 which is an example of a face portion that engages with the first face portion 22a of the dielectric member 22, two locking portions 38 formed continuously from the flat portion 37, and a lead piece 39 formed continuously from the flat portion 37. The flat portion 37 has a shape corresponding to the shape of the first face portion 22a of the dielectric member 22 and, since the first face portion 22a in the present example has a flat face, the flat portion 37 is formed substantially in the form of a flat plate.

The two locking portions 38 are formed in such a manner as to sandwich the flat portion 37 therebetween. The locking portions 38 have a substantially J shape. In the illustrated example, the left and right locking portions 38 of the flat portion 37 are provided by bending the flat portion 37 twice from outer edges of the flat portion 37. The two locking portions 38 provide elasticity to the terminal member 23 so that the flat portion 37 of the terminal member 23 is always biased elastically in a direction toward the end portions 38b of the locking portions 38. An opening 38a of a substantially quadrangular shape, for example, is provided at an end portion 38b of each of the locking portions 38.

The lead piece 39 is provided such that it projects in a direction opposite to the direction in which the end portions 38b of the locking portions 38 project. The lead piece 39 is connected to a contact portion (not shown) of the printed board 17 shown in FIG. 2, for example, by resistance welding, ultrasonic welding or the like. By such resistance welding or ultrasonic welding, the terminal member 23 is electrically connected to electronic parts on the printed board 17. It is to be noted that, as a material for the terminal member 23, for example, copper-titanium alloy plated with silver or the like is used.

As shown in FIGS. 3 and 4, the terminal member 23 is secured to the holder 21 by the locking receiving portions 33 of the holder 21 that are locked in the openings 38a of the two locking portions 38. At this time, the flat portion 37 of the terminal member 23 contacts the first face portion 22a of the dielectric member 22. The terminal member 23 has elasticity provided by the two locking portions 38, and the flat portion 37 contacts the first face portion 22a of the dielectric member 22 in such a state that the former is pressed against the latter. Since the flat portion 37 of the terminal member 23 has, in the present example, a flat face shape corresponding to the face shape of the first face portion 22a of the dielectric member 22, the flat portion 37 and the first face portion 22a of the dielectric member 22 contact each other without leaving a gap therebetween.

Consequently, the flat portion 37 of the terminal member 23 and the first face portion 22a of the dielectric member 22 can surely be in contact with each other. Further, since the terminal member 23 biases the dielectric member 22 toward the second end side in the axial direction of the holder 21 by its elasticity, it is possible to prevent or discourage the dielectric member 22 from being tilted (inclined) within the holder 21.

As described above, the terminal member 23 has two roles including a role of biasing the dielectric member 22 toward the holder 21 side and another role as an electrode terminal to be contacted with the first face portion 22a of the dielectric member 22 and connected to the printed board 17. It is to be noted that, while in the embodiment described above the terminal member 23 is formed as a single member, the flat portion 37 and locking portion 38 and the lead piece 39 may be formed as separate members from each other.

[Holding Member 24, Conductive Member 26 and Elastic Member 27]

Figure 10:
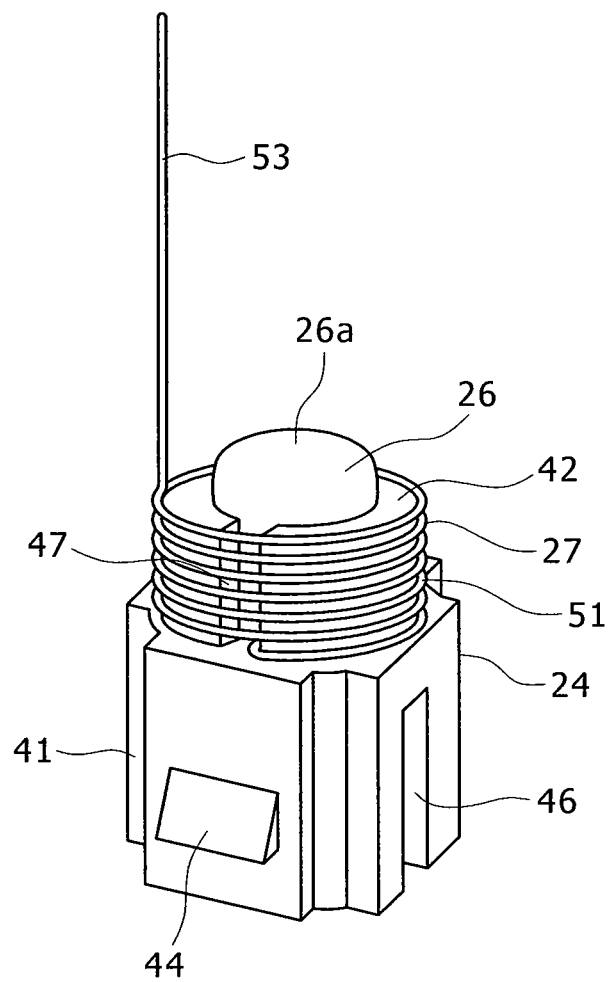
FIG. 10 is a perspective view showing a conductive member and the dielectric member of the variable capacitor of FIG. 3 attached to a holding member.
Figure 11A:
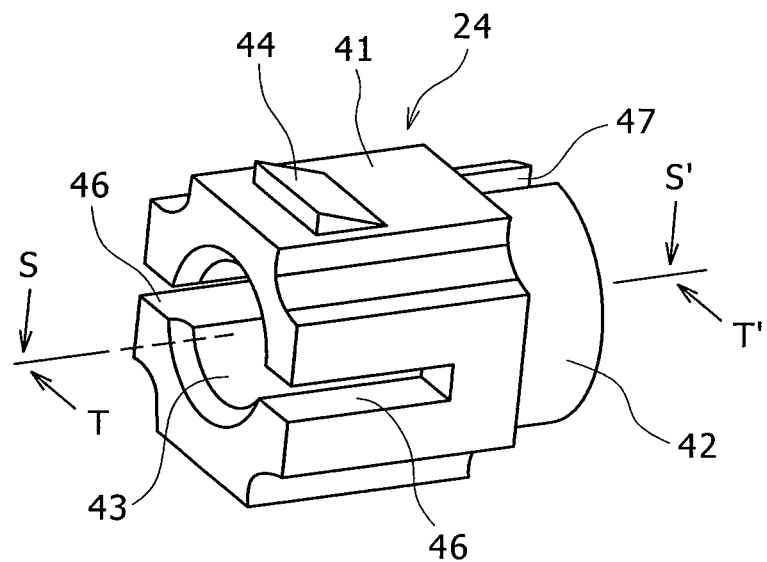
FIG. 11A is a perspective view of the holding member shown in FIG. 10.
Figure 11B:
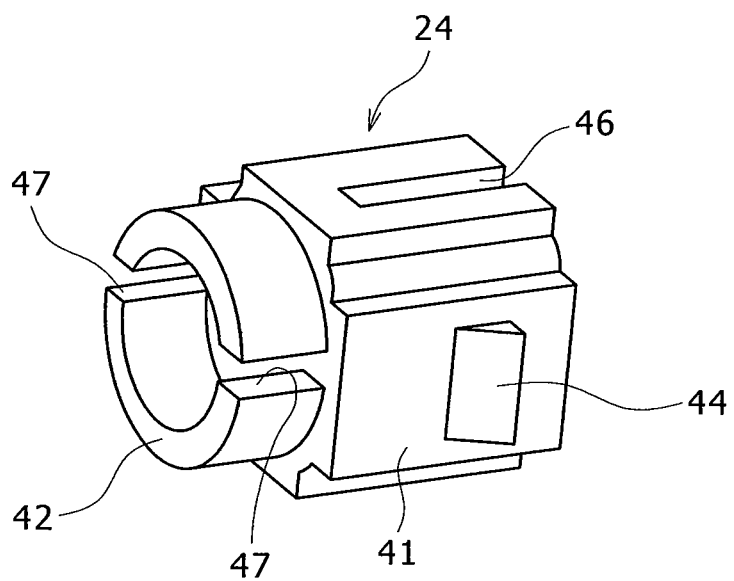
FIG. 11B is a perspective view of the holding member as viewed from the opposite side of FIG. 11A.
Figure 12A:
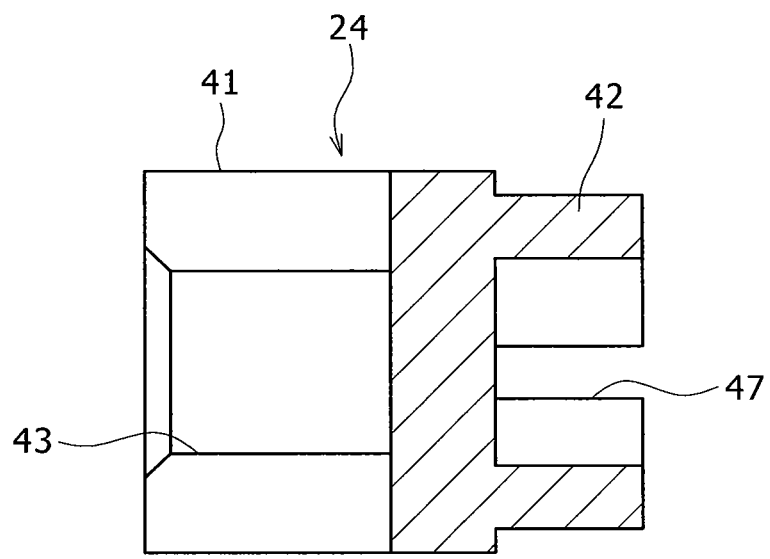
FIGS. 12A and 12B show the holding member shown in FIG. 10 and particularly
Figure 12B:
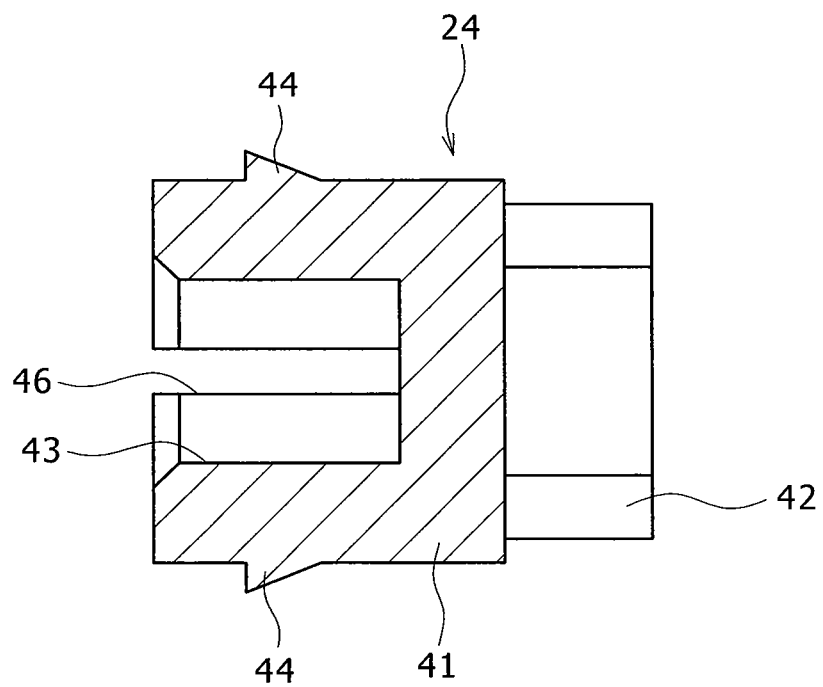

Next, the holding member 24, conductive member 26 and elastic member 27 are described with reference to FIGS. 10 to 17. FIG. 10 is a perspective view showing the conductive member 26 and the elastic member 27 held by the holding member 27. FIG. 11A is a perspective view of the holding member 24 and FIG. 11B is a perspective view showing the holding member 24 as viewed from the opposite side. Further, FIG. 12A is a sectional view of the holding member 24 taken along line S-S' of FIG. 11A and FIG. 12B is a sectional view of the holding member 24 taken along line T-T' of FIG. 11A.

[Holding Member 24]

Referring to FIGS. 10 to 12B, the holding member 24 has a base portion 41 substantially in the form of a square prism, and a substantially cylindrical fitting portion 42. An engaging concave portion 43 (see FIGS. 11A and 12A) is provided on the base portion 41 such that it is concave in a substantially cylindrical shape. As shown in FIG. 4, the other end of the stem portion 12b of the rod 12 in the axial direction is inserted in the engaging concave portion 43 so that the holding member 24 and the rod 12 are joined together. Further, two engaging portions 44 having a cross section of a substantially triangular shape are provided on two flat face portions opposite to each other on the side face portions of the base portion 41. The two engaging portions 44 are engaged with the two engaging holes 32 provided on the holder 21. Consequently, the holding member 24 is supported for movement along the axial direction of the holder 21.

Two slits 46 are provided on the base portion 41. The two slits 46 are formed by cutting away the base portion 41 over a predetermined length from one end to the other end side of the base portion 41 in the axial direction.

The fitting portion 42 defines a concave portion for receiving the conductive member 26, to thereby attach the conductive member 26 to the holding member 24. The fitting portion 42 is formed such that it projects to the other end side of the base portion 41. Two cutaway portions 47 are formed at the fitting portion 42 substantially at equal angular distances. The cutaway portions 47 are formed by cutting away the fitting portion 42 from one end of the fitting portion 42 in the axial direction to the base portion 41. The number of such cutaway portions 47 is not limited to two, but may be three or more, and the object of provision of the cutaway portions 47 can be achieved if at least one cutaway portion 47 is provided. The conductive member 26 is fitted in the fitting portion 42.

[Conductive Member 26]

Referring to FIGS. 4 and 10, the conductive member 26 is formed, for example, in the shape of a cannonball and has a curved face portion 26a at one end thereof in the axial direction. The conductive member 26 is fitted at a cylindrical portion 26b on the other end side thereof in the axial direction with the fitting portion 42 of the holding member 24. The diameter of the cylindrical portion 26b of the conductive member 26 is set, for example, slightly greater than the inner diameter of the fitting portion 42 of the holding member 24. Consequently, the fitting relationship between the conductive member 26 and the fitting portion 42 of the holding member 24 is set to a stationary (secure) fit relationship. As a result, the conductive member 26 can be prevented or discouraged from coming off of the fitting portion 42 of the holding member 24.

In the variable capacitor 15, as shown in FIG. 4, the curved face portion 26a formed on one end side of the conductive member 26 in the axis direction is disposed in an opposing relationship to the second face portion 22b of the dielectric member 22, and the conductive member 26 forms a second electrode portion of the variable capacitor 15.

As hereinafter described, the curved face portion 26a of the conductive material 26 and the second face portion 22b of the dielectric member 22 are initially spaced away from each other with an air layer interposed therebetween. However, when writing pressure is applied to the rod 12, the curved face portion 26a of the conductive material 26 and the second face portion 22b of the dielectric member 22 are brought into contact with each other.

The conductive member 26 is formed from an elastic member which has conductivity and is elastically deformable. As such an elastic material, for example, silicon conductive rubber or pressure sensitive conductive rubber (PCR) can be used. Where such an elastic member as just described is used for the conductive member 26, the contact area between the second face portion 22b of the dielectric member 22 and the conductive member 26 increases as the writing pressure or pressure applied to the rod 12 increases.

While in the embodiment described above the conductive member 26 is shaped such that the curved face portion 26a, which is one of end portions of the conductive member 26, is formed as a substantially semispherical shape, the shape of the conductive member is not limited to this specific shape. The conductive member 26 may be formed in any shape as long as the area thereof which opposes the first electrode portion increases as the writing pressure or pressure applied to the rod 12 increases.

Next, another form of the conductive member in the present example is described with reference to FIGS. 13 and 14A to 14C.

Figure 13:
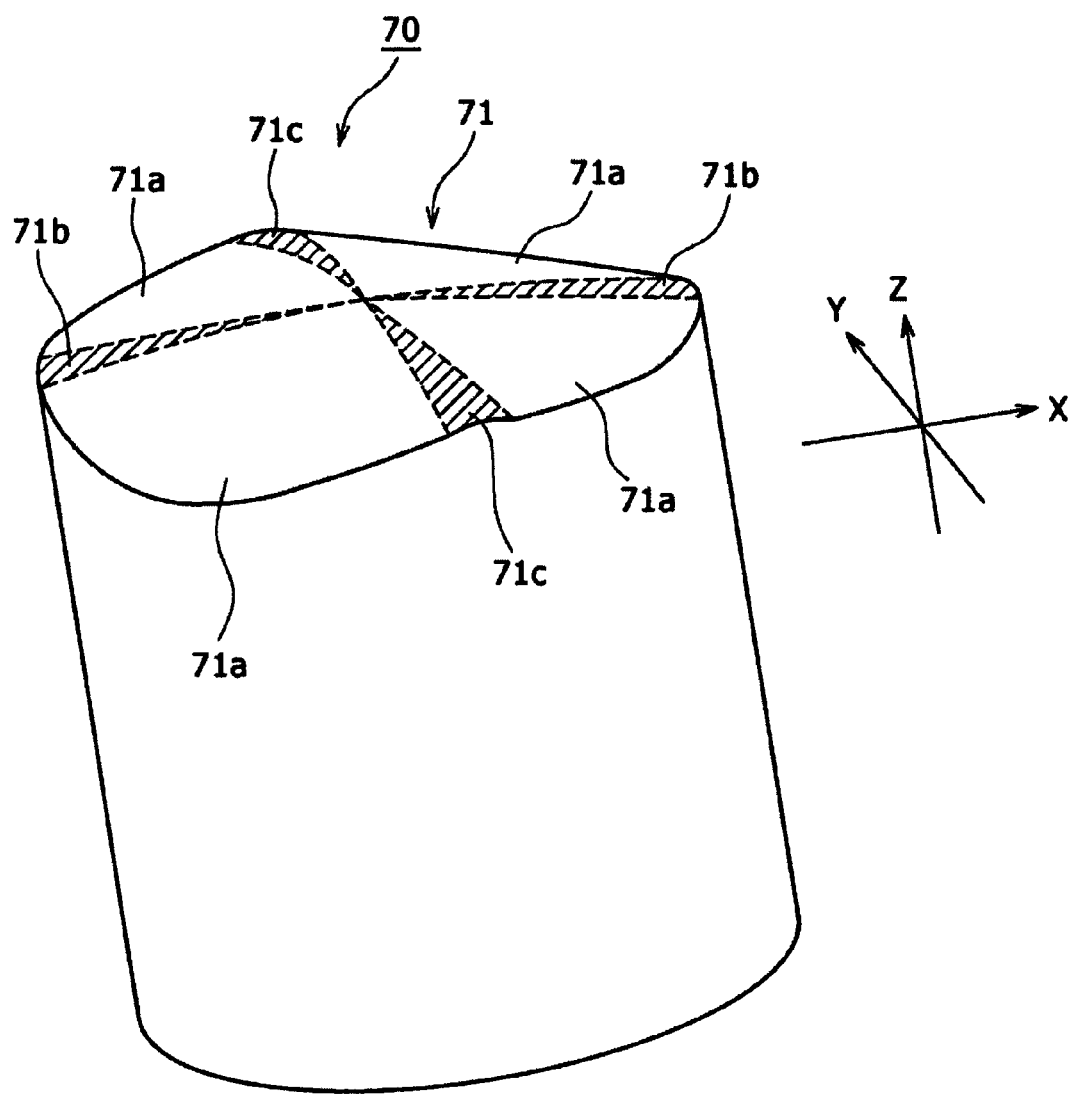
FIG. 13 is a perspective view showing another form of the conductor member of the variable capacitor of FIG. 3.
Figure 14A:
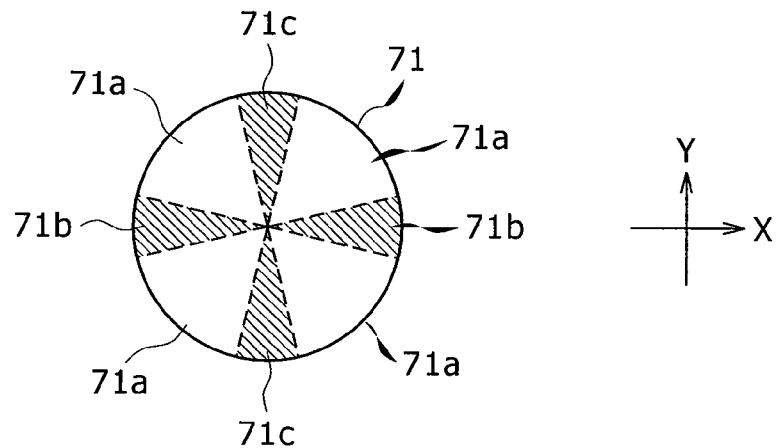
FIGS. 14A, 14B and 14C are a top plan view, a front elevational view and a left side elevational view showing the conductor member of FIG. 13, respectively.
Figure 14B:
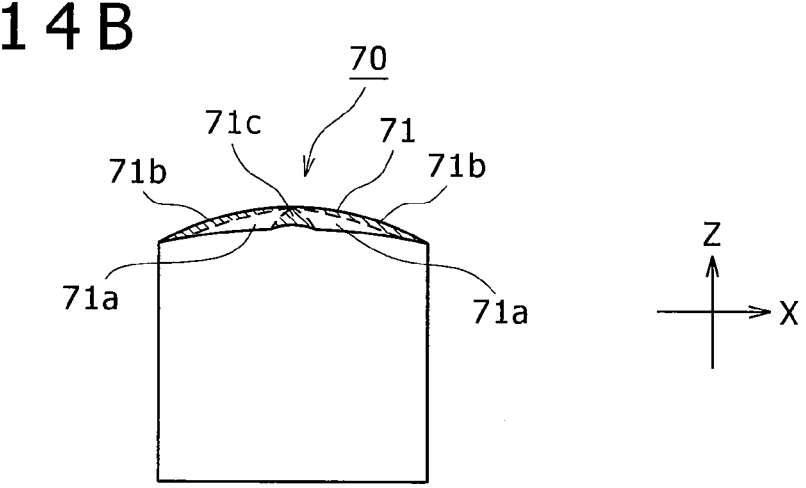
Figure 14C:
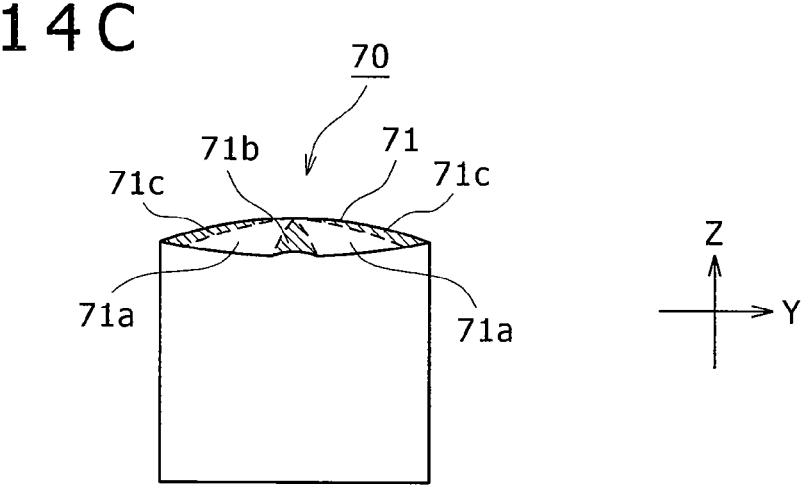

FIG. 13 is a perspective view showing another form of the conductive member, and FIGS. 14A, 14B and 14C are a top plan view, a front elevational view and a left side elevational view showing the conductive member of FIG. 13, respectively.

The conductive member 70 according to the present embodiment is formed in a substantially cylindrical shape and has, at one end thereof in its axial direction, a curved face portion 71 having three different radii of curvature. The curved face portion 71 has a first curved face 71a having a first radius Ra of curvature in a first direction X perpendicular to an axial direction Z of the conductive member 70. The first curved face 71a has a second radius Rb of curvature different from the first radius Ra of curvature in a second direction Y which is perpendicular to both the axial direction Z and the first direction X of the conductive member 70.

Further, the curved face portion 71 has second curved faces 71b formed along the first direction X passing the axis of the conductive member 70 and having the first radius Ra of curvature in the first direction X and a third radius Rc of curvature different from the first radius Ra of curvature and the second radius Rb of curvature in the second direction Y. Further, The curved face portion 71 has third curved faces 71c formed along the second direction Y passing the axis of the conductive member 70 and having the second radius Rb of curvature in the second direction Y and the third radius Rc of curvature in the first direction X. In other words, the second curved faces 71b is formed on an edge formed by the curved faces having the first radius Ra of curvature, and the third curved faces 71c are formed on an edge formed from the curved faces having the second radius Rb of curvature.

It is to be noted that the first radius Ra of curvature is set, for example, to 2 mm, and the second radius Rb of curvature is set, for example, to 4 mm. Further, the third radius Rc of curvature is set, for example, to 0.5 mm.

There is the possibility that the conductive member 26 formed in a substantially cannonball shape described above may not contact the second face portion 22b of the dielectric member 22 at the top portion of the curved face portion 26a due to variation among products or displacement introduced during assembly. However, with the conductive member 70 of the present form, even if variation among products occurs or displacement is introduced between the holding member 24 and the conductive member 70 upon assembly, the second curved face 71b or the third curved face 71c can be contacted with the second face portion 22b of the dielectric member 22 with certainty.

While, in the present form described above, one end of the conductive member 70 in the axial direction is formed such that the first radius Ra of curvature and the second radius Rb of curvature intersect at an angle of approximately 90°, the radii of curvature are not restricted to the specific example. For example, the first radius Ra of curvature and the second radius Rb of curvature may be formed from two different angular directions and an edge formed by the curved faces having the first radius Ra of curvature and an edge formed by the curved faces having the second radius Rb of curvature may be chamfered so as to be rounded. By this measure also, even if variation among products occurs or displacement is introduced between the holding member 24 and the conductive member 70 upon assembly, the second curved face or the third curved face can contact the second face portion 22b of the dielectric member 22, by point-contact, with certainty.

[Elastic Member 27]

Figure 15A:
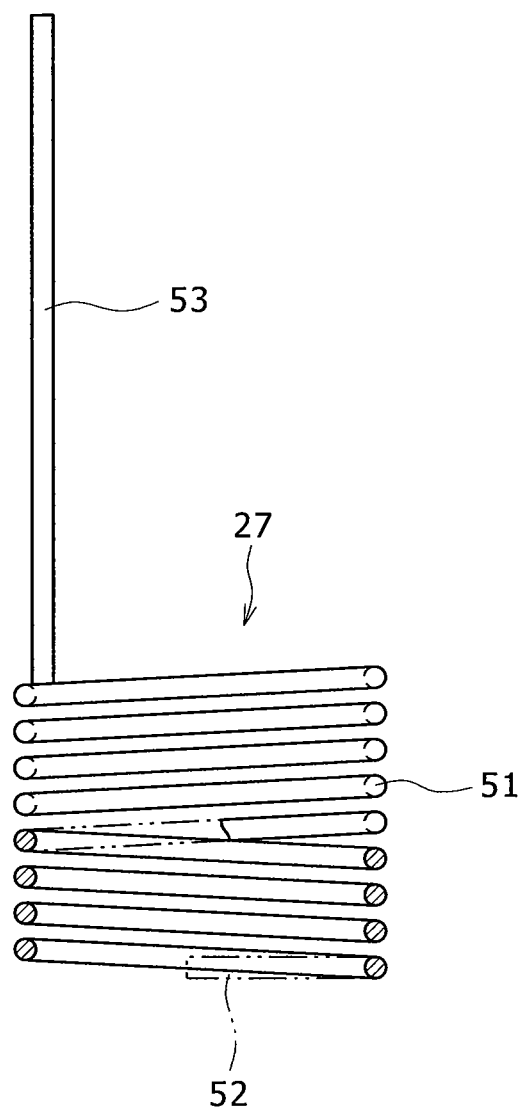
FIGS. 15A and 15B are a front elevational view and a top plan view of an elastic member of the variable capacitor of FIG. 3, respectively.
Figure 15B:
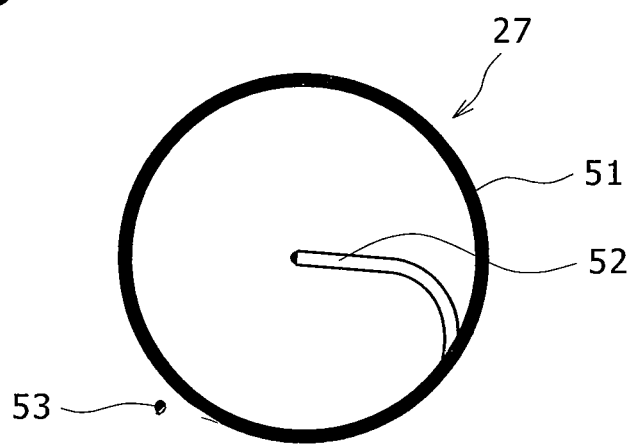

FIGS. 15A and 15B are a front elevational view and a top plan view of the elastic member 27, respectively. Referring to FIGS. 15A and 15B, the elastic member 27 is, for example, a coil spring having conductivity and has an elastic coiled portion 51, a terminal piece 53 provided at an end portion of the coiled portion 51, and a connecting portion 52 provided at the other end of the coiled portion 51.

The connecting portion 52 is formed by bending the other end portion of the coiled portion 51 substantially perpendicularly toward the inner side of the coiled portion 51 in a radial direction. The connecting portion 52 of the elastic member 27 is engaged with a cutaway portion 47 provided at the fitting portion 42 of the holding member 24 so as to attach the elastic member 27 to the holding member 24. As shown in FIGS. 4 and 10, the elastic member 27 is disposed such that, when it is attached to the holding member 24, the coiled portion 51 thereof covers an outer periphery of the conductive member 26, with the fitting portion 42 of the holding member 24 interposed therebetween. In this instance, the connecting portion 52 is interposed between the holding member 24 and the conductive member 26 and contacts the conductive member 26. Consequently, the elastic member 27 is electrically connected to the conductive member 26.

Meanwhile, the terminal piece 53 is formed by bending one end portion of the coiled portion 51 substantially perpendicularly with respect to the winding direction. As shown in FIG. 3, when the elastic member 27 is accommodated in the holder 21, the terminal piece 53 extends through the through-hole 34 provided in the holder 21 and projects to the first end side of the holder 21 in the axial direction. The terminal piece 53 is connected to a contact portion (not shown) of the printed board 17 as seen in FIG. 2, for example, by soldering, resistance welding or ultrasonic welding. By the connection by soldering, resistance welding or ultrasonic welding, the elastic member 27 is electrically connected to an electronic part of the printed board 17. As a material for the elastic member 27, a material having conductivity, for example, a metal material such as copper-titanium alloy or stainless steel is used.

As shown in FIG. 4, the conductive member 26 and the elastic member 27 are attached to the holding member 24 and accommodated in the tubular hole 21a of the holder 21. In this instance, the curved face portion 26a formed on the one end side of the conductive member 26 in the axial direction is opposed to the second face portion 22b of the dielectric member 22, and the conductive member 26 forms a second electrode section of the variable capacitor 15.

Figure 16:
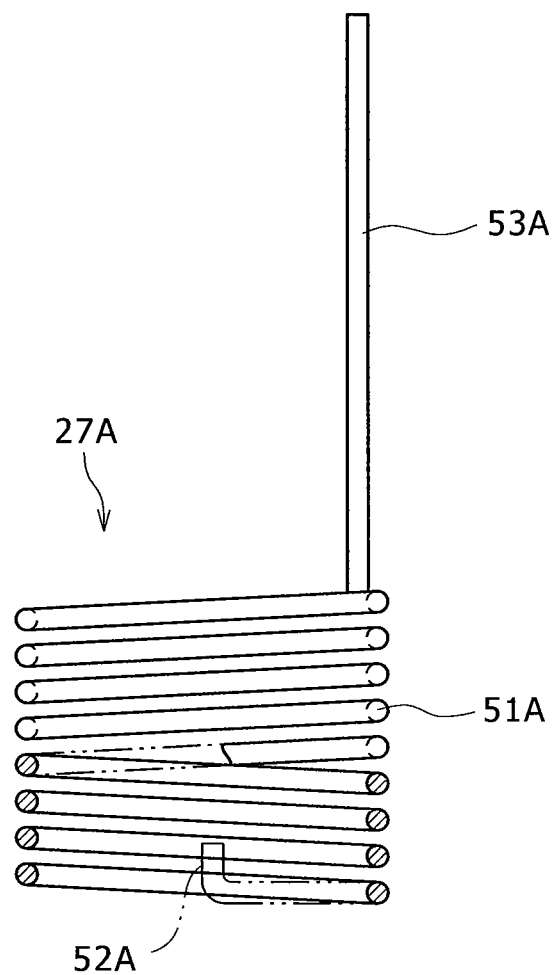
FIG. 16 is a front elevational view showing another form of the elastic member of the variable capacitor of FIG. 3.

FIG. 16 shows another example of the elastic member. The elastic member 27A according to the present example shown in FIG. 16 is formed by further bending the connecting portion 52A in the winding direction of the coiled portion 51. Consequently, when the elastic member 27A and the conductive member 26 are attached to the holding member 24, the connecting portion 52A penetrates the other end of the conductive member 26 in the axial direction. As a result, the conductive member 26 and the elastic member 27A can be connected to each other with certainty, and contact failure between the conductive member 26 and the elastic member 27A can be prevented.

[Assembly of the Variable Capacitor 15]

The variable capacitor 15 having a configuration as described above is assembled, for example, in the following manner. First, the conductive member 26 and the elastic member 27 are attached to the holding member 24 as seen in FIG. 10. In particular, the connecting portion 52 of the elastic member 27 is engaged with the cutaway portion 47 provided on the fitting portion 42 of the holding member 24 to mount the elastic member 27 on the holding member 24. At this time, the coiled portion 51 of the elastic member 27 is disposed such that it covers the outer periphery of the fitting portion 42 of the holding member 24. In this connection, the two cutaway portions 47 are provided on the fitting portion 42. Consequently, there is no necessity to take the directions of the connecting portion 52 of the elastic member 27 and the cutaway portions 47 of the holding member 24 into consideration in comparison with an alternative case wherein a single cutaway portion 47 is provided. Therefore, the elastic member 27 can be efficiently attached to the holding member 24.

Then, the conductive member 26 is fitted into the fitting portion 42 of the holding member 24. Here, since the fitting between the fitting portion 42 and the conductive member 26 is a stationary (secure) fit, it is possible to prevent the conductive member 26 from coming out of the holding member 24.

At this time, the connecting portion 52 of the elastic member 27 is interposed between the conductive member 26 and the holding member 24 and is contacted with the conductive member 26. Consequently, the conductive member 26 and the elastic member 27 are electrically connected to each other. Further, the elastic member 27 is disposed such that the coiled portion 51 thereof covers the outer periphery of the conductive member 26 with the fitting portion 42 of the holding member 24 interposed therebetween. Consequently, a first assembly including the conductive member 26, elastic member 27 and holding member 24 is completed.

Then, as shown in FIG. 4, the dielectric member 22 is inserted into the holder 21 from the first end side of the holder 21 in the axial direction with the second face portion 22b thereof directed toward the second end side of the holder 21 in the axial direction, and is placed on the flange portion 31 of the holder 21. Then, the terminal member 23 is attached to the holder 21. In particular, the two locking portions 38 of the terminal member 23 are locked to the two locking receiving portions 33 of the holder 21. At this time, the flat portion 37 of the terminal member 23 is contacted with the first face portion 22a of the dielectric member 22 by face contact. Based on this contact, the flat portion 37 of the terminal member 23 plays a role of a first electrode on the first face portion 22a side of the dielectric member 22.

The two locking portions 38 of the terminal member 23 have elasticity and bias the flat portion 37 toward the first face portion 22a side of the dielectric member 22. Consequently, the flat portion 37 of the terminal member 23 is placed into a state wherein it is pressed against and contacts the first face portion 22a of the dielectric member 22 with certainty.

Accordingly, in the present embodiment, though an electrode is not separately formed on the first face portion 22a of the dielectric member 22, the terminal member 23 can be used additionally as an electrode. Therefore, a step of forming an electrode on the first face portion 22a of the dielectric member 22 can be omitted. Further, since the flat portion 37 of the terminal member 23 is in a state wherein it is normally biased elastically toward and contacts the first face portion 22a of the dielectric member 22, the problem that an electrode formed on the dielectric member 22 is abraded by contact, particularly by point contact, due to collision with the terminal member 23 can be eliminated.

Further, since the dielectric member 22 is biased toward the second end side of the holder 21 in the axial direction by the elasticity of the terminal member 23, it can be prevented from coming off of the holder 21. Further, the dielectric member 22 can be prevented or discouraged from being inclined (tilted) in the holder 21, and the dielectric member 22 and the conductive member 26 can contact each other in a well-balanced state without any tilt. Consequently, a second assembly including the holder 21, dielectric member 22 and terminal member 23 is completed.

Then, the first assembly is inserted into the holder 21 from the second end side of the holder 21 in the axial direction. At this time, the terminal piece 53 of the elastic member 27 is projected from the first end side of the holder 21 in the axial direction through the through-hole 34 of the holder 21 shown in FIGS. 7A and 7B. Then, the two engaging portions 44 of the holding member 24 which forms the first assembly are engaged with the two engaging holes 32 of the holder 21. Here, since the two engaging holes 32 are open across a predetermined length along the axial direction of the holder 21, the holding member 24 is supported for movement on the holder 21 along the axial direction. At this time, the curved face portion 26a of the conductive member 26 is positioned in the proximity of the second face portion 22b of the dielectric member 22.

Further, when the engaging portions 44 of the holding member 24 are engaged with the engaging holes 32 of the holder 21, the coiled portion 51 of the elastic member 27 is contacted with the other end side of the flange portion 31 in the axial direction of the holder 21.

At this time, the coiled portion 51 of the elastic member 27 is interposed in a slightly compressed state between the holding member 24 and the flange portion 31 of the holder 21. Consequently, the conductive member 26 is normally biased by the elastic member 27 in a direction in which it is spaced away from the dielectric member 22. Therefore, in an initial state wherein no pressure or writing pressure is applied to the rod 12, even if the orientation of the variable capacitor 15 is reversed such that the conductive member 26 is positioned upwardly (above the dielectric member 22), the conductive member 26 and the dielectric member 22 can be prevented or discouraged from contacting each other. As a result, since the conductive member 26 and the dielectric member 22 can be prevented or discouraged from sticking to each other, deterioration of the conductive member 26 or the dielectric member 22 can be prevented and the durability of the variable capacitor 15 can be improved.

The assembly of such a variable capacitor 15 as shown in FIGS. 3 and 4 is completed in such a manner as described above. It is to be noted that the assembly of the variable capacitor 15 is not limited to that specifically described above. In particular, either one of assembly of the first assembly and assembly of the second assembly may be carried out first.

[Operation of the Variable Capacitor 15]

Figure 17:
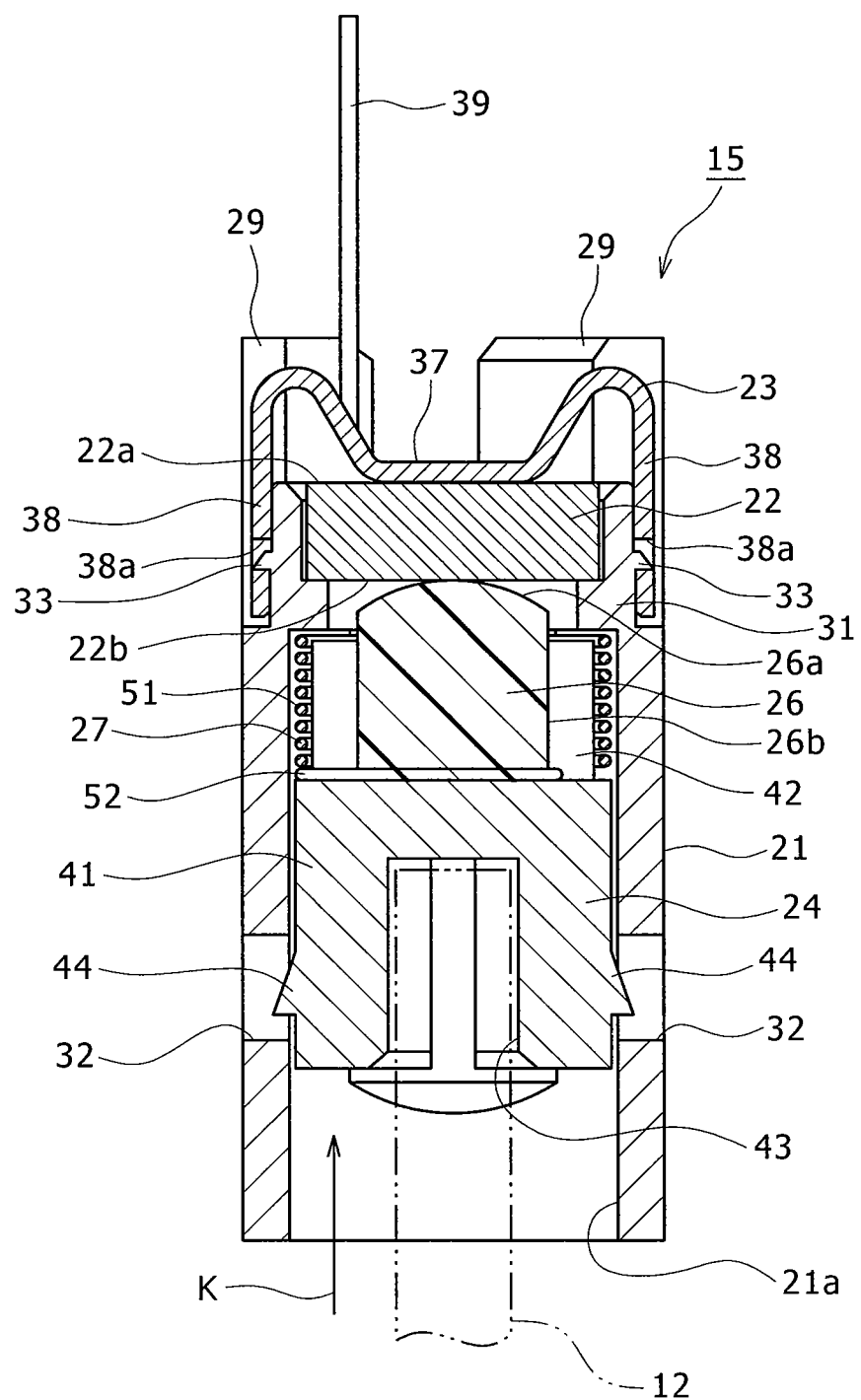
FIG. 17 is a sectional view of the variable capacitor of FIG. 3 in a state wherein pressure (writing pressure) is applied to a rod.

Next, operation of the variable capacitor 15 of the present form is described with reference to FIGS. 2, 4 and 17. FIG. 17 is a sectional view of the variable capacitor 15 in a state wherein pressure or writing pressure is applied to the rod 12.

If pressure or writing pressure is applied to the pointing portion 12a of the rod 12 in the direction indicated by an arrow mark K shown in FIG. 17, then the holding member 24 of the variable capacitor 15 is pressed by the other end of the stem portion 12b of the rod 12. Consequently, the holding member 24 moves to the first end side of the holder 21 in the axial direction in the tubular hole 21a of the holder 21. Then, the curved face portion 26a of the conductive member 26 is brought into contact with the second face portion 22b of the dielectric member 22 to form a second electrode section. If a further pressure is applied to the pointing portion 12a of the rod 12, then the conductive member 26 is further pressed and deformed into a flattened state by the second face portion 22b of the dielectric member 22. As a result, the contact area between the conductive member 26 and the second face portion 22b varies (increases), and the capacitance value of the dielectric member 22 varies. Then, the capacitance value is detected between the terminal member 23 and the elastic member 27. Consequently, the pressure applied to the pointing portion 12a can be detected.

In the state wherein no pressure or writing pressure is applied to the rod 12 as illustrated in FIG. 4, that is, in the initial state, the conductive member 26 is physically spaced from the second face portion 22b of the dielectric member 22 and does not contact the second face portion 22b. Accordingly, an air layer exists between the curved face portion 26a of the conductive member 26 and the second face portion 22b of the dielectric member 22. Therefore, the capacitance value between the first electrode, that is, the terminal member 23, on the first face portion 22a side of the dielectric member 22, and the second electrode portion, that is, the initial capacitance value, is substantially equal to a series combined capacitance of a capacitance provided by the dielectric member 22 and a capacitance provided by the air layer having a relative dielectric constant of 1.0 and is significantly low.

If pressure is applied to the rod 12, then the thickness of the air layer between the conductive member 26 and the second face portion 22b of the dielectric member 22 decreases from that in the initial state. Consequently, the capacitance by the air layer increases in inverse proportion to the thickness of the air layer and also the combined capacitance value between the first and second electrodes of the variable capacitor 15 increases as much.

If the pressure applied to the rod 12 increases until the curved face portion 26a of the conductive member 26 is brought into contact with the second face portion 22b of the dielectric member 22 as seen in FIG. 17, then at the contact location, only the capacitance provided by the dielectric member 22 remains. Then, if the pressing force applied to the rod 12 further increases, then since the relative dielectric constant of the dielectric member 22 is higher than that of the air, the capacitance value of the first and second electrodes of the variable capacitor 15 increases substantially in proportion to the contact area between the dielectric member 22 and the curved face portion 26a of the conductive member 26.

Accordingly, the capacitance of the variable capacitor 15 is very low before the curved face portion 26a of the conductive member 26 is brought into contact with the second face portion 22b of the dielectric member 22, and becomes higher as the thickness of the air layer between the curved face portion 26a of the conductive member 26 and the second face portion 22b of the dielectric member 22 gradually decreases due to the writing pressure. Then, after the curved face portion 26a of the conductive member 26 is brought into contact with the second face portion 22b of the dielectric member 22, the capacitance of the variable capacitor 15 increases in proportion to the contact area between the curved face portion 26a of the conductive member 26 and the second face portion 22b of the dielectric member 22.

At this time, the increasing change of the capacitance value of the variable capacitor 15 depends upon the polishing accuracy of the second face portion 22b of the dielectric member 22. Since, in the present embodiment, the second face portion 22b of the dielectric member 22 is in a mirror finished state, the capacitance value of the variable capacitor 15 exhibits an increasing change that is in correct proportion to the contact area.

Here, the elastic force of the elastic member 27 is set so as to be lower than the pressure or writing pressure to be applied to the rod 12 so that the elastic force of the elastic member 27 will not influence the writing pressure characteristic to be detected by the variable capacitor 15. Further, the second face portion 22b of the dielectric member 22 is in a mirror finished state. Therefore, wear and tear of the conductive member 26 by repetitive contact between the second face portion 22b of the dielectric member 22 and the conductive member 26 can be reduced. Furthermore, since the second face portion 22b has a flat smooth face by mirror finish, the variable capacitor 15 has an improved initial sensitivity.

Then, if the pressure to the pointing portion 12a of the rod 12 is removed, the holding member 24 moves toward the second end side of the holder 21 in the axial direction in the tubular hole 21a of the holder 21 as seen in FIG. 4 by the elastic force of the elastic member 27 and the restoring force of the curved face portion 26a of the conductive member 26. Then, the conductive member 26 is spaced away from the second face portion 22b of the dielectric member 22.

Further, even if the pointing portion 12a of the rod 12 is directed upwardly, the elastic force of the elastic member 27 can prevent the holding member 24 from being moved to the dielectric member 22 side in the holder 21 by the rod 12 or the weight of the holding member 24 itself. As a result, it is possible to prevent the conductive member 26 and the dielectric member 22 from contacting each other when no pressure is applied to the rod 12.

Further, the two engaging portions 44 are provided on the holding member 24, and the two engaging holes 32 with which the two engaging portions 44 are engaged are provided on the holder 21. As a result, the engaging portions 44 are contacted with the other (second) end side of the engaging holes 32 of the holder 21 in the axial direction, and consequently, the holding member 24 can be prevented from coming off of the holder 21.

[Circuit Configuration of the Position Detection Apparatus]

Figure 18:
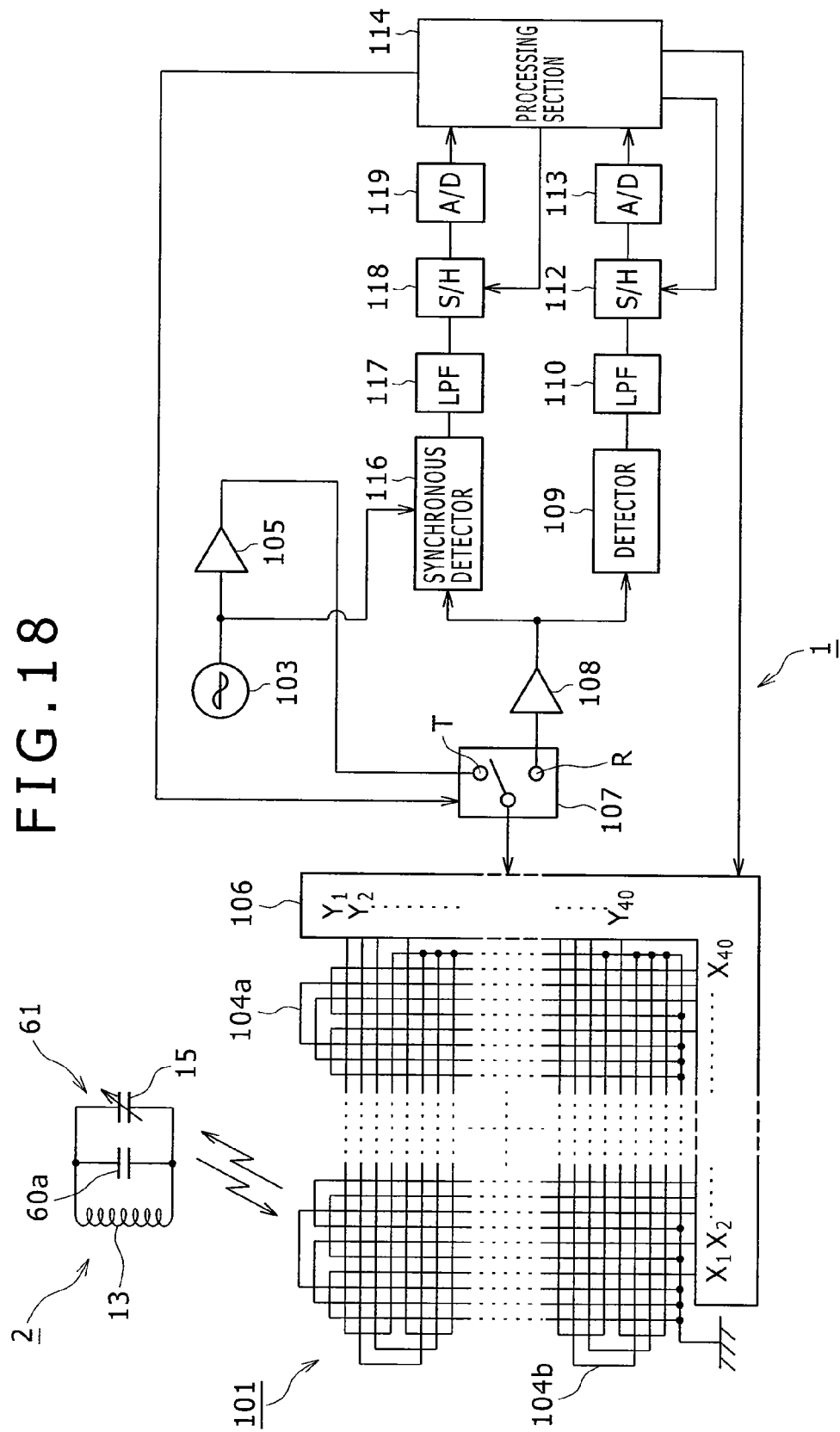
FIG. 18 is a schematic block diagram showing a circuit configuration of a position pointer and a position detection apparatus to which the present invention is applied.

Next, an example of a circuit configuration of a particular form of the position detection apparatus 1 which carries out detection of a pointed position and detection of writing pressure using the position pointer 2 of the form described hereinabove is described with reference to FIG. 18. FIG. 18 shows an example of a circuit configuration of the position pointer 2 and the position detection apparatus 1. An inputting apparatus is configured from the position pointer 2 and the position detection apparatus 1.

The position pointer 2 is represented by a resonance circuit 61 which includes, as circuit components thereof, the position indicating coil 13, the variable capacitor 15 connected to the position indicating coil 13, and a resonance capacitor 60a connected in parallel to the variable capacitor 15.

Meanwhile, the position detection apparatus 1 includes an X-axis direction loop coil group 104a and a Y-axis direction loop coil group 104b provided in a laminated state to form a position detection coil 101. The loop coil groups 104a and 104b are each formed from 40 rectangular loop coils. The loop coils of each of the loop coil groups 104a and 104b are disposed in an equidistantly spaced juxtaposed relationship and in a successively superposed relationship with each other.

Further, the position detection apparatus 1 includes a selection circuit 106 to which the X-axis direction loop coil group 104a and the Y-axis direction loop coil group 104b are connected. The selection circuit 106 successively selects, for example, a loop coil of one of the two loop coil groups 104a and 104b.

The position detection apparatus 1 further includes an oscillator 103, a current driver 105, a connection switching circuit 107, a reception amplifier 108, a detector 109, a low-pass filter 110, a sample hold circuit 112, an A/D conversion circuit 113, a synchronous detector 116, another low-pass filter 117, another sample hold circuit 118, another A/D conversion circuit 119 and a processing section 114.

The oscillator 103 generates an AC signal of a frequency f0 and supplies the generated AC signal to the current driver 105 and the synchronous detector 116. The current driver 105 converts the AC signal supplied thereto from the oscillator 103 into current and delivers the current to the connection switching circuit 107. The connection switching circuit 107 switches the connection destination to which a loop coil selected by the selection circuit 106 is to be connected between a transmission side terminal T and a reception side terminal R under the control of the processing section 114 hereinafter described. Of the transmission side terminal T and the reception side terminal R (i.e. the connection destinations), the transmission side terminal T is connected to the current driver 105 and the reception side terminal R is connected to the reception amplifier 108.

The induced voltage generated in the loop coil selected by the selection circuit 106 is sent to the reception amplifier 108 through the selection circuit 106 and the connection switching circuit 107. The reception amplifier 108 amplifies the induced voltage supplied thereto from the loop coil and signals a resulting voltage to the detector 109 and the synchronous detector 116.

The detector 109 detects the induced voltage generated in the loop coil, that is, a reception signal, and signals the detected signal to the low-pass filter 110. The low-pass filter 110 has a cutoff frequency sufficiently lower than the frequency f0 mentioned hereinabove and converts the output signal of the detector 109 into a DC signal and then signals the DC signal to the sample hold circuit 112. The sample hold circuit 112 holds a voltage value of the output signal of the low-pass filter 110 at a predetermined timing, particularly at a predetermined timing during the receiving period, and signals the held voltage value to the analog to digital (A/D) conversion circuit 113. The A/D conversion circuit 113 converts an analog output of the sample hold circuit 112 into a digital signal and outputs the digital signal to the processing section 114.

On the other hand, the synchronous detector 116 synchronously detects the output signal of the reception amplifier 108 with the AC signal from the oscillator 103 and outputs a signal having a level corresponding to the phase difference between the output signal of the reception amplifier 108 and the AC signal from the oscillator 103 to the low-pass filter 117. The low-pass filter 117 has a cutoff frequency sufficiently lower than the frequency f0, and converts the output signal of the synchronous detector 116 into a DC signal and signals the DC signal to the sample hold circuit 118. The sample hold circuit 118 holds a voltage value of the output signal of the low-pass filter 117 at a predetermined timing and signals the held voltage value to the analog to digital (A/D) conversion circuit 119. The A/D conversion circuit 119 converts an analog output of the sample hold circuit 118 into a digital signal and outputs the digital signal to the processing section 114.

The processing section 114 controls the components of the position detection apparatus 1. In particular, the processing section 114 controls selection of a loop coil by the selection circuit 106, operation of the connection switching circuit 107 and timings of the sample hold circuits 112 and 118. The processing section 114 controls the X-axis direction loop coil group 104a and the Y-axis direction loop coil group 104b to transmit radio waves for a fixed transmission continuation time period based on the input signals from the A/D conversion circuits 113 and 119.

In each of the loop coils of the X-axis direction loop coil group 104a and the Y-axis direction loop coil group 104b, an induced voltage is generated from radio waves transmitted from the position pointer 2. The processing section 114 calculates coordinate values of pointing positions of the position pointer 2 in the X-axis direction and the Y-axis direction based on the voltage values of the induced voltages generated in the loop coils. Further, the processing section 114 detects a writing pressure based on a phase difference between a transmitted radio wave and a corresponding received radio wave.

Figure 19:
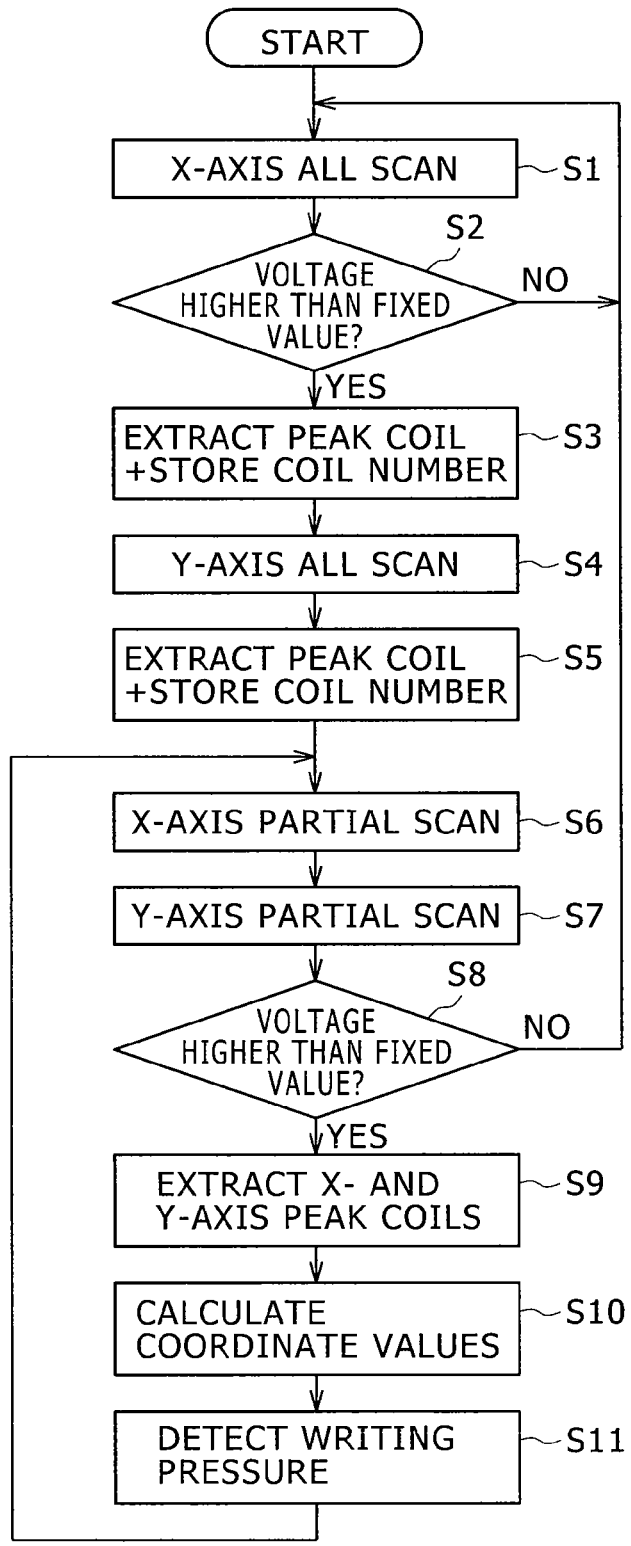
FIG. 19 is a flow chart of processing by a processing section of the position detection apparatus shown in FIG. 18.

Next, operation of the position detection apparatus 1 under the control of the processing section 114 is described with reference to FIG. 19. FIG. 19 illustrates a flow of processing by the processing section 114.

First at step S1, the processing section 114 successively scans and selects the loop coils of the X-axis direction loop coil group 104a at step S1 (such successive scanning and selection is hereinafter referred to as all scanning).

The all scanning is described particularly. The processing section 114 first signals information for selecting a first coil, for example, a loop coil X1, of the X-axis direction loop coil group 104a to the selection circuit 106 and outputs a signal for selecting the transmission side to the connection switching circuit 107. Consequently, a sine wave signal of the frequency f0 is supplied from the oscillator 103 to the loop coil X1, and the loop coil X1 generates a radio wave of the frequency f0. At this time, if the position pointer 2 is positioned in the proximity of or in contact with the top face of the position detection apparatus 1, then a radio wave generated from the loop coil X1 excites the resonance circuit 61 having the position indicating coil 13. As a result, an induced voltage of the frequency f0 is generated in the resonance circuit 61.

After the processing section 114 outputs a signal for selecting the transmission side terminal T to the connection switching circuit 107 for a fixed period of time, it outputs a signal for selecting the reception side terminal R to the connection switching circuit 107 so that the radio wave to be generated from the loop coil X1 is extinguished. Thereupon, the induced voltage generated in the resonance circuit 61, which has the resonance capacitor 60a and the variable capacitor 15 of the position pointer 2, gradually attenuates in response to the loss thereof, and the resonance circuit 61 generates a radio wave of the frequency f0. This radio wave reversely excites the loop coil X1 described above so that an induced voltage is generated in the loop coil X1.

After the processing section 114 outputs the signal for selecting the reception side terminal R to the connection switching circuit 107 for the fixed period of time, it signals information for selecting a second loop coil, for example, a loop coil X2, of the X-axis direction loop coil group 104a to the selection circuit 106. Thereafter, the processing section 114 outputs a signal for selecting the reception side terminal R to the connection switching circuit 107 so that transmission and reception of a radio wave similar to that described above is carried out.

Thereafter, the processing section 114 executes similar processing to successively scan and select the third to fortieth loop coils, for example, the loop coils X3 to X40, of the X-axis direction loop coil group 104a. As a result, transmission and reception of a radio wave is carried out by the loop coils X3 to X40.

It is to be noted that, in the processing at step S1, the processing section 114 need not select all loop coils of the X-axis direction loop coil group 104a but may suitably sample out the loop coils to be selected such that it selects every other one of the loop coils or every third one of the loop coils. Further, transmission and reception of a radio wave to and from one loop coil may be carried out a plural number of times. Furthermore, although the transmission time periods for the loop coils must be the same and the reception time periods for the loop coils must be the same, the transmission time period and the reception time period need not be equal to each other.

The induced voltage generated in each loop coil of the X-axis direction loop coil group 104a during the reception period described above, that is, the reception signal, is detected and converted into a DC signal by the detector 109 and then smoothed by the low-pass filter 110. Then, the reception signal is held at a predetermined timing by the sample hold circuit 112 and converted by the A/D conversion circuit 113 into a digital value, which is signaled as a voltage value to the processing section 114.

Figure 20:
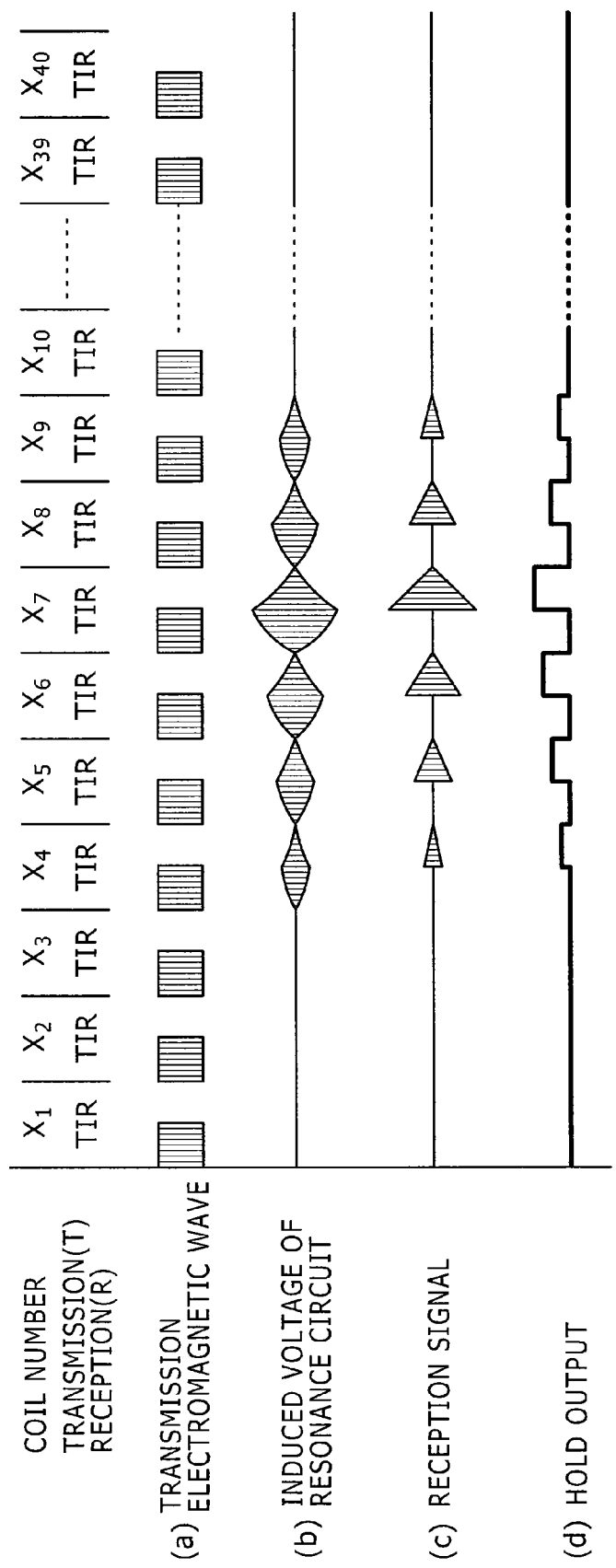
FIG. 20 is a waveform diagram illustrating an example of waveforms of components of the position detection apparatus shown in FIG. 18 when the position detection apparatus carries out X-axis all scanning operation.

FIG. 20 illustrates an example of waveforms at several components of the position detection apparatus 1 in the X-axis all scanning at step S1 of FIG. 19 described hereinabove. Referring to FIG. 20, a waveform (a) represents a radio wave transmitted from the position detection coil 101; a waveform (b) represents an induced voltage generated in the resonance circuit 61; a waveform (c) represents a reception signal received by the position detection apparatus 1; and a waveform (d) represents an output signal of the sample hold circuit 112.

The output level of the sample hold circuit 112 has a value which depends upon the distance between the position pointer 2 and the loop coil. Therefore, the processing section 114 determines whether or not the maximum value of the output level of the sample hold circuit 112 is higher than a fixed value set in advance at step S2, to thereby decide whether or not the position pointer 2 is within an effective reading height of the position detection apparatus 1.

If it is decided by the processing at step S2 that the maximum value of the output level of the sample hold circuit 112 is not higher than the fixed value set in advance, that is, the position pointer 2 is not within the effective reading height ("NO" at step S2), then the processing section 114 returns its processing to step S1.

On the other hand, if it is decided at step S2 that the position pointer 2 is within the effective reading height ("YES" at step S2), then the processing section 114 extracts that loop coil (hereinafter referred to as a peak coil) at which the maximum value is obtained from among the loop coils X1 to X40 and stores the index number of the peak coil (in the present example, "X7") at step S3.

Then at step S4, the processing section 114 successively scans and selects (all scanning) the loop coils of the Y-axis direction loop coil group 104b and carries out transmission and reception of radio waves of the loop coils of the Y-axis direction loop coil group 104b.

Figure 21:
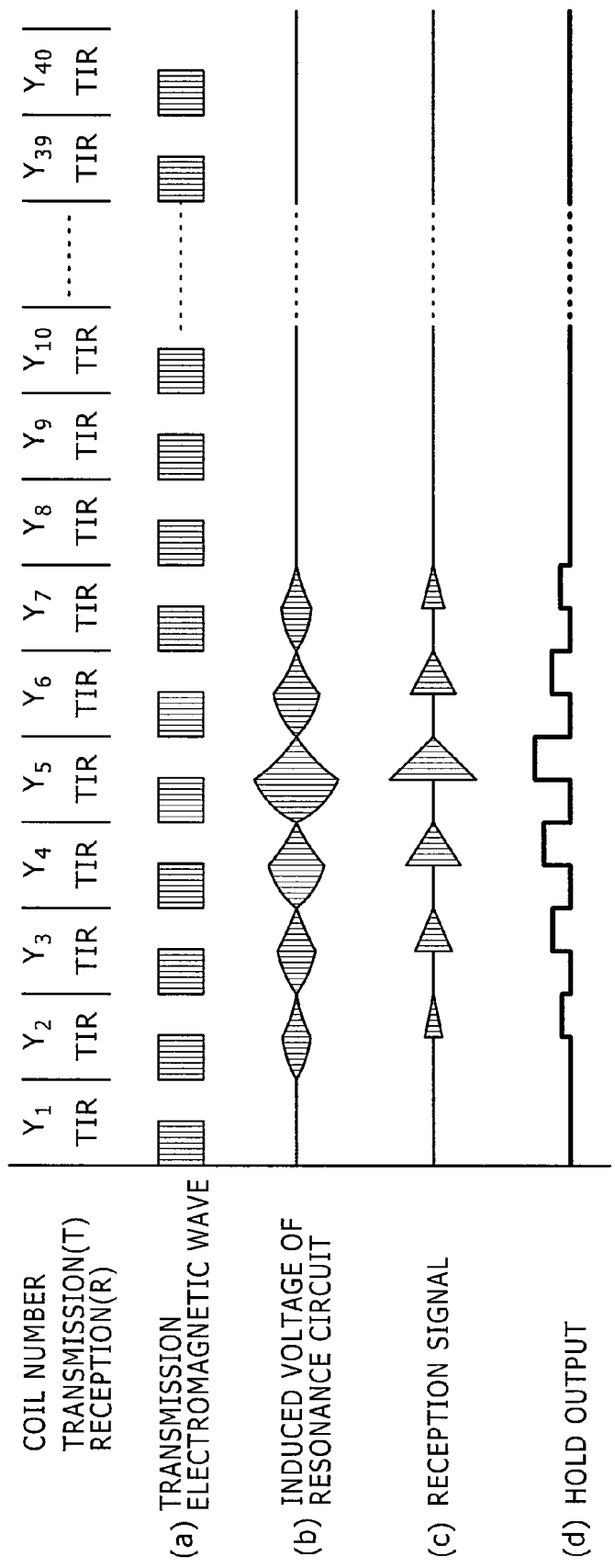
FIG. 21 is a waveform diagram illustrating an example of waveforms of the components of the position detection apparatus shown in FIG. 18 when the position detection apparatus carries out Y-axis all scanning operation.

FIG. 21 illustrates an example of waveforms of several components of the position detection apparatus 1 in the Y-axis all scanning operation. Referring to FIG. 21, signals of waveforms (a), (b), (c) and (d) are similar to those of the waveforms (a), (b), (c) and (d) of FIG. 20, respectively.

Then, the processing section 114 extracts that loop coil (hereinafter referred to as a peak coil) from which a maximum value is obtained from among the loop coils Y1 to Y40 and stores the index number of the extracted loop coil (in the present example, "Y5") at step S5.

Then, the processing section 114 carries out transmission and reception of a radio wave to and from a predetermined number of loop coils, for example, five loop coils, adjacent and around the peak coil, selected from within the X-axis direction loop coil group 104a. In the transmission and reception of a radio wave, when a radio wave is transmitted, that is, when the transmission side terminal T is selected by the connection switching circuit 107, the processing section 114 always selects the peak coil (in the present example, the "loop coil X7"). On the other hand, when a radio wave is received, that is, when the reception side terminal R is selected by the connection switching circuit 107, the processing section 114 successively scans and selects (partial scanning) the loop coils (in the present example, five loop coils) in the ascending order of the index number (or in the descending order) at step S6.

When the X-axis partial scanning operation comes to an end, the processing section 114 carries out transmission and reception of a radio wave to and from a predetermined number of, for example, five, loop coils around the peak coil from within the Y-axis direction loop coil group 104b. In the transmission and reception of a radio wave, when a radio wave is transmitted, that is, when the transmission side terminal T is selected by the connection switching circuit 107, the processing section 114 always selects the peak coil (in the present example, the "loop coil Y5"). On the other hand, when a radio wave is received, that is, when the reception side terminal R is selected by the connection switching circuit 107, the processing section 114 successively scans and selects (partial scanning) the loop coils (in the present example, five loop coils) in the ascending order of the index number (or in the descending order).

Figure 22:
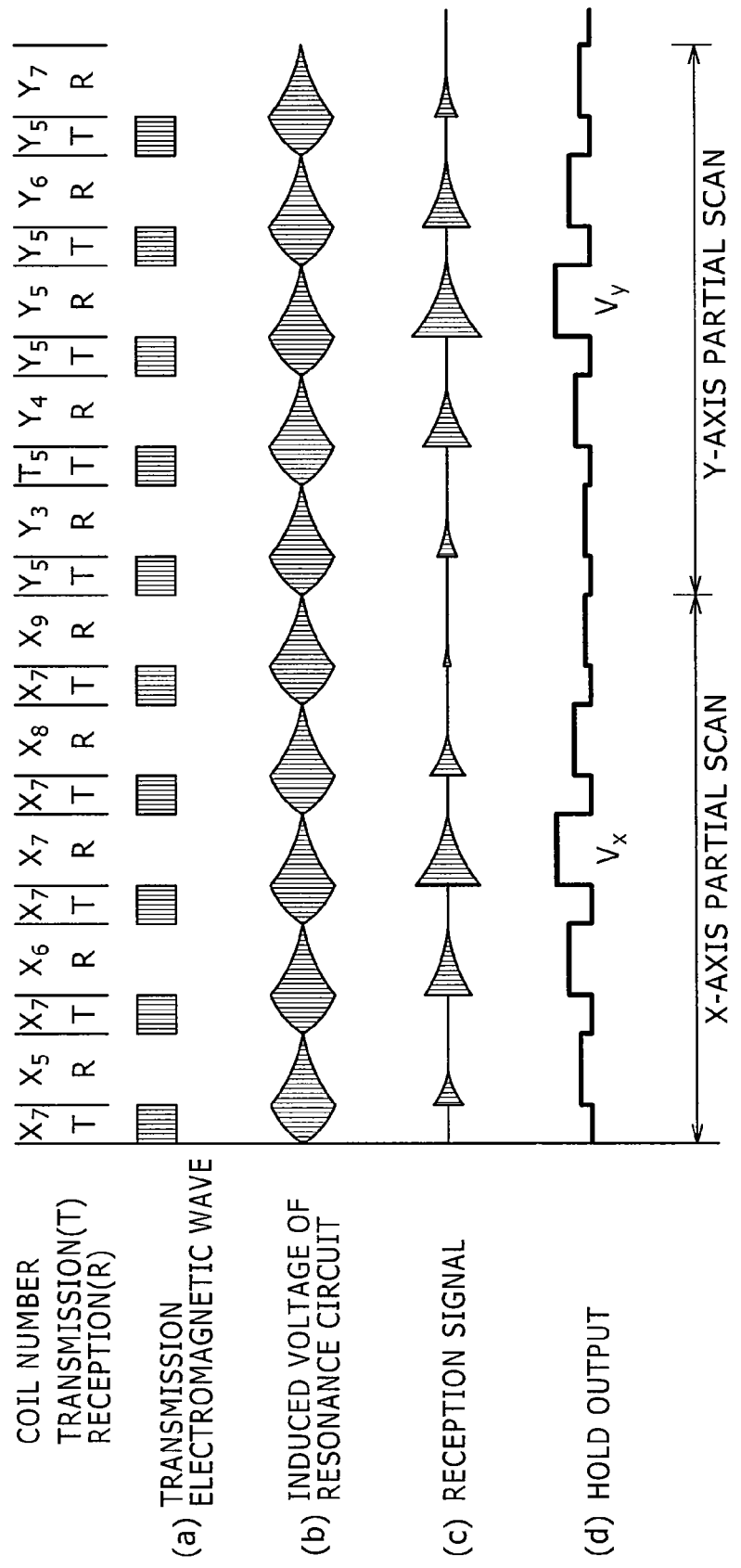
FIG. 22 is a waveform diagram illustrating an example of waveforms of the components of the position detection apparatus shown in FIG. 18 when the position detection apparatus carries out X-axis partial scanning operation and Y-axis partial scanning operation.

FIG. 22 illustrates an example of waveforms at the several components of the position detection apparatus 1 in the X-axis partial scanning operation and the Y-axis partial scanning operation. Referring to FIG. 22, signals represented by waveforms (a), (b), (c) and (d) are similar to the waveforms (a), (b), (c) and (d) of FIG. 20, respectively.

When the Y-axis partial scanning operation comes to an end, the processing section 114 decides at step S8 whether or not the maximum values of the induced voltage obtained by the processing at steps S6 and S7 are higher than fixed values set in advance to determine whether or not the position pointer 2 is within the effective reading height of the position detection apparatus 1.

If it is decided in the processing at step S8 that the maximum value of the output level of the sample hold circuit 112 is not higher than the fixed value set in advance, that is, the position pointer 2 is not within the effective reading height ("NO" at step S8), then the processing section 114 returns to the processing to step S1.

On the other hand, if it is decided at step S8 that the position pointer 2 is within the effective reading height ("YES" at step S8), then the processing section 114 extracts the peak coil in the X-axis direction and the peak coil in the Y-axis direction with which the maximum induced voltages are obtained and stores the index numbers of the peak coils at step S9.

Then at step S10, the processing section 114 extracts a plurality of, for example, three, induced voltages in the descending order of the level for every partial scanning in the X-axis direction and the Y-axis direction and determines coordinate values in the X-axis direction and the Y-axis direction of the position pointed to by the position pointer 2 based on the extracted signals. The coordinate values in the X-axis direction and the Y-axis direction can be calculated by executing such well-known coordinate calculation as disclosed in Japanese Patent No. 2,131,145 commonly assigned as the present invention.

Then at step S11, the processing section 114 calculates the writing pressure from the level of the signal corresponding to the phase difference between the transmitted radio wave and the received radio wave. Thereafter, as long as the position pointer 2 remains within the effective reading height, the processing section 114 repeats the processing at steps S6 to S11, but if the processing section 114 determines that the position pointer 2 is not within the effective reading height, then the processing section 114 returns to the processing to step S1.

In this manner, in the position detection apparatus 1, the position of the position pointer 2 positioned in the proximity of the position detection apparatus 1 can be detected by the processing section 114. Furthermore, by detecting the phase of the received signal, the position detection apparatus 1 can acquire information of the writing pressure value of the position pointer 2.

[Detection Accuracy of the Writing Pressure (Pressure) of the Position Pointer 2]

As described hereinabove, the variable capacitor 15 forms the writing pressure detection section of the position pointer. Next, the detection accuracy of the writing pressure (pressure) by the variable capacitor 15 of the position pointer according to the embodiment described above as compared to that of a conventional variable capacitor is described with reference to FIGS. 23A and 23B.

Figure 23A:
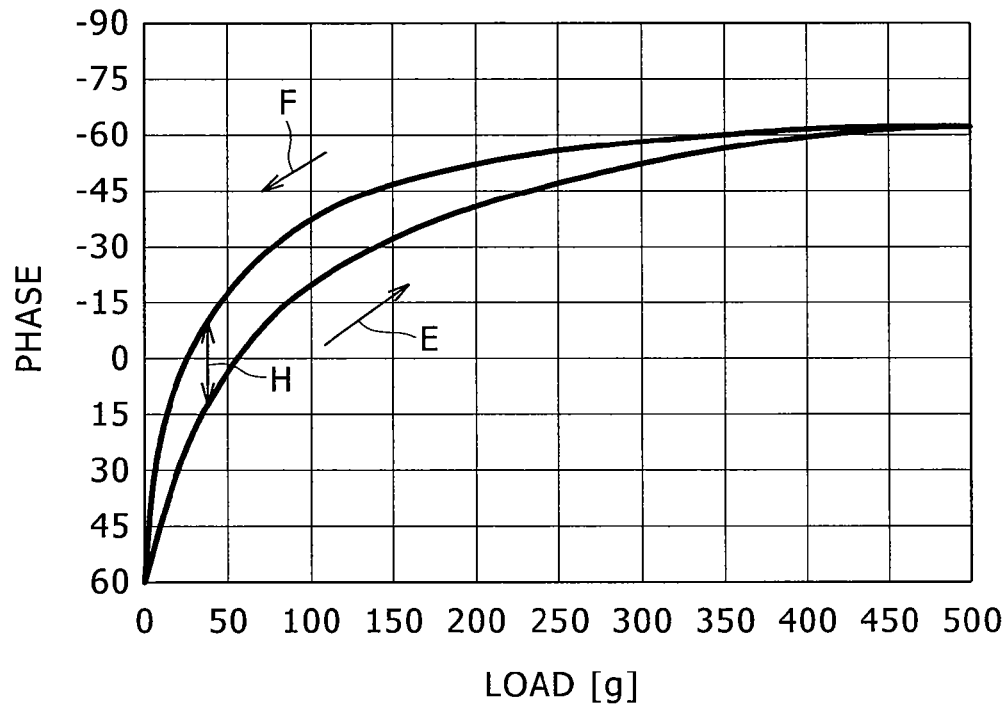
FIG. 23A is a graph illustrating a phase-load characteristic of the variable capacitor of FIG. 3
Figure 23B:
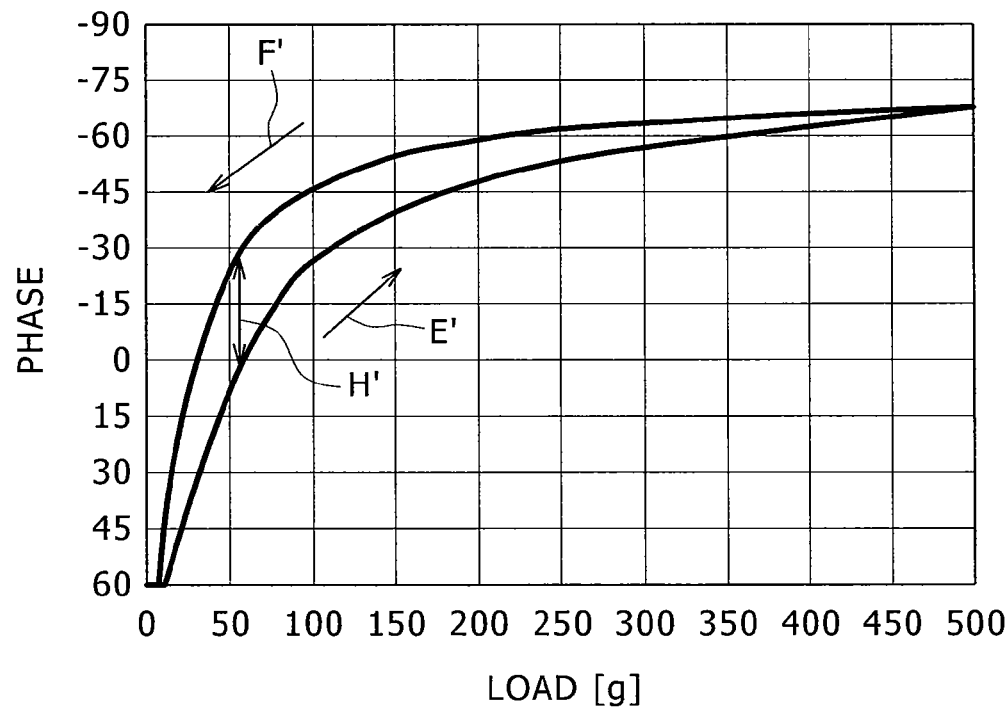
FIG. 23B is a similar graph but illustrating a phase-load characteristic of a conventional variable capacitor shown in FIGS. 41A and 41B.

FIGS. 23A and 23B are graphs indicating the phase-load characteristic of the variable capacitors where the load applied to the rod 12 is indicated by the axis of abscissa and the phase, particularly, the phase difference between a transmitted radio wave and a received radio wave, is indicated by the axis of ordinate. In particular, FIG. 23A illustrates the phase-load characteristic of the variable capacitor 15 in the embodiment described hereinabove and FIG. 23B illustrates the phase-load characteristic of the conventional variable capacitor described hereinabove with reference to FIGS. 41A and 41B.

In the variable capacitor 15 according to the present invention, the second face portion 22b of the dielectric member 22 is in a mirror finished state and the contacting portion of the conductive member 26 is formed in a curved face. As a result, a very low load or pressure of 1 g can be detected as seen in FIG. 23A. Further, the elastic force of the elastic member 27 is set to less than 1 g which is much lower than the pressure or writing pressure to be applied to the rod 12 so that the elastic force of the elastic member 27 will not influence the writing pressure characteristic. In contrast, as seen in FIG. 23B, the conventional variable capacitor has an insensitive region of 10 g to 20 g and cannot detect a very low pressure applied to the rod.

Further, the conventional variable capacitor 200 does not have a structure for spacing the second electrode 203 away from the dielectric member 201. Further, it can be seen in FIG. 23B that, if a load is applied, then the phase varies as indicated by a curve represented by an arrow mark E', but if the load is removed, then the phase varies as indicated by the curve represented by another arrow mark F'. As seen in FIG. 23B, a greater hysteresis is exhibited, and the phase difference represented by an arrow mark H' between when a certain load is applied and not applied (i.e., removed) is great. As a result, it is difficult (for a user) to control the writing pressure, and when the variable capacitor is incorporated in a position pointer, the user experience in writing or feeling the pen pressure is rather poor.

In contrast, in the variable capacitor 15 according to the embodiment described hereinabove, the conductive member 26 is biased in a direction away from the dielectric member 22 by the elastic force of the elastic member 27 and the restoring force of the curved face portion 26a of the conductive member 26. Further, it can be seen from FIG. 23A that, if a load is applied, then the phase varies as indicated by a curve represented by an arrow mark E, and if the load is removed, then the phase varies as indicated by the curve represented by an arrow mark F. As seen in FIG. 23A, the hysteresis can be reduced from that of the conventional variable capacitor 200, and the phase difference represented by the arrow mark H' between when a certain load is applied and not applied (i.e., removed) can be reduced. As a result, a user can better control the writing pressure, and where the variable capacitor 15 is incorporated in the position pointer 2, the user experience in writing or feeling the pen pressure is improved using the position pointer.

[Different Example of the Position Pointer]

Figure 24:
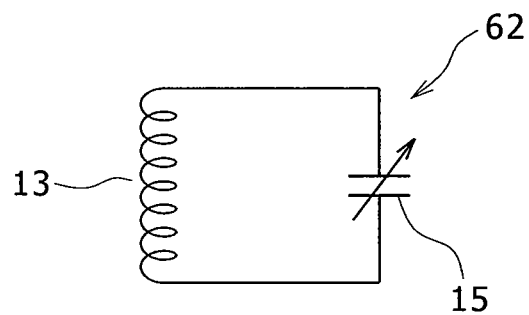
FIG. 24 is an electric circuit diagram showing another form of a resonance circuit provided in the position pointer of FIG. 18.

FIG. 24 shows a different example of the resonance circuit provided in the position pointer 2. Referring to FIG. 24, the resonance circuit 62 of the present example includes the position indicating coil 13 and the variable capacitor 15. In the resonance circuit 61 shown in FIG. 18, which is the first example of the resonance circuit, the variable capacitor 15 and the resonance capacitor 60a are connected in parallel to form a parallel resonance circuit. However, the resonance circuit of the position pointer 2 can also be formed with only the variable capacitor 15 as a capacitor, as seen in FIG. 24.

Figure 25:
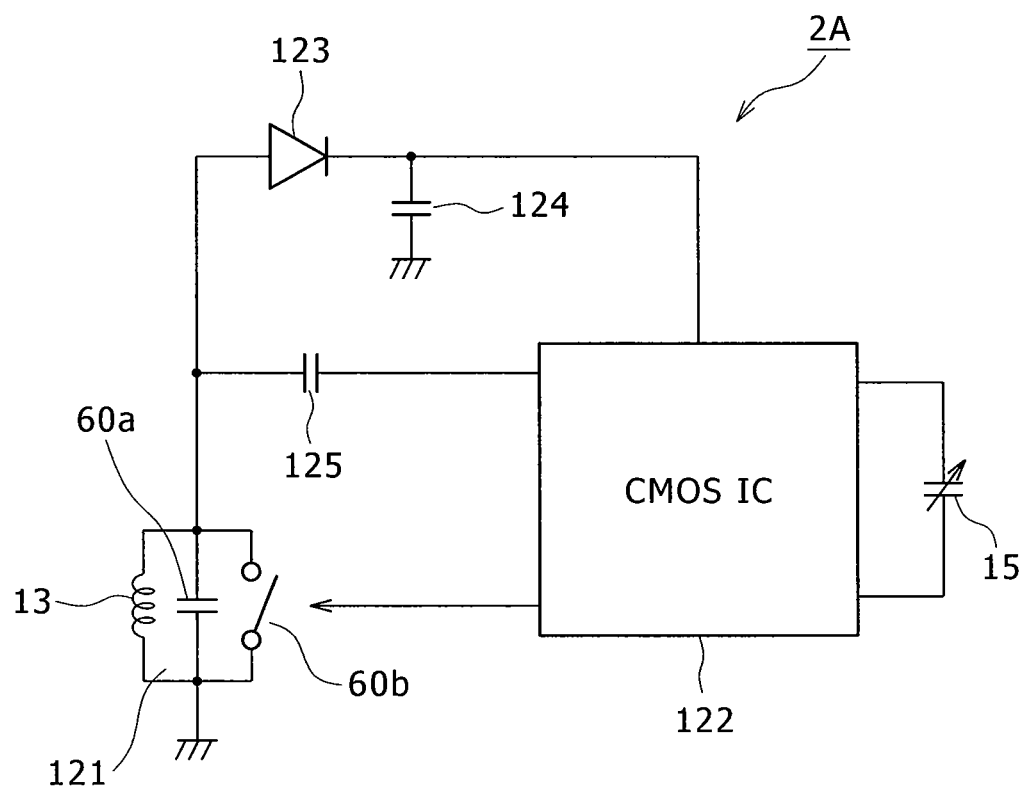
FIG. 25 is an electric circuit diagram of a further position pointer to which the present invention is applied.

Next, a different example of the position pointer is described with reference to FIG. 25. FIG. 25 shows an electric circuit of the position pointer 2A of the different example.

The position pointer 2A includes a resonance circuit 121 which resonates with a frequency f0 signaled from a position detection coil 101 (see FIG. 18) provided in the position detection apparatus 1. The resonance circuit 121 includes a position indicating coil 13 and a resonance capacitor 60a. Further, an integrated circuit (IC) 122 according to the known CMOS (Complementary Metal Oxide Semiconductor) technique is disposed on a circuit board of the position pointer 2A. The integrated circuit 122 is driven by a driving power supply from a diode 123 and a capacitor 124.

The diode 123 is connected to the resonance circuit 121. An AC voltage generated in the resonance circuit 121 based on an excitation signal supplied from the position detection coil 101 is applied to the diode 123. This AC voltage is rectified and converted into DC current by the diode 123 and the capacitor 124, and supplied as a driving power supply to the integrated circuit 122. Further, the signal generated in the resonance circuit 121 is supplied also to the integrated circuit 122 through a capacitor 125. The integrated circuit 122 generates a clock signal to be used for carrying out transfer of signals between the position pointer 2A and the position detection apparatus 1 and a clock signal for detection of the writing pressure based on the signal supplied through the capacitor 125.

The capacitance of the variable capacitor 15 varies in response to the writing pressure applied to the rod 12 (see FIG. 2) as described hereinabove. The variable capacitor 15 is connected to a resistor (not shown) to form a time constant circuit. Accordingly, when the capacitance of the variable capacitor 15 varies in response to the writing pressure, the time constant of the time constant circuit varies. The time constant is converted into a writing pressure value of a predetermined number of bits, for example, of 8 bits, by the integrated circuit 122.

The writing pressure data, that is, the writing pressure value of 8 bits determined in this manner, is output one by one bit from the integrated circuit 122 in synchronism with the clock signal used for transfer of a signal between the position detection apparatus 1 and the position pointer 2A. The output of the integrated circuit 122 is used to control switching between ON and OFF of the switch 60b connected in parallel to the resonance circuit 121. Accordingly, when the switch 60b is off, the position detection apparatus 1 detects a signal from the position pointer 2A. However, when the switch 60b is on, since the resonance circuit 121 is short-circuited, the position detection apparatus 1 cannot detect a signal output from the position pointer 2A.

Consequently, the position detection apparatus 1 transmits an excitation signal for supplying power to the position pointer 2A for a fixed period of time from the position detection coil 101 and thereafter detects a signal output from the position pointer 2A to determine the writing pressure applied to the rod 12.

Second Embodiment

Figure 26:
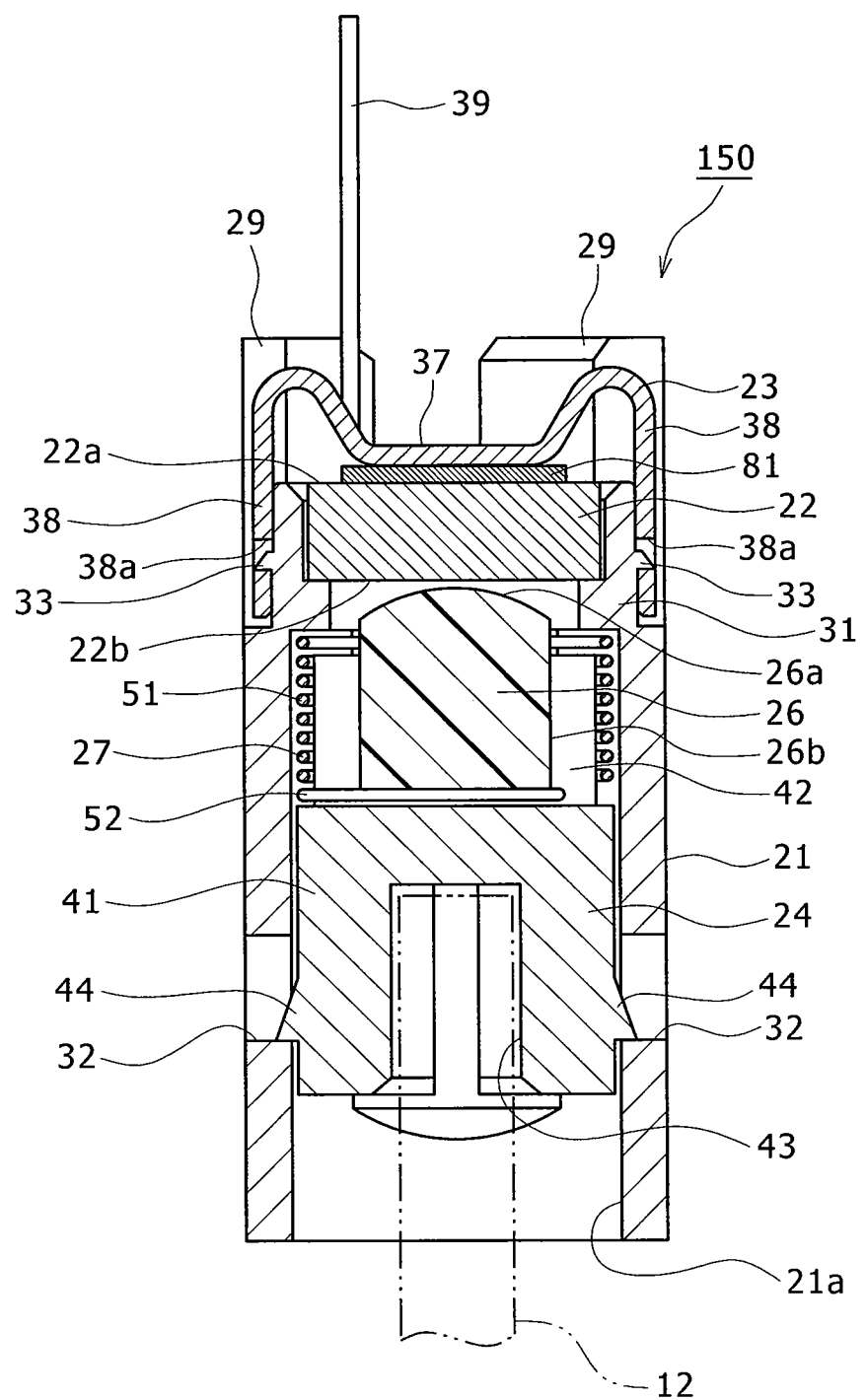
FIG. 26 is a sectional view of a variable capacitor according to a second embodiment of the present invention.

A variable capacitor for a position pointer according to a second embodiment of the present invention is similar in configuration to that according to the first embodiment described hereinabove except the configuration of the contacting portion between the flat portion 37 of the terminal member 23 and the first face portion 22a of the dielectric member 22. FIG. 26 shows a configuration of the variable capacitor 150 of the position pointer according to the second embodiment. It is to be noted that overlapping description of components of the variable capacitor 150 common to those of the variable capacitor 15 are omitted herein to avoid redundancy.

Referring to FIG. 26, in the present second embodiment, the flat portion 37 of the terminal member 23 provided on the first face portion 22a side of the dielectric member 22 does not directly contact the first face portion 22a of the dielectric member 22. Instead, a conductive elastic member 81 made of, for example, a conductive rubber material is interposed between the flat portion 37 of the terminal member 23 and the first face portion 22a of the dielectric member 22.

Figure 27:
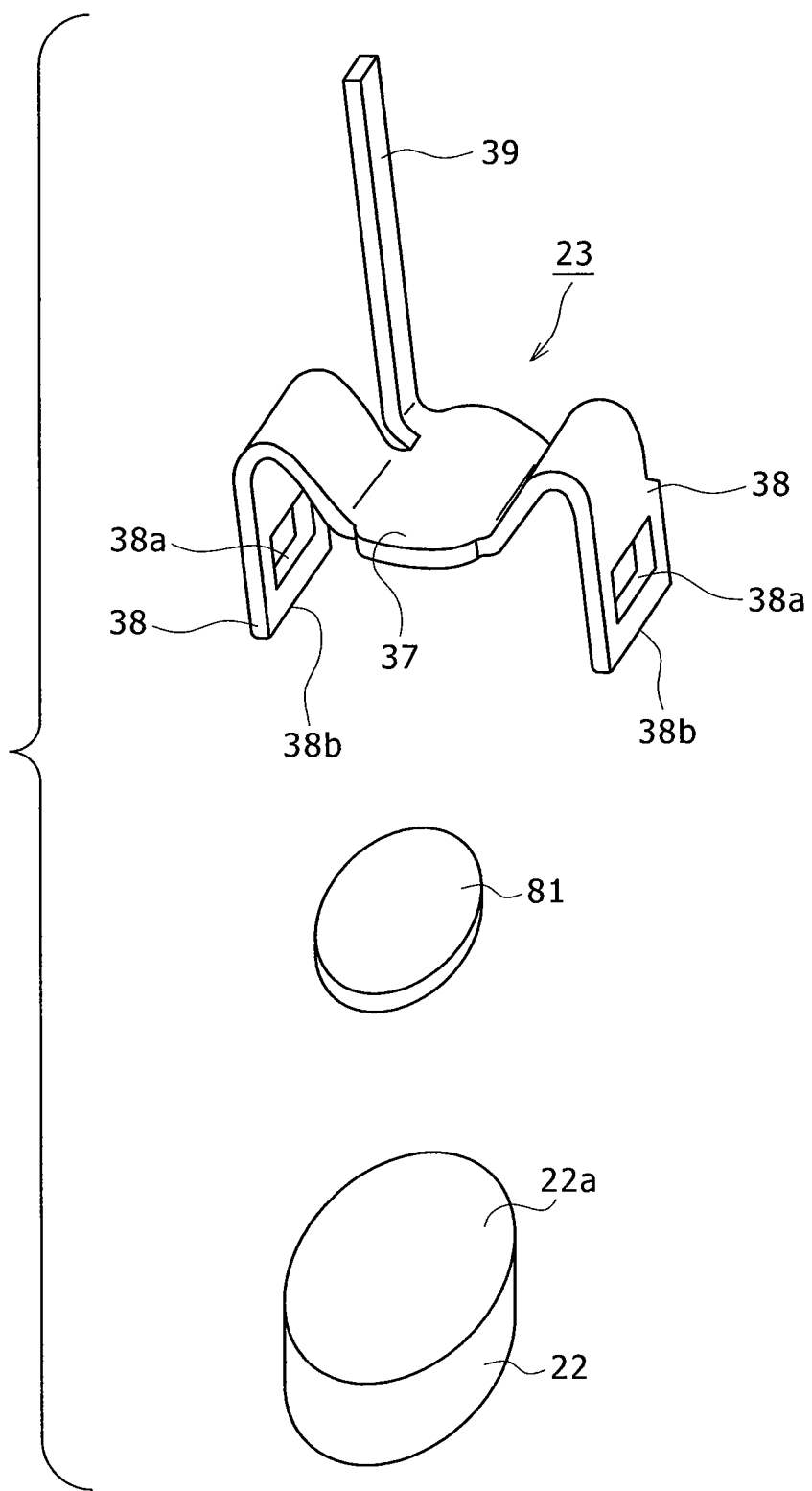
FIG. 27 is an exploded perspective view of components of the variable capacitor of FIG. 26.

Referring particularly to FIG. 27, the conductive elastic member 81 has a shape of a disk having a size substantially equal to or slightly greater than that of the flat portion 37 of the terminal member 23. When the variable capacitor 150 is assembled, the conductive elastic member 81 is held between the flat portion 37 of the terminal member 23 and the first face portion 22a of the dielectric member 22 by elastic biasing force provided by the locking portions 38 of the terminal member 23.

In the present second embodiment, since the conductive elastic member 81 is interposed, the entire area of the flat portion 37 of the terminal member 23 surely contacts the first face portion 22a of the dielectric member 22. Accordingly, even when the dielectric member 22 is pressed and deformed from the second face portion 22b side by the writing pressure, the first electrode of the first face portion 22a side of the dielectric member 22 has a stable electrode area formed of the contact area between the flat portion 37 of the terminal member 23 and the first face portion 22a of the dielectric member 22 with the conductive elastic member 81 interposed therebetween.

It is to be noted that the conductive elastic member 81 may be prepared as a separate member from the dielectric member 22 and the terminal member 23 and sandwiched, upon assembly of the variable capacitor 150, between the first face portion 22a of the dielectric member 22 and the flat portion 37 of the terminal member 23. However, the conductive elastic member 81 may otherwise be adhered in advance to the first face portion 22a of the dielectric member 22 or to the flat portion 37 of the terminal member 23.

Third Embodiment

Figure 28:
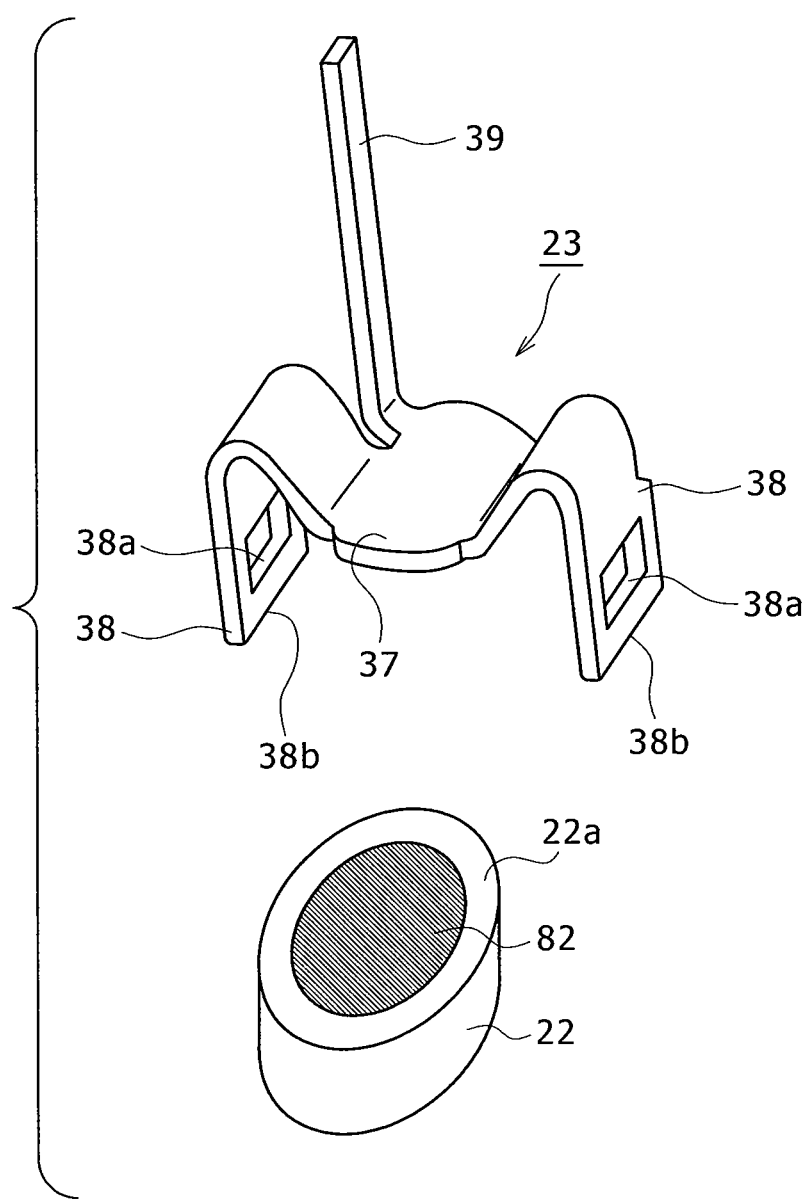
FIG. 28 is a similar view but showing components of a variable capacitor according to a third embodiment of the present invention.

A variable capacitor for a position pointer according to a third embodiment of the present invention is similar in configuration to those according to the first and second embodiments described hereinabove except the configuration of the contacting portion between the flat portion 37 of the terminal member 23 and the first face portion 22a of the dielectric member 22. Again, overlapping description of common components is omitted to avoid redundancy. Referring to FIG. 28, in the present third embodiment, a metal electrode 82 is formed over a region of the first face portion 22a of the dielectric member 22, which is equal to or greater in size than the area of the first face portion 22a of the dielectric member 22 which the flat portion 37 of the terminal member 23 contacts. The metal electrode 82 is formed, for example, by sintering silver paste to the first face portion 22a of the dielectric member 22.

Since the variable capacitor of the third embodiment is configured in such a manner as described above, when the flat portion 37 of the terminal member 23 is brought into contact, over a predetermined area, with the first face portion 22a of the dielectric member 22 under the pressing biasing force due to the elastic force of the terminal member 23, the flat portion 37 can surely contact the metal electrode 82.

In the present third embodiment, the area of the first electrode of the first face portion 22a side of the dielectric member 22 depends upon the area of the metal electrode 82 and, therefore, the first electrode can be provided as a stable electrode area. In the case of the present third embodiment, though the metal electrode 82 exists, the flat portion 37 of the terminal member 23 is normally kept in face-contact with the metal electrode 82 under the elastic force of the terminal member 23. Accordingly, collision between the terminal member 23 and the metal electrode 82 on the first face portion 22a of the dielectric member 22 becomes impossible. Consequently, the metal electrode 82 hardly suffers from any abrasion with improved durability.

Fourth Embodiment

Figure 29:
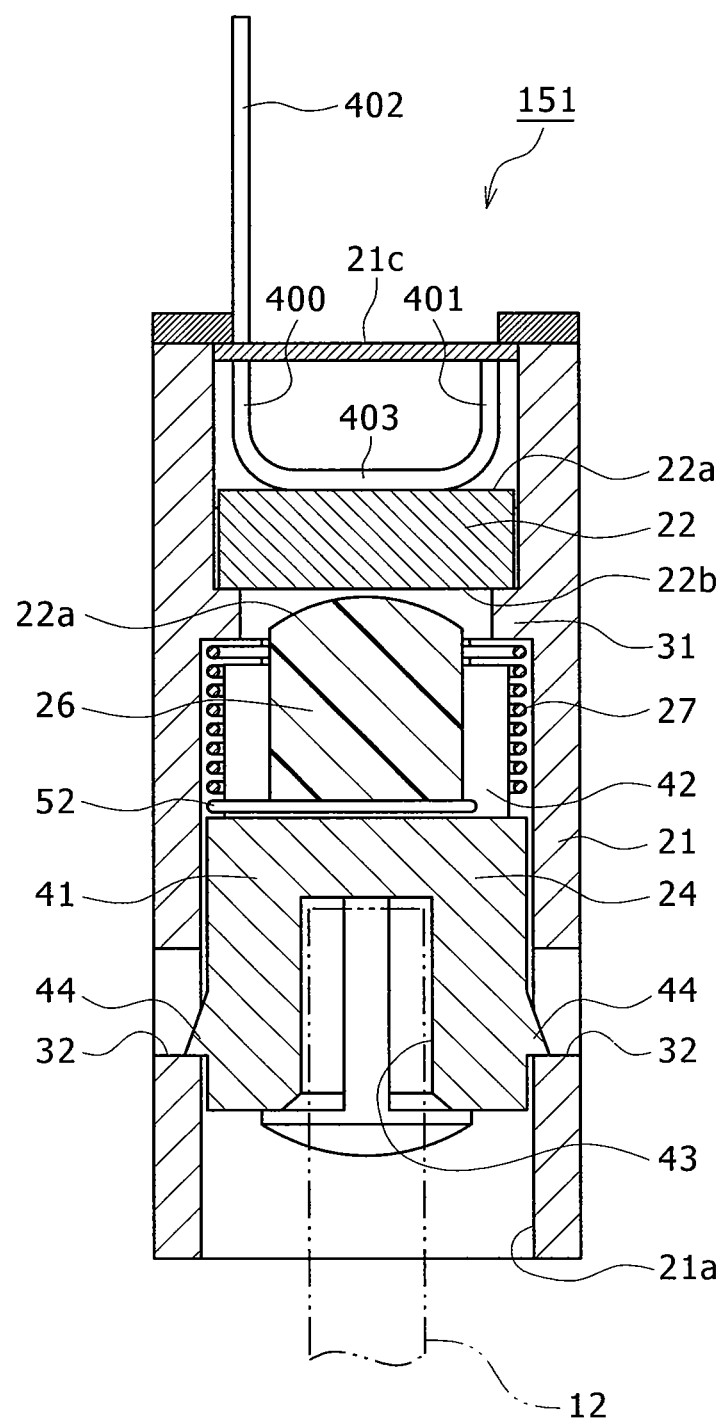
FIG. 29 is a sectional view of a variable capacitor according to a fourth embodiment of the present invention.

A variable capacitor for a position pointer according to a fourth embodiment of the present invention is similar in configuration to that according to the first to third embodiments described hereinabove except the configuration of the terminal member, which contacts the first face portion 22a of the dielectric member 22. FIG. 29 shows an example of a configuration of the variable capacitor 151 of the position pointer according to the fourth embodiment. It is to be noted that overlapping description of components of the variable capacitor 151 common to those of the variable capacitor 15 is omitted herein to avoid redundancy.

Figure 30A:
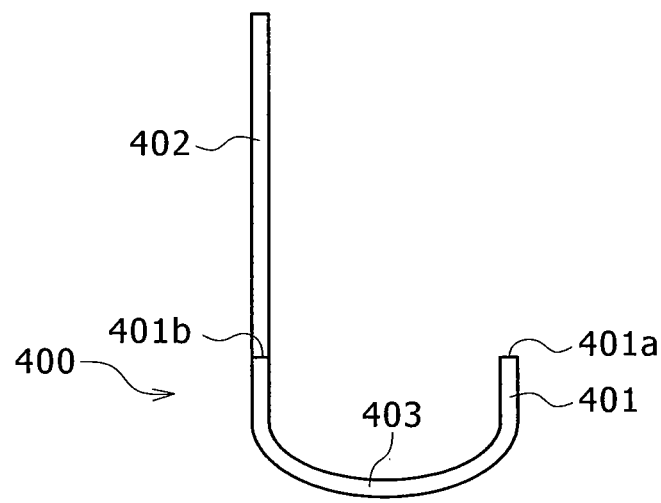
FIG. 30A is a side elevational view of a terminal member of the variable capacitor of FIG. 29.
Figure 30B:
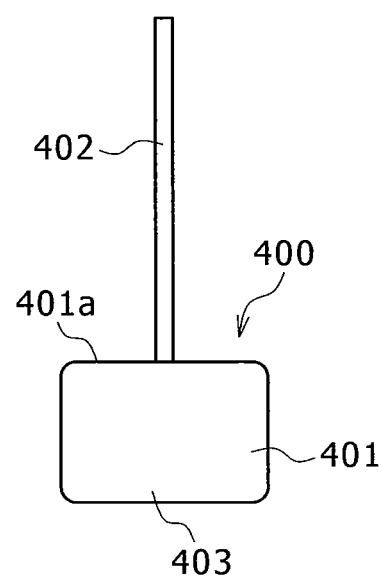
FIG. 30B is another elevational view of the same terminal member (viewed from the right-hand side of FIG. 30A)

In the present fourth embodiment, the terminal member provided on the first face portion 22a side of the dielectric member 22 is configured as a terminal member 400 as shown in FIGS. 29, 30A and 30B. Referring to FIGS. 29, 30A and 30B, the terminal member 400 is made of a conductive metal material similar to that of the terminal member 23 and includes an elastic engaging portion 401 and a lead piece 402. The elastic engaging portion 401 has a U-shaped section as seen in FIG. 30A and has, at a bottom portion of the U shape thereof, a flat portion 403 for contacting the first face portion 22a of the dielectric member 22.

The lead piece 402 is provided so as to extend from one of the opposite ends of the U shape of the elastic engaging portion 401, as seen in FIGS. 30A and 30B. The lead piece 402 is connected to the contact portion (not shown) of the printed board 17 shown in FIG. 2, for example, by resistance welding or ultrasonic welding. Consequently, the terminal member 400 is electrically connected to electronic parts of the printed board 17.

In the present embodiment, a lid portion 21c is provided fixedly on the holder 21 on one end side of the holder 21 in the axial direction such that it opposes the first face portion 22a of the dielectric member 22. A through-hole (not shown) is perforated in the lid portion 21c such that the lead piece 402 of the terminal member 400 extends therethrough.

Upon assembly of the variable capacitor 151 of the present embodiment, before the lid portion 21c is secured to the holder 21, the lead piece 402 of the terminal member 400 is inserted into the through-hole of the lid portion 21c. Then, the lid portion 21c is secured to the holder 21 such that the U-shaped elastic engaging portion 401 is disposed in a space between the lid portion 21c and the first face portion 22a of the dielectric member 22.

In this example, the length from a face of the flat portion 403 of the terminal member 400, which contacts the first face portion 22a of the dielectric member 22, to the end portions 401a and 401b of the U-shaped elastic engaging portion 401 is set greater than the distance between the secured lid portion 21c and the first face portion 22a of the dielectric member 22.

Therefore, in the state wherein the lid portion 21c is secured to the holder 21, the end portions 401a and 401b of the U-shaped elastic engaging portion 401 of the terminal member 400 contact the lid portion 21c, and the flat portion 403 is biased toward the first face portion 22a side of the dielectric member 22 by the elastic biasing force of the elastic engaging portion 401 to resiliently press the flat portion 403 against the first face portion 22a of the dielectric member 22.

In this manner, also in the present fourth embodiment, the flat portion 403 of the terminal member 400 is pressed against and contacted with the first face portion 22a of the dielectric member 22, and the terminal member 400 operates as the first electrode similarly as in the first embodiment described hereinabove. Accordingly, also in the present fourth embodiment, similar advantages to those of the first embodiment described hereinabove can be achieved.

It is to be noted that, while in the variable capacitor 151 described hereinabove with reference to FIG. 29, the flat portion 403 of the terminal member 400 is contacted directly with the first face portion 22a of the dielectric member 22, the conductive elastic member 81 may be interposed between the flat portion 403 of the terminal member 400 and the first face portion 22a of the dielectric member 22 similarly as in the second embodiment described hereinabove. Further, the metal electrode 82 may be formed on the first face portion 22a of the dielectric member 22 similarly as in the third embodiment such that the metal electrode 82 and the flat portion 403 of the terminal member 400 contact each other.

Fifth Embodiment

Figure 31:
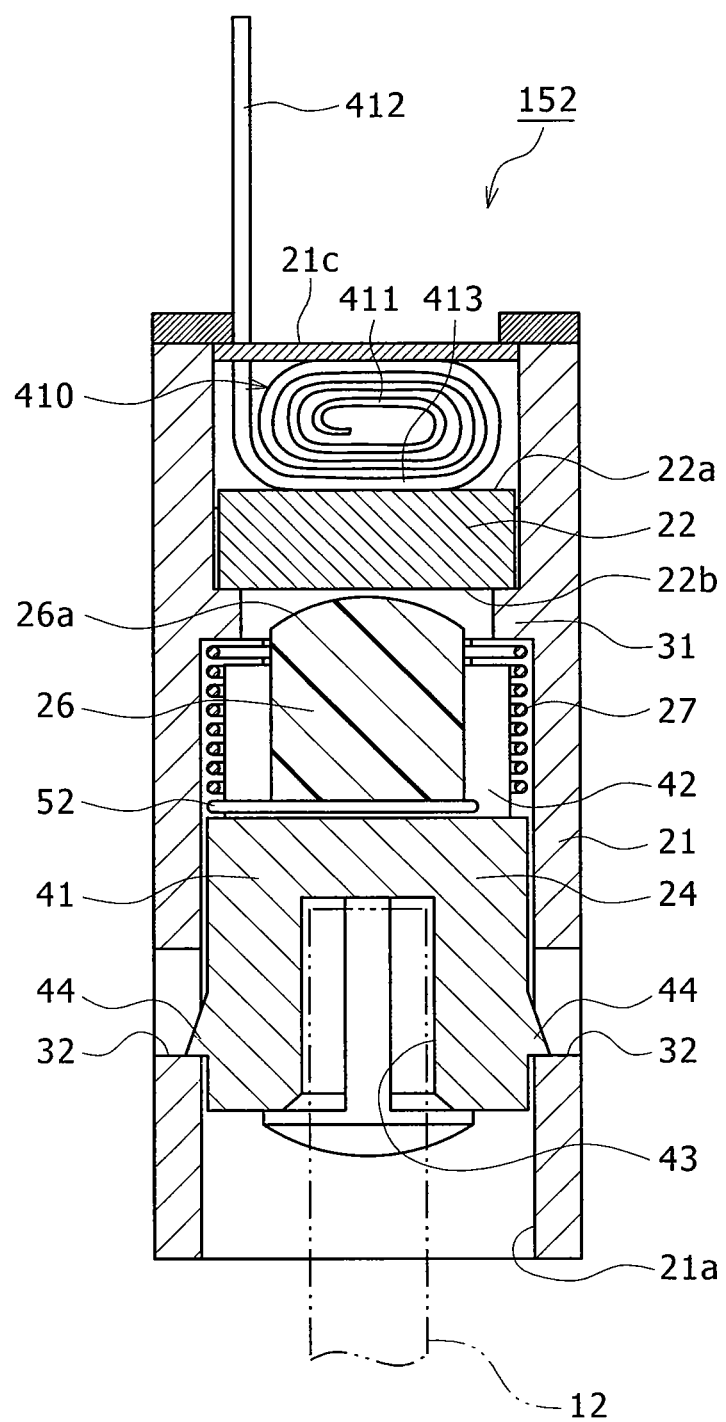
FIG. 31 is a sectional view of a variable capacitor according to a fifth embodiment of the present invention.

A variable capacitor for a position pointer according to a fifth embodiment of the present invention is similar in configuration to that according to the embodiments described hereinabove except the configuration of the terminal member which contacts the first face portion 22a of the dielectric member 22. FIG. 31 shows an example of a configuration of the variable capacitor 152 of the position pointer according to the fifth embodiment. It is to be noted that overlapping description of components of the variable capacitor 152 common to those of the variable capacitor 15 of the first embodiment described hereinabove is omitted herein to avoid redundancy.

Figure 32A:
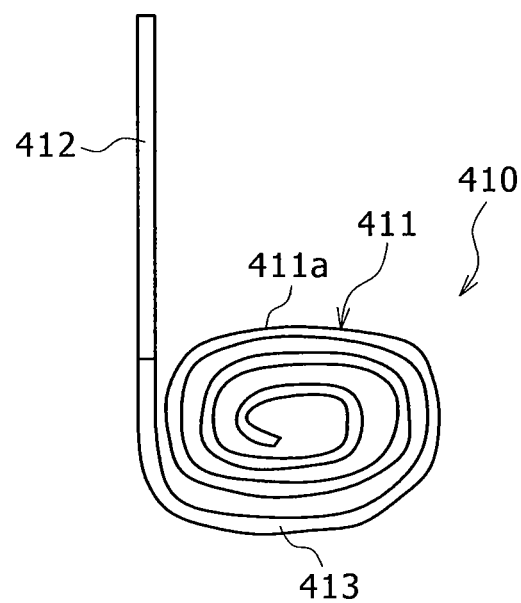
FIG. 32A is a side elevational view of a terminal member of the variable capacitor of FIG. 31.
Figure 32B:
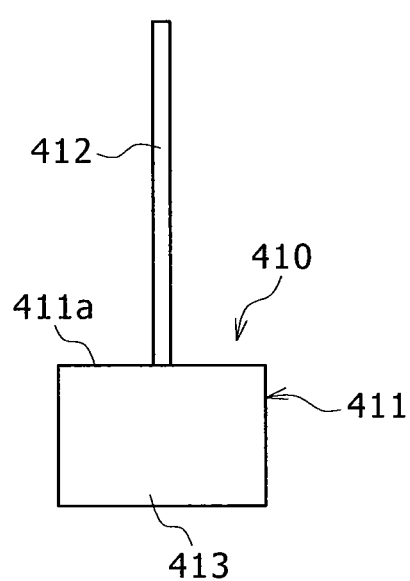
FIG. 32B is another elevational view of the same terminal member (viewed from the right-hand side of FIG. 32A)

In the present fifth embodiment, the terminal member provided on the first face portion 22a side of the dielectric member 22 is configured as a terminal member 410 shown in FIGS. 31, 32A and 32B. The terminal member 410 is made of a conductive material similar to that of the terminal member 23 and includes an elastic engaging portion 411 and a lead piece 412. The elastic engaging portion 411 is formed from a spirally curved or coiled metal plate as seen in FIG. 32A and has a flat portion 413 at a bottom portion thereof for contacting the first face portion 22a of the dielectric member 22.

The lead piece 412 is provided such that it extends from an end portion of an outermost circumference of the coiled metal plate as seen in FIGS. 32A and 32B. The lead piece 412 is connected to the contact portion (not shown) of the printed board 17 shown in FIG. 2, for example, by resistance welding or ultrasonic welding. Consequently, the terminal member 410 is electrically connected to electronic parts of the printed board 17.

Also in the present fifth embodiment, a through-hole (not shown) is provided in the lid portion 21c provided on the one end side of the holder 21 in the axial direction such that the lead piece 412 of the terminal member 410 extends therethrough similarly as in the fourth embodiment.

Upon assembly of the variable capacitor 152 of the present embodiment, before the lid portion 21c is secured to the holder 21, the lead piece 412 of the terminal member 410 is inserted into the through-hole of the lid portion 21c. Then, the lid portion 21c is secured to the holder 21 in a state wherein the elastic engaging portion 411 is disposed in the space between the lid portion 21c and the first face portion 22a of the dielectric member 22.

In this instance, the distance from a face of the flat portion 413 of the terminal member 410 which contacts the first face portion 22a of the dielectric member 22 to the upper end portion 411a of the coiled elastic engaging portion 411 opposite to the flat portion 413 is set greater than the distance between the secured lid portion 21c and the first face portion 22a of the dielectric member 22.

Therefore, in the state wherein the lid portion 21c is secured to the holder 21, the upper end portion 411a of the coiled elastic engaging portion 411 of the terminal member 410 contacts the lid portion 21c, and the flat portion 413 is biased toward the first face portion 22a side of the dielectric member 22 by the elastic biasing force of the elastic engaging portion 411. Consequently, the flat portion 413 is pressed under pressure against the first face portion 22a of the dielectric member 22.

In this manner, also in the present fifth embodiment, the flat portion 413 is pressed against and contacted with the first face portion 22a of the dielectric member 22 and the terminal member 410 operates as the first electrode similarly as in the first embodiment described hereinabove. Accordingly, also with the present fifth embodiment, similar advantages to those of the first embodiment described hereinabove can be achieved.

It is to be noted that, while in the variable capacitor 152 described hereinabove with reference to FIG. 31, the flat portion 413 of the terminal member 410 is contacted directly with the first face portion 22a of the dielectric member 22, the conductive elastic member 81 may be interposed between the flat portion 413 of the terminal member 410 and the first face portion 22a of the dielectric member 22 similarly as in the second embodiment described hereinabove. Further, the metal electrode 82 may be formed on the first face portion 22a of the dielectric member 22 similarly as in the third embodiment such that the metal electrode 82 and the flat portion 413 of the terminal member 410 contact each other.

Sixth Embodiment

Figure 33:
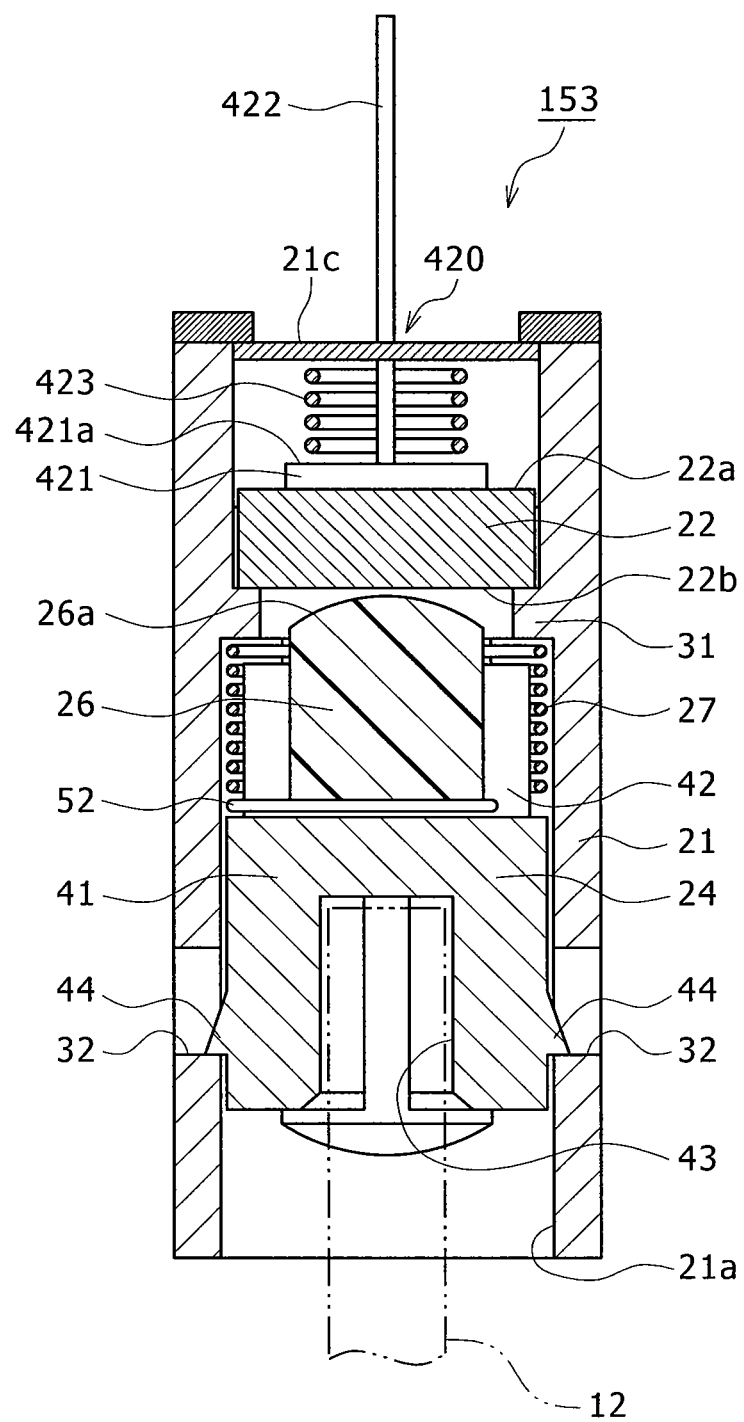
FIG. 33 is a sectional view of a variable capacitor according to a sixth embodiment of the present invention.

A variable capacitor for a position pointer according to a sixth embodiment of the present invention is similar in configuration to that according to the embodiments described hereinabove except the configuration of the terminal member which contacts the first face portion 22a of the dielectric member 22. FIG. 33 shows an example of a configuration of the variable capacitor 153 of the position pointer according to the sixth embodiment. It is to be noted that overlapping description of components of the variable capacitor 153 common to those of the variable capacitor 15 is omitted herein to avoid redundancy.

Figure 34:
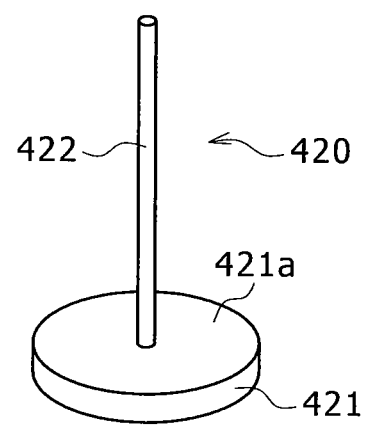
FIG. 34 is a perspective view of components of the variable capacitor of FIG. 33.

In the present sixth embodiment, the terminal member provided on the first face portion 22a side of the dielectric member 22 is configured as a terminal member 420 as shown in FIGS. 33 and 34. The terminal member 420 is made of a conductive material similar to that of the terminal member 23 and includes a disk-like engaging portion 421 and a lead piece 422. The disk-like engaging portion 421 is formed from a disk made of a conductive material as seen in FIG. 34 and has a bar-like piece extending vertically from one (upper) face 421a of the disk-like engaging portion 421 to form the lead piece 422.

The lead piece 422 is connected to the contact portion (not shown) of the printed board 17 shown in FIG. 2, for example, by resistance welding or ultrasonic welding. Consequently, the terminal member 420 is electrically connected to electronic parts of the printed board 17.

Also in the present sixth embodiment, a through-hole (not shown) is provided in the lid portion 21c provided on the one end side of the holder 21 in the axial direction such that the lead piece 422 of the terminal member 420 extends therethrough similarly as in the fourth embodiment.

Further, in the present sixth embodiment, a coil spring 423 is fitted around the bar-like lead piece 422 such that a (lower) face of the disk-like engaging portion 421 of the terminal member 420 opposite from the one (upper) face 421a is pressed against the first face portion 22a of the dielectric member 22 by the elastic biasing force of the coil spring 423.

Upon assembly of the variable capacitor 153 of the present sixth embodiment, the coil spring 423 is fitted around the lead piece 422 of the terminal member 420 and then the lead piece 422 of the terminal member 420 is inserted into the through-hole of the lid portion 21c. Then, the (lower) face of the disk-like engaging portion 421 of the terminal member 420 opposite from the one (upper) face 421a is placed into contact with the first face portion 22a of the dielectric member 22, and the lid portion 21c is secured to the holder 21 in a state wherein the coil spring 423 is compressed.

Consequently, in the state wherein the lid portion 21c is secured to the holder 21, the coil spring 423 acts to bias the disk-like engaging portion 421 of the terminal member 420 toward the first face portion 22a side of the dielectric member 22.

In this manner, also in the present sixth embodiment, the disk-like engaging portion 421 of the terminal member 420 is pressed against and contacted with the first face portion 22a of the dielectric member 22 and the terminal member 420 operates as the first electrode. Accordingly, also with the present sixth embodiment, similar advantages to those of the first embodiment described hereinabove can be achieved.

Seventh Embodiment

Figure 35:
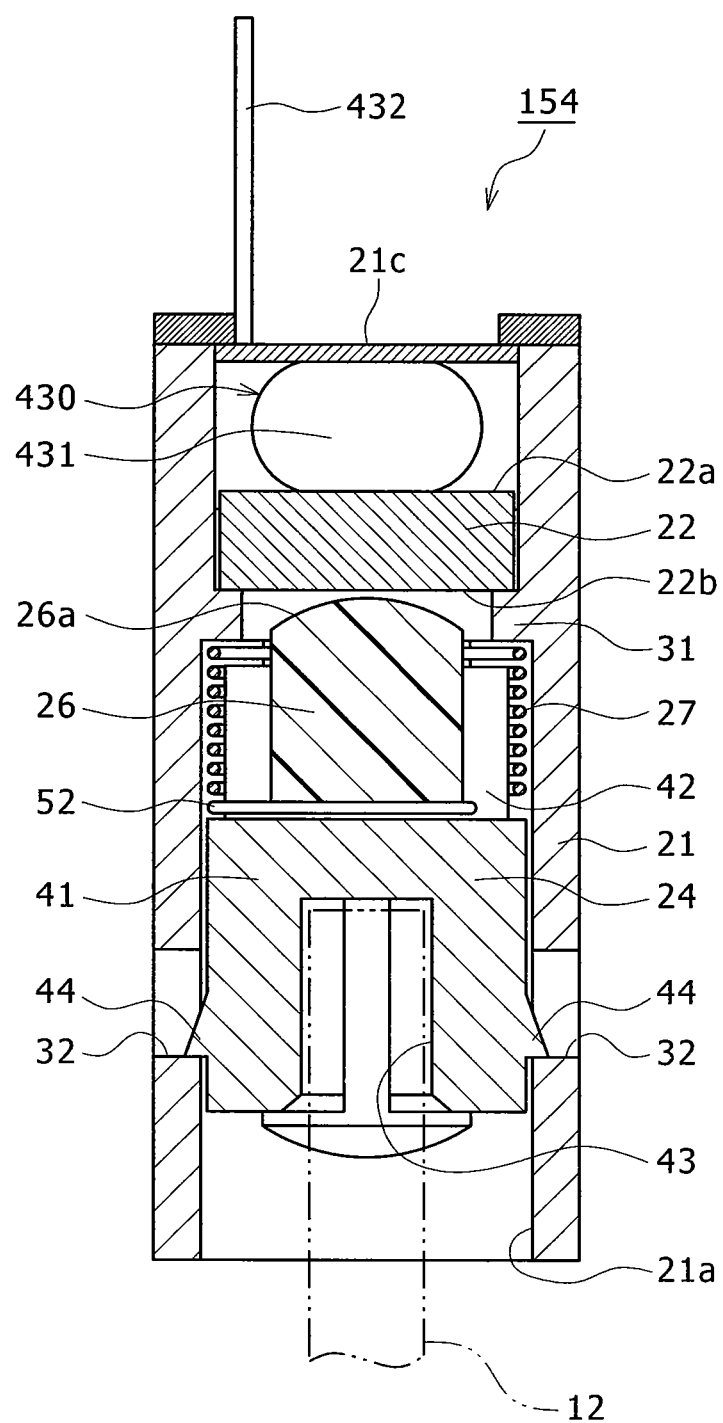
FIG. 35 is a sectional view of a variable capacitor according to a seventh embodiment of the present invention.

A variable capacitor for a position pointer according to a seventh embodiment of the present invention is similar in configuration to that according to the embodiments described hereinabove except the configuration of the terminal member which contacts the first face portion 22a of the dielectric member 22. FIG. 35 shows an example of a configuration of the variable capacitor 154 of the position pointer according to the seventh embodiment. It is to be noted that overlapping description of components of the variable capacitor 154 common to those of the variable capacitor 15 is omitted herein to avoid redundancy.

In the present seventh embodiment, the terminal member provided on the first face portion 22a side of the dielectric member 22 is configured as a terminal member 430 shown in FIG. 35. The terminal member 430 includes a single generally spherical elastic member 431, a lid portion 21c, and a lead piece 432. The elastic member 431 is made of, for example, a conductive rubber material. In the present embodiment, the diameter of the spherical elastic member 431 is set greater than the distance between the secured lid portion 21c and the first face portion 22a of the dielectric member 22.

Further, in the present seventh embodiment, the lid portion 21c is made of a conductive metal material, and the lead piece 432 for connecting to the contact portion of the printed board 17 is connected to and provided on the lid portion 21c.

In assembly of the variable capacitor 154 according to the seventh embodiment, the lid portion 21c is secured to the holder 21 such that the elastic member 431 is disposed between the first face portion 22a of the dielectric member 22 and the lid portion 21c.

Then, since the diameter of the elastic member 431 is greater than the distance between the secured lid portion 21c and the first face portion 22a of the dielectric member 22, the elastic member 431 yields (or collapses) and contacts, in a face-contacting relationship, the first face portion 22a of the dielectric member 22.

In this manner, also in the present seventh embodiment, the terminal member 430 is pressed by and contacts in a face-contact relationship the first face portion 22a of the dielectric member 22, and the terminal member 430 operates as the first electrode similarly as in the first embodiment described hereinabove. Accordingly, also with the present seventh embodiment, similar advantages to those of the first embodiment described hereinabove can be achieved.

Figure 36:
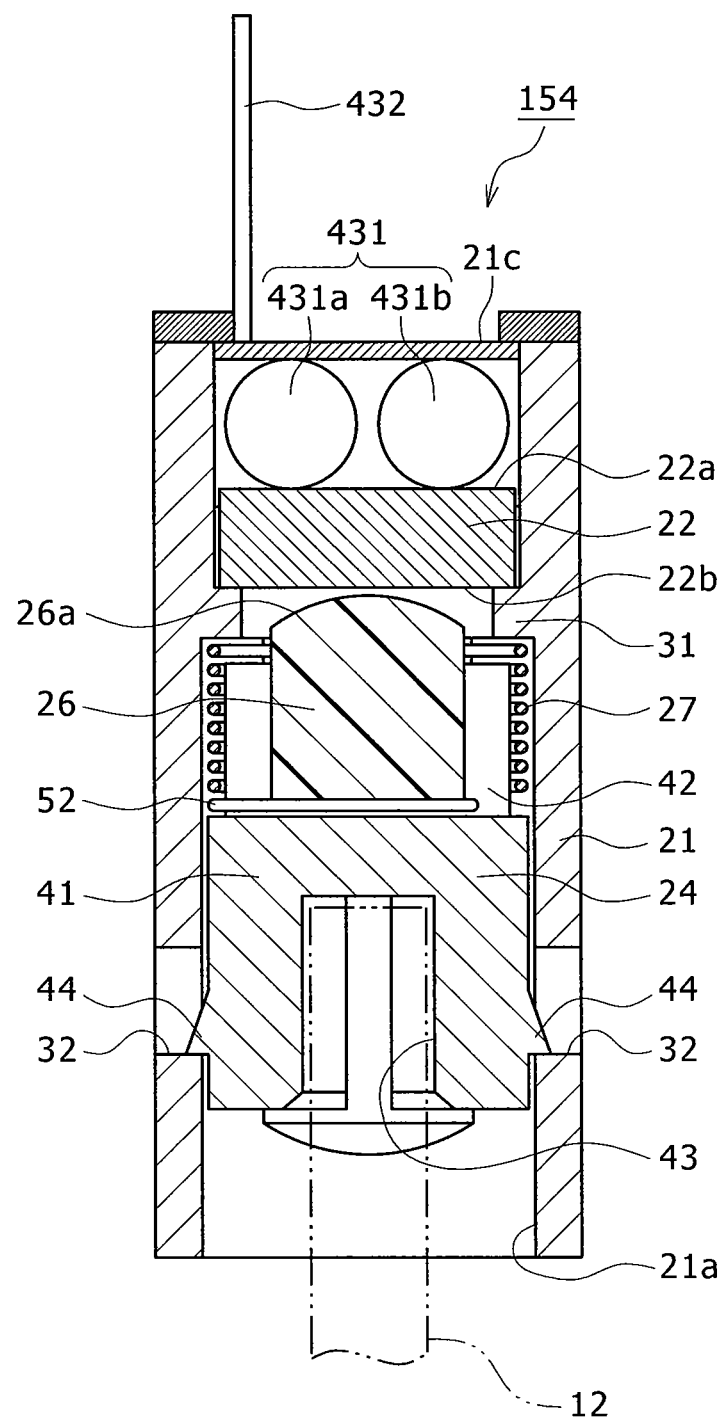
FIG. 36 is a sectional view of another example of a variable capacitor according to the seventh embodiment of the present invention.

It is to be noted that, while in the description of the seventh embodiment above, the terminal member 430 is formed using a single elastic member 431, it may otherwise be formed using a plurality of elastic members, for example, two elastic members 431a and 431b as seen in FIG. 36.

Eighth Embodiment

Figure 37:
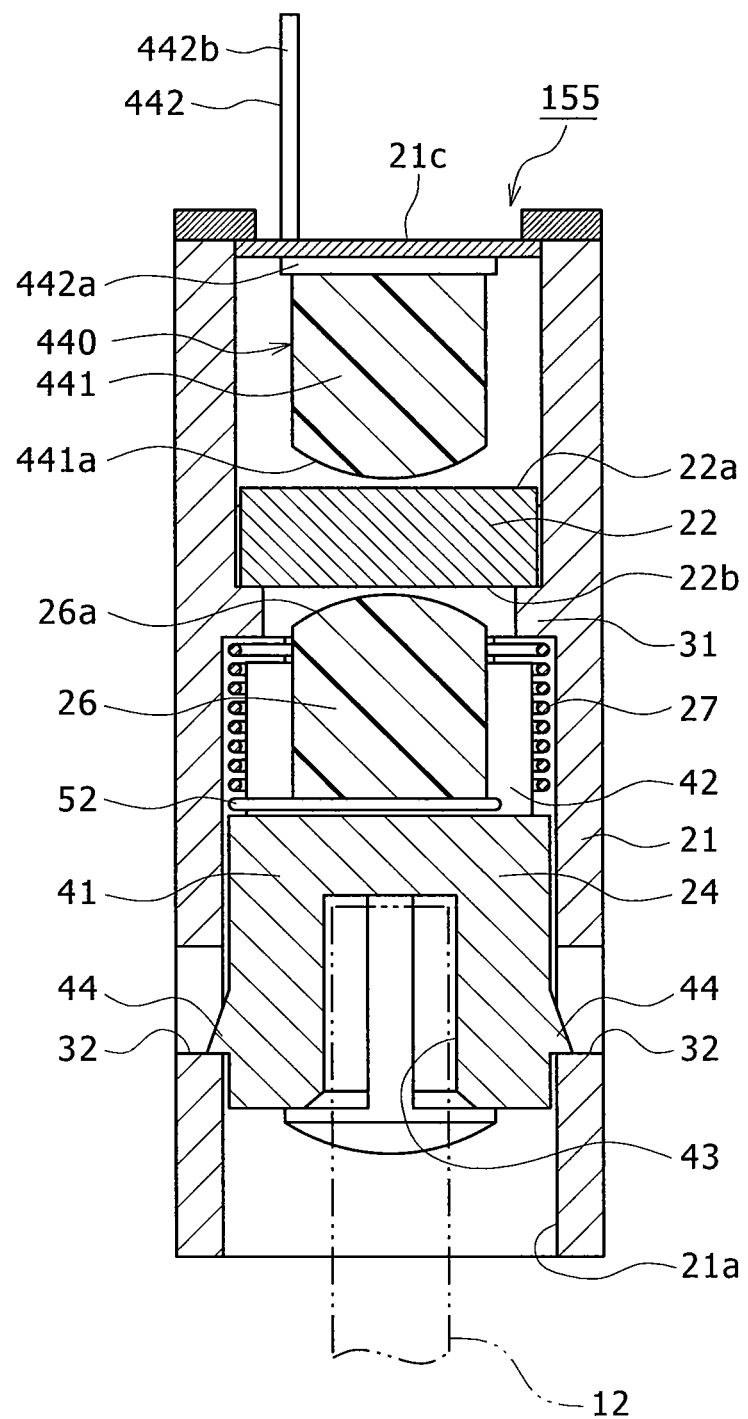
FIG. 37 is a sectional view of a variable capacitor according to an eighth embodiment of the present invention.

A variable capacitor for a position pointer according to an eighth embodiment of the present invention is similar in configuration to that according to the first to seventh embodiments described hereinabove except the configuration of the terminal member which contacts the first face portion 22a of the dielectric member 22. FIG. 37 shows an example of a configuration of the variable capacitor 155 of the position pointer according to the eighth embodiment. It is to be noted that overlapping description of components of the variable capacitor 155 common to those of the variable capacitor 15 is omitted herein to avoid redundancy.

In the present eighth embodiment, the terminal member provided on the first face portion 22a side of the dielectric member 22 is configured as a terminal member 440 as shown in FIG. 37. Referring to FIG. 37, the terminal member 440 includes an elastic engaging portion 441 and a lead piece 442. The elastic engaging portion 441 is made of, for example, a conductive material and has a cannonball-like shape similar to that of the conductive member 26 provided on the second face portion 22b side of the dielectric member 22. The elastic engaging portion 441 has a length in the axial direction thereof that is set slightly greater than the distance between the secured lid portion 21c and the first face portion 22a of the dielectric member 22.

The lead piece 442 is made of a conductive metal material and includes a metal plate portion 442a connected to the elastic engaging portion 441, and a bar-like piece 442b formed so as to be connected to the contact portion (not shown) of the printed board 17. The lid portion 21c has a through-hole (not shown) formed therein such that the bar-like piece 442b extends therethrough.

Upon assembly of the variable capacitor 155 of the present eighth embodiment, before the lid portion 21c is secured to the holder 21, the bar-like piece 442b of the lead piece 442 of the terminal member 400 is inserted into the through-hole of the lid portion 21c. Then, the lid portion 21c is secured to the holder 21 such that a dome-shaped curved face 441a of the cannonball-shaped elastic engaging portion 441 face-contacts the first face portion 22a of the dielectric member 22. Since the length of the elastic engaging portion 441 in the axial direction is set slightly greater than the distance between the secured lid portion 21c and the first face portion 22a of the dielectric member 22, a portion of the dome-shaped curved face 441a of the elastic engaging portion 441, which contacts the first face portion 22a of the dielectric member 22, elastically yields into a crushed state, and the dome-shaped curved face 441a of the elastic engaging portion 441 and the first face portion 22a of the dielectric member 22 are placed into a state wherein they face-contact with each other.

In this manner, also in the present eighth embodiment, the terminal member 440 is pressed against and contacted with the first face portion 22a of the dielectric member 22, and the terminal member 440 operates as the first electrode similarly as in the first embodiment described hereinabove. Accordingly, also with the present eighth embodiment, similar advantages to those of the first embodiment described hereinabove can be achieved.

It is to be noted that, in the variable capacitors described hereinabove with reference to FIGS. 29, 31, 33, 35, 36 and 37, the terminal members 400, 410, 420, 430 and 440 directly contact the first face portion 22a of the dielectric member 22 similarly as in the first embodiment described hereinabove. However, the conductive elastic member 81 may be interposed between any of the terminal members 400, 410, 420, 430 and 440 and the first face portion 22a of the dielectric member 22 similarly as in the second embodiment described hereinabove. Further, the metal electrode 82 may be formed on the first face portion 22a of the dielectric member 22 such that the metal electrode 82 and any of the terminal members 400, 410, 420, 430 and 440 may contact each other similarly as in the third embodiment.

Ninth Embodiment

Figure 38:
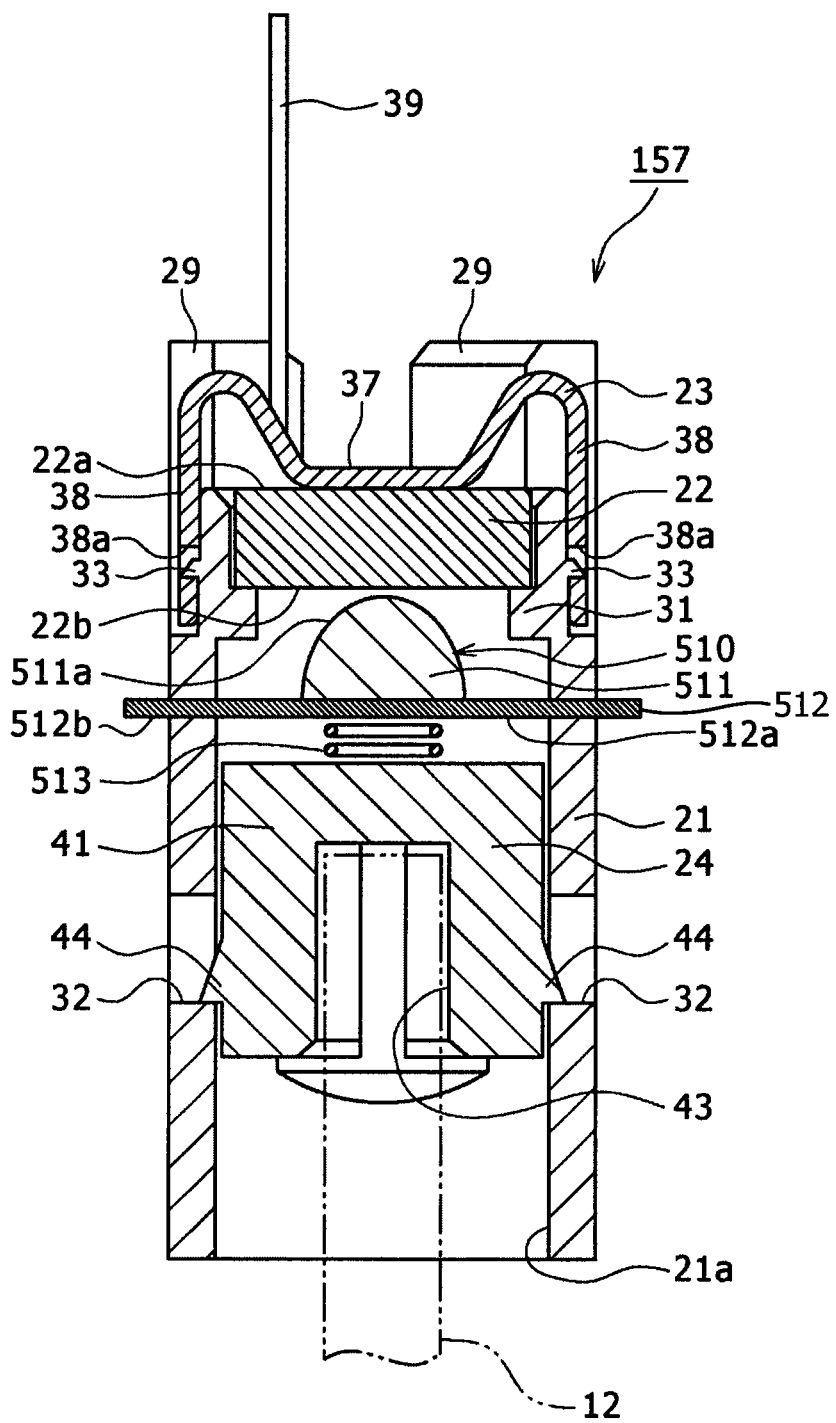
FIG. 38 is a sectional view of a variable capacitor according to a ninth embodiment of the present invention.

A variable capacitor for a position pointer according to a ninth embodiment of the present invention is similar in configuration to that according to the first embodiment described hereinabove except the conductive member disposed on the second face portion 22b side of the dielectric member 22. FIG. 38 shows an example of a configuration of the variable capacitor 157 of the position pointer according to the ninth embodiment. Referring to FIG. 38, the variable capacitor 157 shown is different from the variable capacitor 15 of the first embodiment described hereinabove in that a conductive member 510 is provided in the variable capacitor 15 in place of the conductive member 26 disposed on the second face portion 22b side of the dielectric member 22. It is to be noted that overlapping description of components of the variable capacitor 157 common to those of the variable capacitor 15 is omitted herein to avoid redundancy.

The conductive member 510 in the present ninth embodiment includes a conductive elastic member 511, a leaf spring 512, and a coil spring 513.

The leaf spring 512 has a central portion 512a corresponding to an internal space of the holder 21 and a flange portion 512b that projects outwardly of the holder 21. The leaf spring 512 is movably engaged at the flange portion 512b with the holder 21 and is elastically deformed in a direction in which the writing pressure is applied.

The conductive elastic member 511 is made of, for example, a conductive rubber material and has a dome-like shape. The conductive elastic member 511 is secured to the leaf spring 512 such that a bottom face thereof which is a flat face is secured by adhesion or the like to a substantially central position of the central portion 512a of the leaf spring 512.

The coil spring 513 is provided between an end portion of the base portion 41 of the holding member 24 adjacent the dielectric member 22 and the leaf spring 512. In this instance, the coil spring 513 is disposed at a central position of the central portion 512a of the leaf spring 512. When the holding member 24 is displaced toward the dielectric member 22 side by the rod 12 due to the writing pressure, the coil spring 513 is configured to transmit the displacement to the leaf spring 512.

With the present ninth embodiment, if the pressure applied to the rod 12 increases in response to the writing pressure, then the leaf spring 512 is deformed such that a dome-shaped curved face 511a of the conductive elastic member 511 is brought into contact with the second face portion 22b of the dielectric member 22 and the contact area varies in response to the writing pressure. Then, if the writing pressure disappears and the rod 12 is restored to its original position, then the conductive elastic member 511 is surely displaced and removed from the second face portion 22b of the dielectric member 22 by the elastic restoring force of the leaf spring 512.

In this manner, in the present ninth embodiment, even if the pointing portion 12a of the rod 12 is directed upwardly, the elastic force of the leaf spring 512 prevents or discourages the holding member 24 from being moved toward the dielectric member 22 side within the holder 21 by the weight of the rod 12 and/or the weight of the holding member 24 itself. As a result, it is possible to prevent the conductive elastic member 511 and the dielectric member 22 from being brought into contact with each other when no pressure is applied to the rod 12.

Tenth Embodiment

Figure 39:
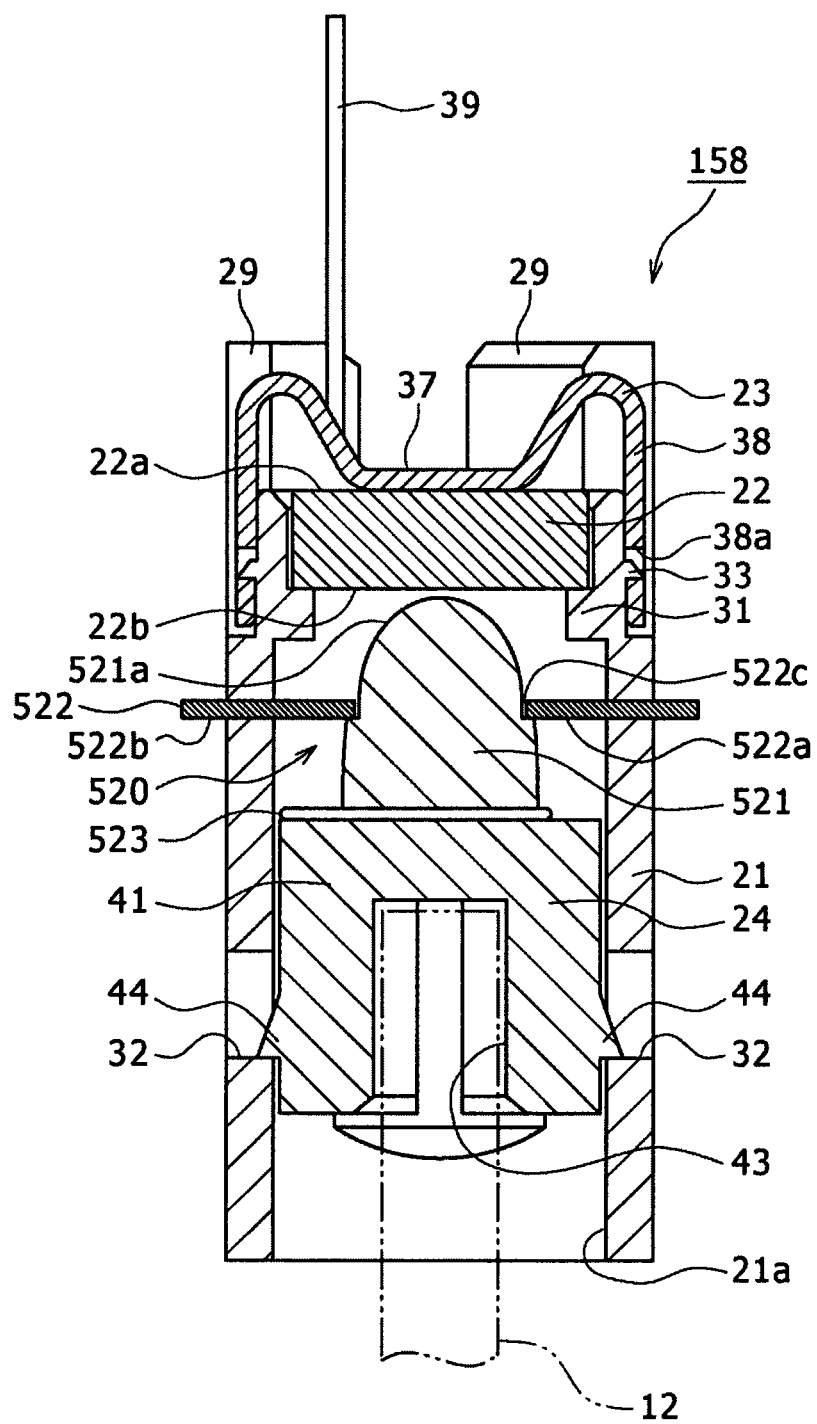
FIG. 39 is a sectional view of a variable capacitor according to a tenth embodiment of the present invention.
Figure 40:
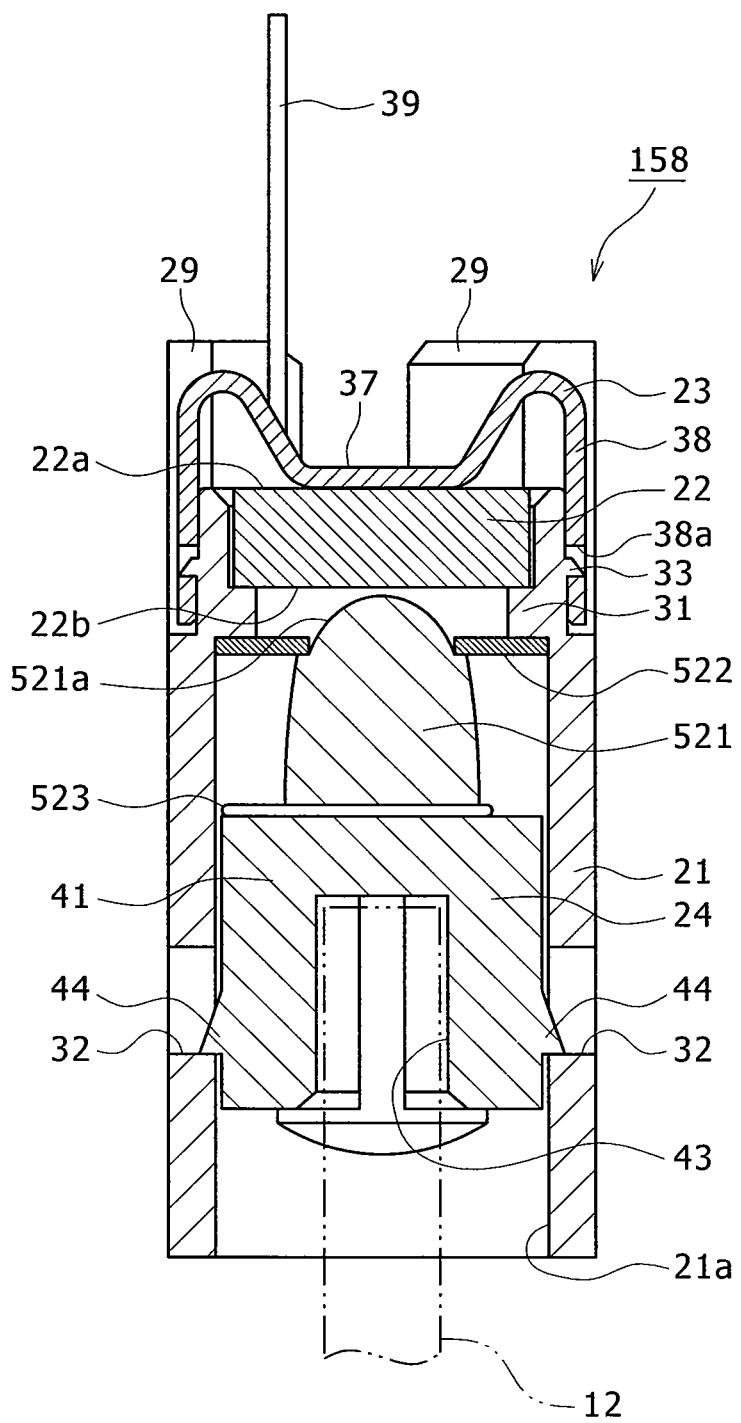
FIG. 40 is a sectional view of another example of a variable capacitor according to the tenth embodiment of the present invention.

A variable capacitor for a position pointer according to a tenth embodiment of the present invention is similar in configuration to that according to the first embodiment described hereinabove except the conductive member disposed on the second face portion 22b side of the dielectric member 22. FIG. 39 shows an example of a configuration of the variable capacitor 158 of the position pointer according to the tenth embodiment. Referring to FIG. 39, the variable capacitor 158 shown is different from the variable capacitor 15 of the first embodiment described hereinabove in that a conductive member 520 is provided in the variable capacitor 158 in place of the conductive member 26 disposed on the second face portion 22b side of the dielectric member 22. It is to be noted that overlapping description of components of the variable capacitor 158 common to those of the variable capacitor 15 is omitted herein to avoid redundancy.

The conductive member 520 in the present tenth embodiment includes a conductive elastic member 521, a leaf spring 522 and a conductive metal plate member 523.

The leaf spring 522 has a central portion 522a corresponding to an internal space of the holder 21 and a flange portion 522b that projects outwardly of the holder 21. The leaf spring 522 is movably engaged at the flange portion 522b with the holder 21 and is elastically deformed in a direction in which the writing pressure is applied.

The conductive elastic member 521 is made of, for example, a conductive rubber material and has a dome-like cannonball shape. In the present example, a through-hole 522c having a diameter smaller than that of the conductive elastic member 521 is provided at a central area of the central portion 522a of the leaf spring 522. The conductive elastic member 521 is combined with the leaf spring 522 such that a dome-shaped end portion 521a projects to the second face portion 22b side of the conductive elastic member 521 through the through-hole 522c of the leaf spring 522. A portion of the conductive elastic member 521 opposite from the end portion 521a is fitted in a fitting recessed portion (not shown) of the base portion 41 of the holding member 24.

The conductive metal plate member 523 is provided adjacent to the base portion 41 of the holding member 24. The conductive metal plate member 523 contacts the conductive elastic member 521 to be electrically connected thereto. The conductive metal plate member 523 is provided to lead out a lead (not shown) from the second electrode formed of the conductive elastic member 521.

With the present tenth embodiment, if the pressure applied to the rod 12 increases in response to the writing pressure, then the leaf spring 522 is deformed such that a dome-shaped curved face of the end portion 521a of the conductive elastic member 521, which projects from the through-hole 522c of the leaf spring 522, is brought into contact with the second face portion 22b of the dielectric member 22, and the contact area varies in response to the writing pressure. Then, if the writing pressure disappears and the rod 12 is restored to its original position, then the end portion 521a of the conductive elastic member 521 is surely displaced and removed from the second face portion 22b of the dielectric member 22 by the elastic restoring force of the leaf spring 522.

In this manner, also with the present tenth embodiment, similar advantages to those of the first embodiment described hereinabove can be achieved.

It is to be noted that the leaf spring 522 need not be engaged with the holder 21 in such a manner that the flange portion 522b projects outside of the holder 21. Instead, for example, the leaf spring 522 may be engaged in such a manner that the flange portion 522b is engaged with a flange portion 31 that supports the dielectric member 22 inside of the holder 21.

It is to be noted that the present invention is not limited to the embodiments described hereinabove and shown in the drawings but can be modified in various manners without departing from the subject matter of the present invention described in the claims. For example, while in some of the embodiments described above a coil spring is applied in the terminal member, not only a coil spring but also various members having elasticity such as a leaf spring (as used in some of the embodiments described above) can be applied in the terminal member. Further, while in some of the embodiments the connecting portion of the elastic member (e.g., the connecting portion 52 of the elastic member 27 in FIG. 4) contacts the bottom face portion of the conductive member (26), the elastic member may be instead formed so as to contact a side face portion of the conductive member (26).

While preferred embodiments of the present invention have been described using specific terms, such description is for illustrative purpose only, and it is to be understood that changes and variations may be made without departing from the spirit or scope of the following claims.

What is claimed is:

1. A position pointer, comprising:
   a housing;
   a rod accommodated in said housing such that one end thereof projects to an outer side of said housing;
   a variable capacitor having a capacitance value which varies in response to external force applied thereto through said rod;
   a holder configured to house said variable capacitor therein, said variable capacitor including:
      a dielectric member having a first face portion and a second face portion opposite from said first face portion,
      a terminal member being engaged with said holder and having elasticity to be biased toward said first face portion of said dielectric member to thereby elastically secure said dielectric member within said holder,
      an electrode section disposed in an opposing relationship to said second face portion of said dielectric member and including a conductive member having a contact area with said second face portion that varies in response to the external force, and
      an elastic member formed of a coil having conductivity and configured to bias said conductive member in a direction in which said conductive member is spaced away from said second face portion; and
   a holding member axially movably housed in said holder and configured to secure a proximal end of said rod and to hold said conductive member and said elastic member such that said conductive member is electrically connected to said elastic member.

2. The position pointer according to claim 1, wherein said terminal member is made of metal and has a third face portion for engaging with said first face portion of said dielectric member.

3. The position pointer according to claim 2, wherein a conductive elastic member is sandwiched between said first face portion of said dielectric member and said third face portion of said terminal member.

4. The position pointer according to claim 2, wherein a conductive metal member is sandwiched between said first face portion of said dielectric member and said third face portion of said terminal member.

5. The position pointer according to claim 1, wherein said second face portion of said dielectric member is in a mirror finished state.

6. An inputting apparatus, comprising:
   a position pointer including a housing, a rod accommodated in said housing such that one end thereof projects to an outer side of said housing, and a variable capacitor having a capacitance value which varies in response to external force applied thereto through said rod; and
   a position detection apparatus having a detection face to be pointed to by an end of said rod and being configured to detect a position pointed to by the end of said rod;
   said variable capacitor including:
      a dielectric member having a first face portion and a second face portion opposite from said first face portion,
      a terminal member configured to engage with said first face portion of said dielectric member,
      an electrode section disposed in an opposing relationship to said second face portion of said dielectric member and including a conductive member having a contact area with said second face portion that varies in response to the external force, and
      an elastic member formed of a coil having conductively and configured to exert spring force to bias said conductive member in a direction in which said conductive member is spaced away from said second face portion; and
   said position pointer further including a holding member axially movably arranged in said housing and configured to secure a proximal end of said rod and to hold said conductive member and said elastic member such that said conductive member is electrically connected to said elastic member.

7. The position pointer according to claim 1, wherein said conductive member is formed of conductive rubber material.

8. The position pointer according to claim 1, wherein said holding member holds said conductive member with an end of said coil interposed between said conductive member and said holding member.

9. The inputting apparatus according to claim 6, wherein said conductive member is formed of conductive rubber material.

10. The inputting apparatus according to claim 6, wherein said holding member holds said conductive member with an end of said coil interposed between said conductive member and said holding member.

* * * * *